US012269283B2

(12) United States Patent
Lacek

(10) Patent No.: US 12,269,283 B2
(45) Date of Patent: Apr. 8, 2025

(54) INFORMATION ITEM FORMING MACHINE WITH VISUAL INSPECTION UNIT AND METHOD FOR FORMING AND SORTING INFORMATIONAL ITEMS

(71) Applicant: G&K-VIJUK INTERN. CORP., Elmhurst, IL (US)

(72) Inventor: Chad M. Lacek, Elgin, IL (US)

(73) Assignee: G&K-VIJUK INTERN. CORP., Elmhurst, IL (US)

( * ) Notice: Subject to any disclaimer, the term of this patent is extended or adjusted under 35 U.S.C. 154(b) by 690 days.

(21) Appl. No.: 16/525,044

(22) Filed: Jul. 29, 2019

(65) Prior Publication Data

US 2019/0344598 A1 Nov. 14, 2019

Related U.S. Application Data

(63) Continuation of application No. 14/204,579, filed on Mar. 11, 2014, now Pat. No. 10,363,766.
(Continued)

(51) Int. Cl.
*B42C 9/00* (2006.01)
*B42C 1/12* (2006.01)
(Continued)

(52) U.S. Cl.
CPC .................. *B42C 9/00* (2013.01); *B42C 1/12* (2013.01); *B42D 1/006* (2013.01); *B65H 29/46* (2013.01); *B65H 29/62* (2013.01); *B65H 43/04* (2013.01); *B65H 45/142* (2013.01); *B65H 45/18* (2013.01); *B65H 45/30* (2013.01); *B65H 83/02* (2013.01); *B65H 2301/4213* (2013.01);
(Continued)

(58) Field of Classification Search
CPC ............. B42C 9/00; B42C 1/12; B65H 29/46; B65H 29/62; B65H 43/04; B65H 45/142; B65H 45/30; B65H 2301/4213; B65H 2301/4214; B65H 2301/44322; B65H 2301/4473; B65H 2404/2614; B65H 2511/16; B65H 2511/242; B65H 2511/413; B65H 2511/51; B65H 2553/42; B65H 2553/46; B65H 2701/1321; B65H 2701/1322
USPC ............................................................ 493/29
See application file for complete search history.

(56) References Cited

U.S. PATENT DOCUMENTS 4,143,771 A † 3/1979 Wieser
5,276,628 A * 1/1994 Schneiderhan .......... G06K 5/00 700/223

(Continued)

FOREIGN PATENT DOCUMENTS

JP 2000169039 A † 6/2000

*Primary Examiner* — Sameh Tawfik
(74) *Attorney, Agent, or Firm* — MARSHALL, GERSTEIN & BORUN LLP

(57) ABSTRACT

An apparatus for forming and sorting informational items comprises a folding unit, a conveyor belt, a camera, a controller, and a diverter assembly. The folding unit forms a folded article from a sheet of paper. The conveyor belt transports the folded article. The camera captures an image of the folded article as it passes by the camera. The controller receives and processes the image, and the diverter assembly causes the folded article to move off of the conveyor belt when the controller determines that the folded article fails to satisfy at least one predetermined criteria.

14 Claims, 35 Drawing Sheets

Related U.S. Application Data

(60) Provisional application No. 61/798,647, filed on Mar. 15, 2013.

(51) Int. Cl.

| | |
|---|---|
| ***B42D 1/00*** | (2006.01) |
| ***B65H 29/46*** | (2006.01) |
| ***B65H 29/62*** | (2006.01) |
| ***B65H 43/04*** | (2006.01) |
| ***B65H 45/14*** | (2006.01) |
| ***B65H 45/18*** | (2006.01) |
| ***B65H 45/30*** | (2006.01) |
| ***B65H 83/02*** | (2006.01) |

(52) U.S. Cl.

CPC ................ *B65H 2301/4214* (2013.01); *B65H 2301/44322* (2013.01); *B65H 2301/4472* (2013.01); *B65H 2301/4473* (2013.01); *B65H 2404/2614* (2013.01); *B65H 2511/16* (2013.01); *B65H 2511/24* (2013.01); *B65H 2511/413* (2013.01); *B65H 2511/51* (2013.01); *B65H 2511/514* (2013.01); *B65H 2553/42* (2013.01); *B65H 2553/46* (2013.01); *B65H 2701/1321* (2013.01); *B65H 2701/1322* (2013.01)

(56) References Cited

U.S. PATENT DOCUMENTS

| | | | | |
|---|---|---|---|---|
| 6,095,512 | A * | 8/2000 | Vijuk | B65H 43/00 493/416 |
| 6,349,938 | B1 † | 2/2002 | Kubacki | |
| 6,386,537 | B1 † | 5/2002 | Howard | |
| 7,175,586 | B2 * | 2/2007 | Mattila | B65H 45/12 493/434 |
| 7,247,130 | B2 * | 7/2007 | Mattila | B42C 9/0081 493/379 |
| 7,896,796 | B2 * | 3/2011 | Mattila | B65H 45/12 493/434 |
| 7,900,913 | B2 * | 3/2011 | Katou | B65H 7/08 271/259 |
| 8,348,264 | B2 * | 1/2013 | Krucinski | B65H 9/106 271/227 |
| 8,494,431 | B2 * | 7/2013 | deJong | G03G 15/6564 399/388 |
| 10,173,439 | B2 * | 1/2019 | Ziegenbalg | B41F 21/00 |
| 11,325,805 | B2 * | 5/2022 | Takahashi | B41L 43/12 |
| 2008/0095560 | A1 * | 4/2008 | Larson | G03G 15/6561 399/394 |
| 2009/0066016 | A1 * | 3/2009 | Kato | B65H 9/006 271/227 |
| 2011/0084441 | A1 * | 4/2011 | deJong | B65H 9/20 271/227 |
| 2011/0097125 | A1 * | 4/2011 | deJong | G03G 15/6564 399/394 |
| 2021/0245982 | A1 * | 8/2021 | Kobayashi | B65H 31/02 |

* cited by examiner
† cited by third party

INFORMATION ITEM FORMING MACHINE WITH VISUAL INSPECTION UNIT AND METHOD FOR FORMING AND SORTING INFORMATIONAL ITEMS

CROSS REFERENCE TO RELATED PATENT APPLICATIONS

This application is a continuation of U.S. patent application Ser. No. 14/204,579 filed Mar. 11, 2014, which claims priority to U.S. Provisional Patent Application No. 61/798,647, filed Mar. 15, 2013, the entire contents of which are incorporated herein by reference.

FIELD OF THE DISCLOSURE

The present invention is generally directed to forming informational items such as outserts and, more particularly, to a machine and method for forming and sorting the informational items.

BACKGROUND

An outsert is an informational item formed from a sheet of paper which is folded in two perpendicular directions. The sheet of paper has information printed thereon, which is typically information relating to a pharmaceutical product or drug. The outsert may be adhesively attached to the top or side of a pharmaceutical container, such as a bottle of pills. Alternatively, the outsert may be inserted loosely into a cardboard box in which a pharmaceutical container is disposed. After purchase of the pharmaceutical product by a consumer, the outsert may be unfolded so that the consumer may read the information printed thereon.

There are a number of patents which disclose methods of forming outserts and machines that may be used in connection with the formation of outserts. For example, U.S. Pat. No. 4,616,815 to Michael Vijuk discloses an automatic stacking and folding apparatus. U.S. Pat. No. 4,812,195 to Michael Vijuk discloses various methods and apparatus for forming outserts. U.S. Pat. No. 4,817,931 to Robert Vijuk discloses a method and apparatus for forming a folded leaflet. U.S. Pat. No. 5,044,873 to Michael Vijuk discloses an apparatus for stacking folded sheets on edge. U.S. Pat. Nos. 5,458,374, 5,813,700 and 5,909,899 disclose various methods of forming outserts.

SUMMARY

In one aspect, the present disclosure provides an apparatus for forming and sorting informational items having product information printed thereon. The apparatus comprises at least one folding unit, a conveyor belt, a camera, a controller, and a diverter assembly. The at least one folding unit forms a folded article from a sheet of paper having information printed thereon. The conveyor belt is for transporting the folded article away from the folding unit. The camera is disposed adjacent the conveyor belt for and downstream from the folding unit for capturing an image of the folded article as the folded article passes by the camera. The controller is operatively coupled to the camera for receiving and processing the image of the folded article. The diverter assembly is disposed adjacent to the conveyor belt and downstream from the camera. The diverter assembly is operatively coupled to the controller and comprises a diverter arm that is movable to cause the folded article to move off of the conveyor belt when the controller determines that the folded article fails to satisfy at least one predetermined criteria.

In one aspect, a sensor can be disposed adjacent the conveyor belt and upstream from the camera, wherein the sensor is operatively coupled to the controller for detecting the passage of the folded article.

In one aspect, the sensor can comprise a photosensor.

In one aspect, the controller comprises a processor for processing data retrieved from the image to derive processed data and a memory storing target data, against which the processor compares the processed data to determine if the folded article satisfies the at least one predetermined criteria.

In one ascpect, the apparatus can further comprise logic implemented by the processor for processing the image data and determining whether the folded article satisfied the at least one predetermined criteria.

In one aspect, the diverter assembly can further comprise a pneumatic cylinder operatively coupled to the diverter arm, wherein the pneumatic cylinder is operatively coupled to the controller such that the controller may activate the pneumatic cylinder to move the diverter arm to cause the folded article to move off of the conveyor belt.

In one aspect, the apparatus can further comprise a light source disposed opposite the conveyor belt from the camera.

In one aspect, the apparatus can further comprise a bonding unit disposed downstream of the diverter assembly for bonding the folded article when the controller determines that the folded article satisfies the at least one criteria.

In one aspect, the apparatus can further comprise a stacking unit disposed downstream of the diverter assembly for stacking the folded article with other like folded articles when the controller determines that the folded article satisfies the at least one predetermined criteria.

In another aspect, the present disclosure provides a method of forming and sorting informational items having product information printed thereon. The method comprises folding a sheet of paper having product information printed thereon by making a plurality of folds in said sheet of paper to form a folded article. The method also comprises conveying the folded article on a conveyor belt passed the camera. Additionally, the method comprises capturing an image of the folded article with the camera as it passes on the conveyor belt. Also, the method comprises processing data retrieved from the image. Furthermore, the method comprises determining if the folded article satisfies at least on predetermined criteria based on the processed data.

In one aspect, the method can further comprise detecting the presence of the folded article on the conveyor belt with a photosensor before capturing the image.

In one aspect, the method can further comprise diverting the folded article off of the conveyor belt when it is determined that the folded article does not satisfy the at least one predetermined criteria.

In one aspect, diverting the folded article can comprise actuating a diverter assembly located down stream of the camera such that a diverter arm engages the folded article and causes the folded article to move off of the conveyor belt.

In on aspect, determining if the folded article satisfies the at least one predetermined criteria can comprise comparing the data retrieved from the image to target data stored in a memory device.

In one aspect, processing the date retrieved from the image can comprise identifying the edges of the folded article.

In one aspect, processing the data retrieved form the image can further comprise calculating an angle between two or more intersecting edges of the folded article.

In one aspect, capturing the image can comprise capturing a digital image with a pixelated digital imaging sensor.

In yet another aspect, the present disclosure provides a method of forming and sorting informational items having product information printed thereon. The method comprises folding a sheet of paper having product information printed thereon by making a plurality of folds in said sheet of paper to form a folded article. Moreover, the method comprises conveying the folded article on a conveyor belt. Also, the method comprises determining if the folded article satisfies at least one predetermined criteria. Furthermore, the method comprises diverting the folded article off of the conveyor belt when it is determined that the folded article does not satisfy the at least one predetermined criteria.

In one aspect, diverting the folded article off of the conveyor belt can comprise actuating a diverter assembly located adjacent to the conveyor belt to move a diverter arm into engagement with the folded article.

In one aspect, the method can further comprise capturing an image of the folded article with a camera as it moves on the conveyor belt, and processing data retrieved from the image to determine if the folded article satisfies the at least one predetermined criteria.

In one aspect, processing the data can comprise comparing the data to target data stored in a memory device.

In one aspect, processing the data can comprise identifying edges of the folded article.

In one aspect, processing the data can comprise calculating an angle between two or more edges of the folded article.

In one aspect, the method can further comprise detecting the presence of the folded article on the conveyor belt with a photosensor prior to capturing the image.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
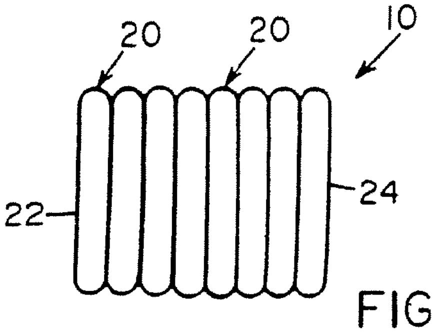
FIG. 1 is a side view of a stack of informational items bonded together.

FIG. 1 is a side view of a stack 10 of informational items 20 bonded together, such as by an adhesive. Referring to FIG. 1, each of the informational items 20 may have a first face 22 and a second face 24 opposite the first face 22. Each of the informational items 20 may have detailed information printed thereon, which printed information typically relates to one or more pharmaceutical products or drugs.

The informational items 20 may be bonded together via an adhesive disposed between adjacent faces 22, 24 of adjacent informational items 20. The informational items 20 may be bonded together via an adhesive that allows one of the informational items 20 to be manually removed from the stack 10 so that the removed informational item 20 can be inserted into a box or carton containing a pharmaceutical item or drug.

The adhesive, which may be a cold adhesive or a hot-melt adhesive, may be selected so as to allow easy removal of one of the informational items 20 from the stack without tearing or otherwise damaging the removed informational item 20 or the remaining informational items 20 of the stack 10. One adhesive that may be used is a cold glue adhesive, GMS Part No. GLUE-23704, which is commercially available from Graphic Machinery & Systems of San Rafael, California That adhesive is also marketed by its manufacturer as Capitol Latex Adhesive L179.

Each of the informational items 20 can be provided in the form of an outsert, or each of the informational items 20 can be provided in the form of a booklet, which may be provided in unfolded form or folded form. As used herein, the term "outsert" generally means an informational item which is folded from a sheet of paper and which can be later unfolded to read information printed on the sheet of paper. As used herein, the term "booklet" generally means an informational item having a plurality of pages which are bonded or otherwise connected together along one edge. A booklet may be an unfolded booklet or a folded booklet, as described below.

Methods of Forming Outserts

Figure 2:
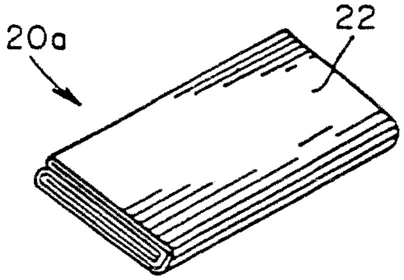
FIG. 2 is a perspective view of one embodiment of one of the informational items of FIG. 1.

FIG. 2 is a perspective view of an outsert 20*a* which may be included as part of the stack 10 of informational items 20, and FIGS. 2A-2E illustrate a method of forming the outsert 20*a*.

Figure 2A:
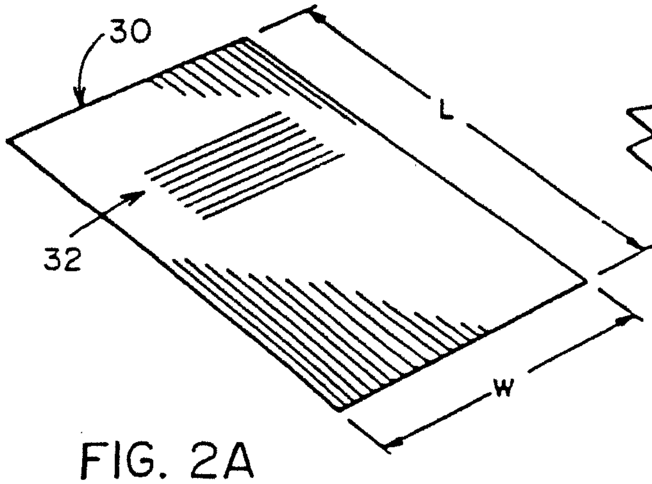
FIGS. 2A-2E illustrate the manner in which the informational item of FIG. 2 is formed.
Figure 2B:
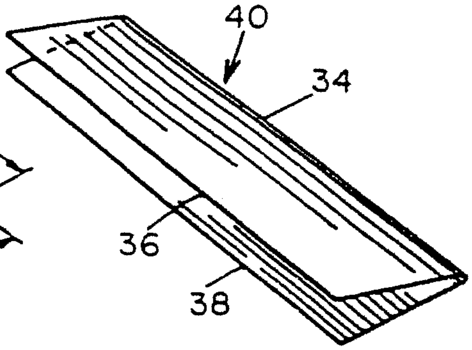

Referring to FIG. 2A, the outsert 20*a* may be formed from a sheet 30 of paper having information 32 printed thereon. The sheet 30 may have a length L and a width W. Referring to FIG. 2B, the sheet 30 may be folded in a direction parallel to its length, such as by folding the sheet 30 in half, so that the sheet may have a fold or folded edge 34 that is parallel to its length and a pair of unfolded edges 36, 38 parallel to its length. One or more additional folds (not shown) may be made in a direction parallel to the length of the sheet 30. As a result of making such fold(s) in the direction parallel to the length of the sheet 30, a folded article 40 having a length and a width is formed.

Figure 2C:
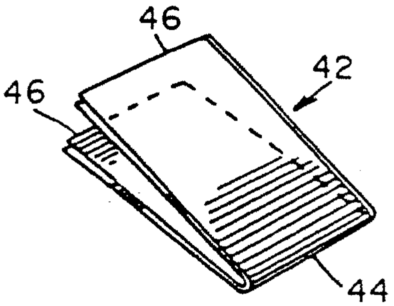

Referring to FIG. 2C, the folded article 40 shown in FIG. 2B may then be folded in a direction parallel to the width of the folded article 40 and perpendicular to its length to form a folded article 42 having a first end composed of a fold or folded edge 44 and a second end composed of a plurality of unfolded sheet edges 46.

Figure 2D:
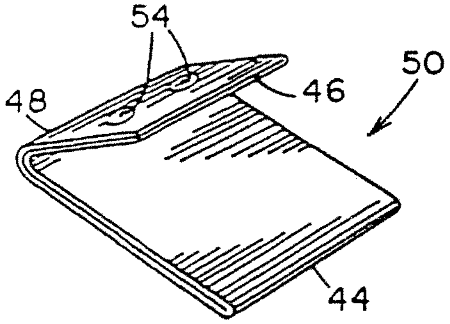

Referring to FIG. 2D, the folded article 42 shown in FIG. 2C may then be folded again by making a fold 48 in the same direction as the fold 44 made in FIG. 2C to form a folded article 50. The folded article 50 may have a first end that is composed of the folded edge 44 and a second end composed of the fold or folded edge 48. The fold 48 of FIG. 2D may be made so that the unfolded sheet edges 46 are disposed between the two folded edges 44, 48. One or more drops 54 of adhesive may be applied to a sheet portion of the folded article 50.

Figure 2E:
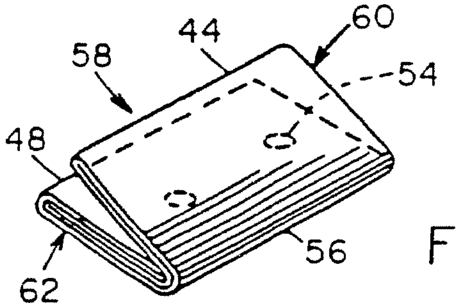

Referring to FIG. 2E, the folded article 50 shown in FIG. 2D may then be folded again by making a fold 56 in the same direction to form a folded article 58, with the unfolded sheet edges 46 being enclosed within the folded article 58. The fold 56 may be made at a point along the folded article 50 so that the folded edges 44, 48 are disposed directly adjacent each other. The folded article 58 may have an upper portion 60 composed of a plurality of sheet thicknesses and a lower portion 62 composed of a plurality of sheet thicknesses. When the upper portion 60 makes contact with the adhesive 54 disposed on the lower portion 62, the adhesive 54 bonds the upper and lower portions 60, 62 together to form the substantially closed outsert 20*a* shown in FIG. 2 having no exterior unfolded sheet edges that lie in a direction parallel to the fold 56.

Figure 3:
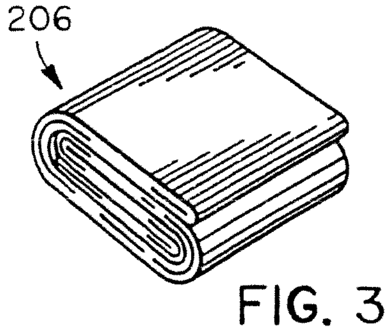
FIG. 3 is a perspective view of another embodiment of one of the informational items of FIG. 1.

FIG. 3 is a perspective view of an outsert 20*b* which may be included as part of the stack 10 of informational items 20, and FIGS. 3A-3J illustrate a method of forming the outsert 20*b*.

Figure 3A:
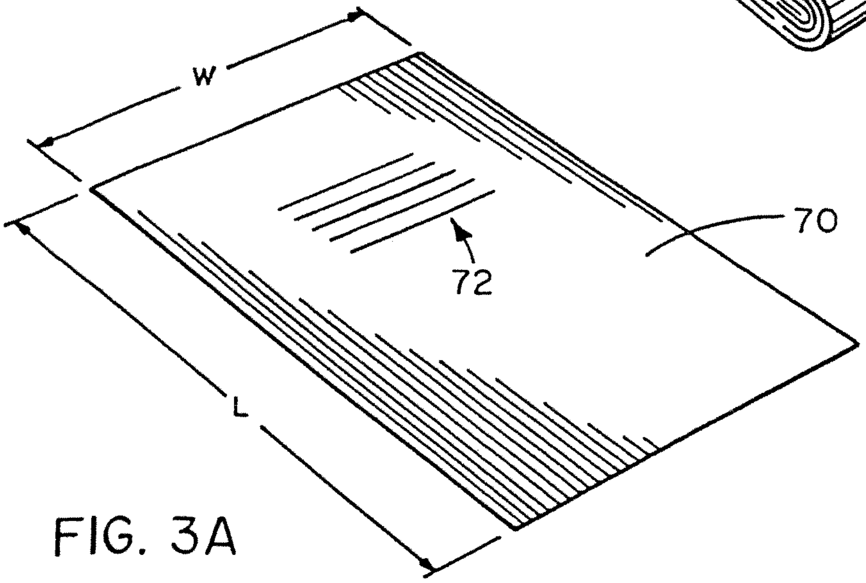
FIGS. 3A-3J illustrate the manner in which the informational item of FIG. 3 is formed.
Figure 3C:
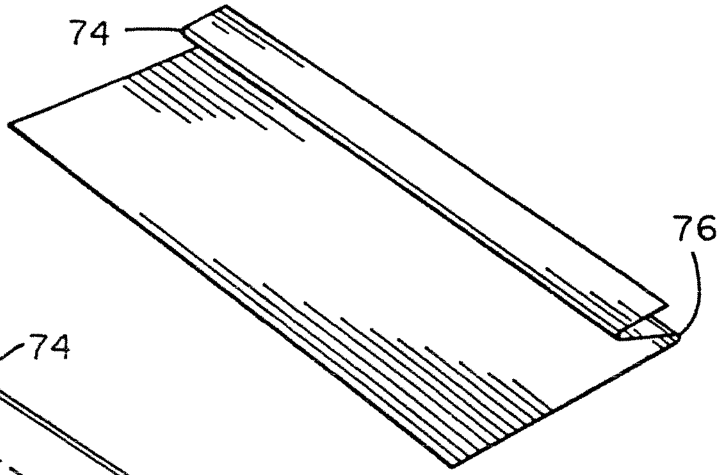
Figure 3B:
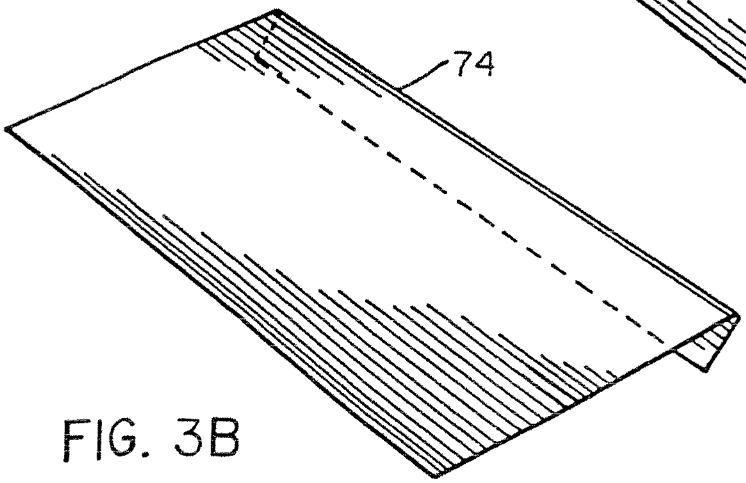
Figure 3E:
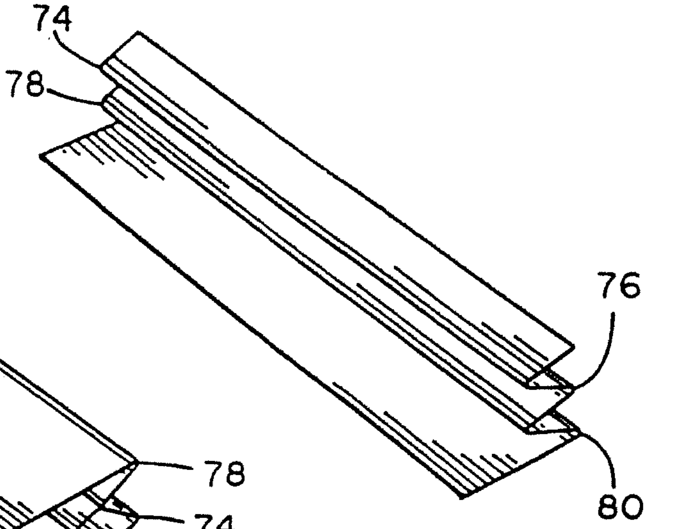
Figure 3D:
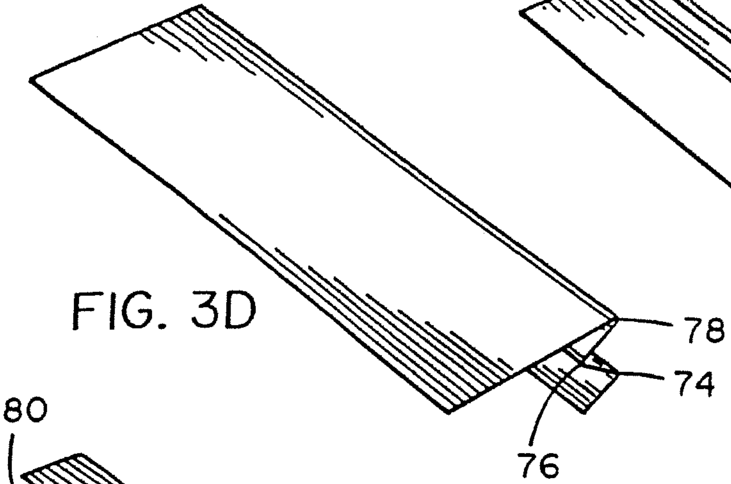

Referring to FIG. 3A, the outsert 20*b* may be formed from a sheet 70 of paper having information 72 printed thereon. The sheet 70 may have a length L and a width W. Referring to FIGS. 3B-3F, a plurality of folds 74, 76, 78, 80, 82 may be made in the sheet 70 in a direction parallel to its length to form a folded article 84 shown in FIG. 3F having a length and a width. Although the folds 74, 76, 78, 80, 82 are shown to be alternating or accordion-type folds, the folds could be made in other ways, such as by successively folding the sheet 70 in half.

Figure 3F:
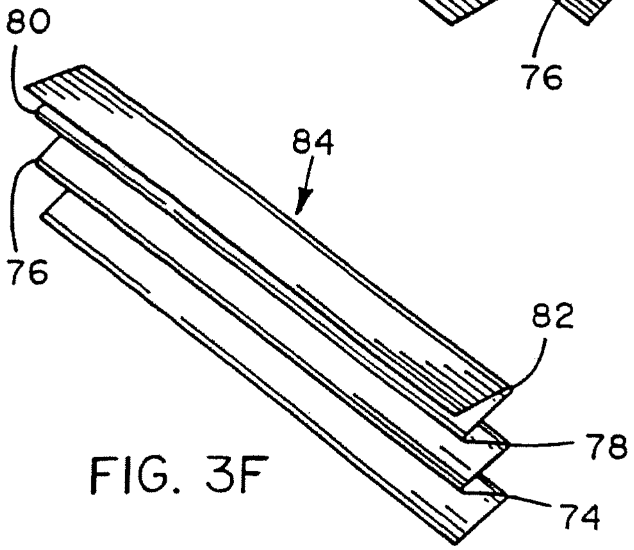
Figure 3H:
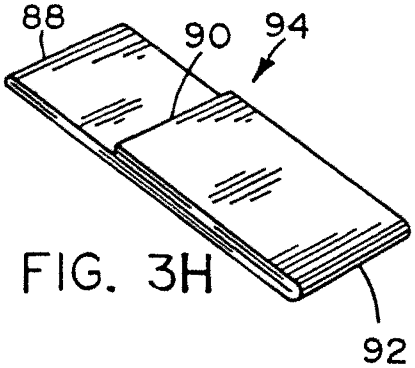
Figure 3I:
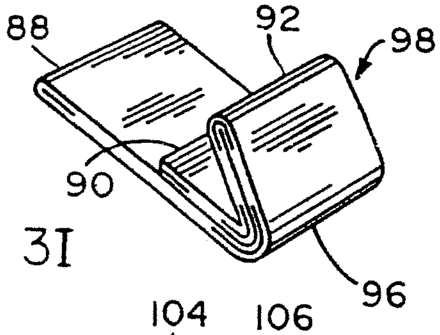
Figure 3G:
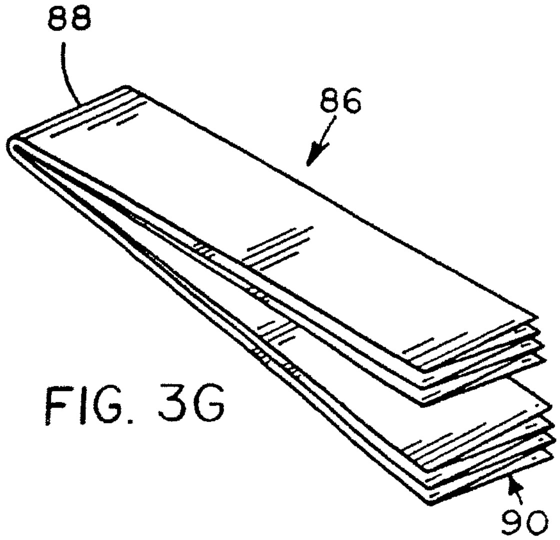

Referring to FIG. 3G, the folded article 84 shown in FIG. 3F may then be folded in a direction parallel to the width of the folded article 84 and perpendicular to its length to form a folded article 86 having a first end that is composed of a fold or folded edge 88 and a second end composed of a plurality of unfolded sheet edges 90.

Referring to FIG. 3H, the folded article 86 shown in FIG. 3F may then be folded again by making a fold 92 in the same direction as the fold 88 made in FIG. 3G to form a folded article 94. The folded article 94 may have a first end composed of the folded edge 88 and a second end composed of the fold or folded edge 92. The fold 92 of FIG. 3H may be made so that the unfolded sheet edges 90 are disposed between the two folded edges 88, 92.

Referring to FIG. 3I, the folded article 94 shown in FIG. 3H may then be folded again by making a fold 96 in a direction parallel to the fold 92 to form a folded article 98. The fold 96 may be made so that the fold 92 is generally coincident with the unfolded end 90. One or more drops of adhesive 100 (see FIG. 3J) may be applied to the folded article 98.

Figure 3J:
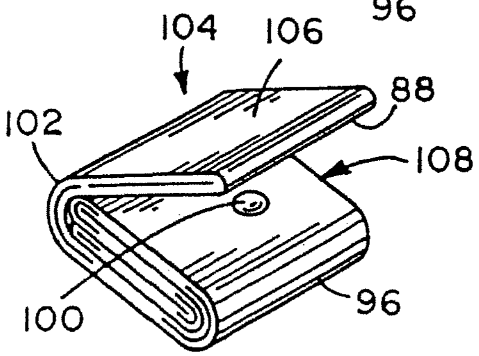

Referring to FIG. 3J, the folded article 98 shown in FIG. 3I may then be folded again by making a fold 102 in the same direction to form a folded article 104. The fold 102 may be made at a point along the folded article 98 so that the folded edges 88, 96 are disposed directly adjacent each other. The folded article 104 may have an upper portion 106 composed of a plurality of sheet thicknesses and a lower portion 108 composed of a plurality of sheet thicknesses. When the upper portion 106 makes contact with the adhesive 100 disposed on the lower portion 108, the adhesive 100 bonds the upper and lower portions 106, 108 together to form the substantially closed outsert 20*b* shown in FIG. 3 having no exterior unfolded sheet edges that lie in a direction parallel to the fold 102.

While various methods of forming outserts are described above, it should be understood that other methods of forming outserts could be utilized, such as those disclosed in U.S. Pat. No. 4,817,931 to Vijuk and U.S. Pat. No. 5,813,700 to Vijuk, et al., which are incorporated by reference herein.

Methods of Forming Booklets

Figure 4A:
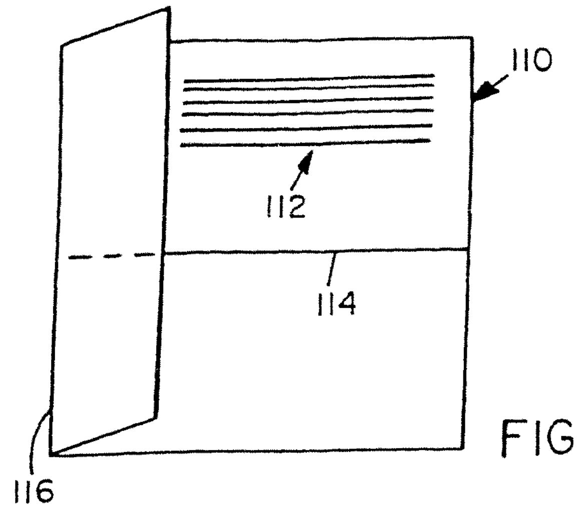
FIGS. 4A-4H illustrate a manner of forming several additional embodiments of the informational items of FIG. 1.

FIGS. 4A-4F illustrate a method of forming a booklet 20*c* (FIG. 4F) which may be included as one of the informational items 20 in the stack 10 of FIG. 1. Referring to FIG. 4A, the booklet 20*c* may be formed from a sheet of paper 110 having information 112 printed thereon. A portion of an adhesive 114 may be applied across the sheet 110 in a generally linear direction, and then a fold 116 may be made in the sheet 110 in a direction perpendicular to the adhesive 114.

Figure 4D:
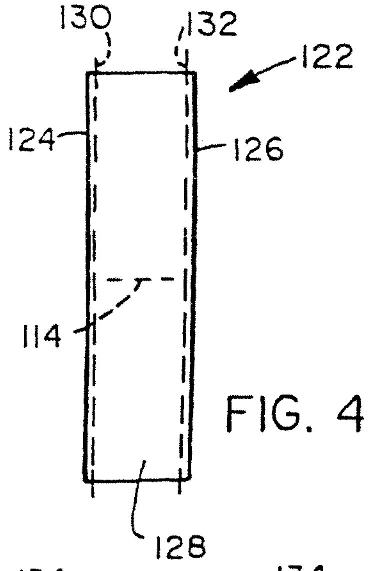
Figure 4B:
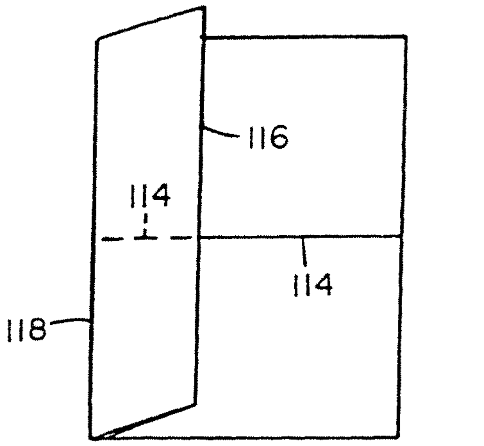
Figure 4E:
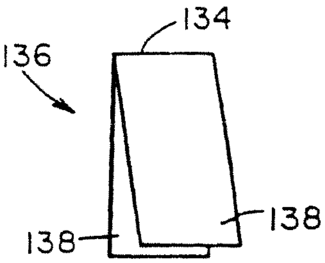
Figure 4F:
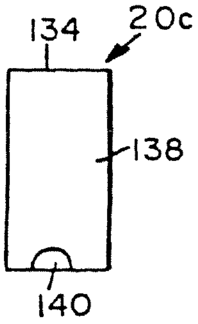
Figure 4G:
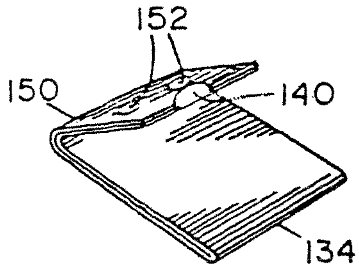
Figure 4C:
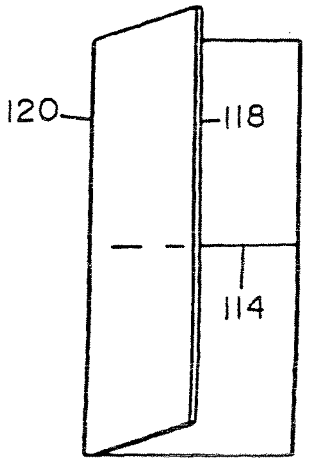

Referring to FIGS. 4B and 4C, a number of additional folds 118, 120 may be made in a direction parallel to the first fold 116 and perpendicular to the adhesive 114 to result in an article 122 shown in FIG. 4D. The article 122 may have a first side 124 and a second side 126 both of which are parallel to its length and each of which may be composed of a plurality of folds which are integral with and which join together a plurality of sheet panels 128, each of which may be bonded to at least one other sheet panel 128 via the adhesive 114. A pair of cuts or slits may then be made in the article 122 along a pair of dotted lines 130, 132 in order to remove the folds disposed along the sides 124, 126 of the article 122 and cause the sheet panels 128 to become separated so that the sheet panels 128 can be moved relative to each other like the pages of a book.

Referring to FIG. 4E, the article 122 of FIG. 4D may then be folded at a fold 134 coincident with the adhesive 114 to form an article 136 having a folded or bound edge consisting of the fold 134 and a plurality of pages or sheets 138 joined together at the bound edge 134. Referring to FIG. 4F, a closure member 140, such as a circularly shaped piece of adhesive-backed paper, may be applied to the ends of the sheets 138 opposite the bound edge 134 to form the booklet 20*c*.

Figure 4H:
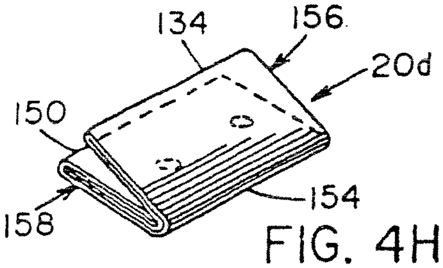

The booklet 20*c* may alternatively be provided as a folded booklet. Referring to FIG. 4G, the booklet 20*c* may be converted into a folded booklet 20*d* (FIG. 4H) by making a first fold 150 in the booklet 20*c* in a direction parallel to the bound edge 134 and by applying an adhesive 152, as shown in FIG. 4G, and then by making a second fold 154 in a direction parallel to the fold 150, as shown in FIG. 4H, so that an upper portion 156 composed of a plurality of sheets 138 is bonded to a lower portion 158 composed of a plurality of sheets 138 to form the folded booklet 20*d* having no exterior unfolded sheet edges that lie in a direction parallel to the fold 154.

While several methods of forming booklets are described above, it should be understood that other methods of forming booklets could be utilized, such as those disclosed in U.S. Ser. No. 09/326,821 filed in the U.S. Patent Office on Jun. 7, 1999, which is incorporated by reference herein.

Outsert Forming and Bonding Machine Embodiments

Figure 5A:
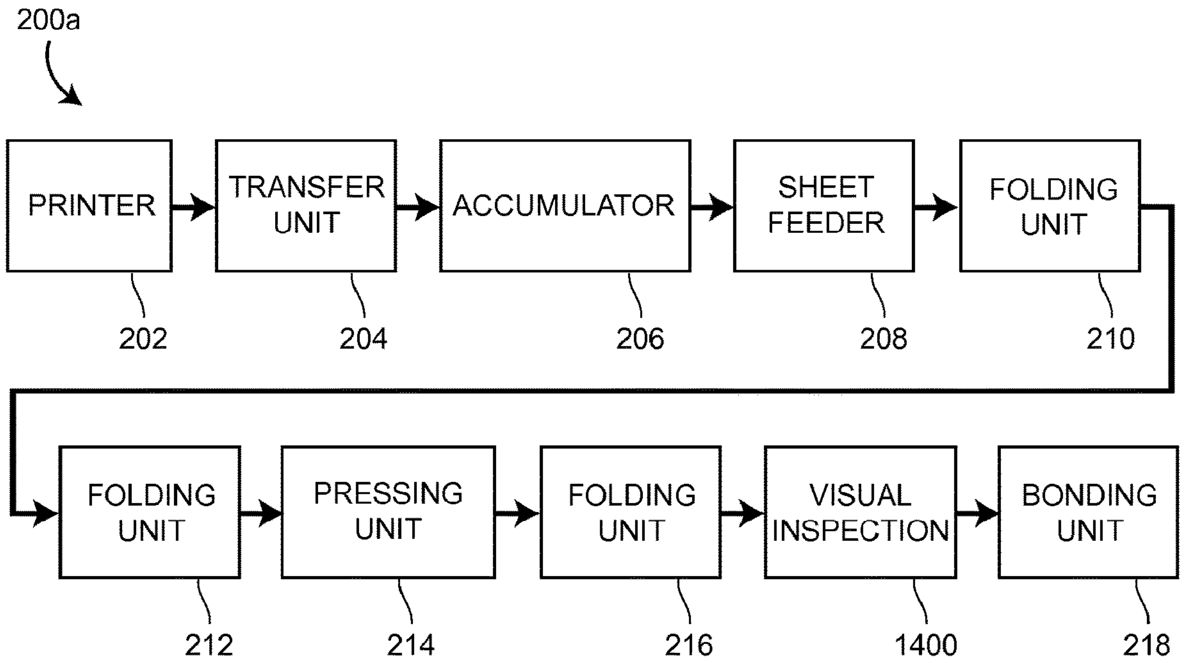
FIGS. 5A-5D are overall block diagrams of a number of different embodiments of outsert-forming machines.

FIG. 5A is a block diagram of a first embodiment of an outsert forming and bonding apparatus 200*a* that could be used to perform the outsert-forming methods described above. Referring to FIG. 5A, the apparatus 200*a* may include a printer 202, which may be in the form of a web printer that prints textual subject matter on a paper web (not shown) provided to the printer 202 and cuts the paper web into individual sheets after it is printed. The printer 202, which may also make one or more folds in the individual sheets, produces a stream of printed sheets which may be provided to a sheet transfer unit 204. The stream of sheets may be in the form of a shingled stream, in which case the sheets are overlapping each other in a conventional manner. Each of the sheets in the stream may be unfolded, or may have one or more folds formed therein.

The transfer unit 204 may act to transfer the sheets to an accumulator station 206, at which the sheets may temporarily accumulate in a stack of sheets, before being provided by an automatic sheet feeder 208 to a folding unit 210 that may make a plurality of folds in a first direction. The accumulator station 206 may be designed to accumulate sheets due to differences in the sheet processing capacity between the printer 202 and the folding unit 210. The folded articles produced by the folding unit 210 may be automatically conveyed to a folding unit 212 that may make one or more folds in a second direction perpendicular to the first direction.

The folded articles that exit from the folding unit 212 may be passed through a pressing unit 214, such as a spring-activated press, in order to flatten the folded articles. The pressing unit 214 may cause folded articles passing therethrough to be subjected to a pressure that lies within any one of the following pressure ranges: a) 30-100 psi; b) 30-200 psi; c) 30-500 psi; d) 50-200 psi; or e) 50-500 psi. Passing folded articles through the pressing unit 214 may make it easier for subsequent folding actions to take place, or may result in better folds being formed.

After exiting the pressing unit 214, the folded articles may be transferred to a folding unit 216, such as a knife-edge folding unit, which may make a final fold in each of the folded articles, the final fold being made parallel to the folds made by the folding unit 212, to transform each of the folded articles into an outsert. The outserts formed by the folding unit 216 may be automatically conveyed to a visual inspection unit 1400. The visual inspection unit 1400 may capture a digital image of each of the outserts as they pass through or by the unit 1400. The images may be evaluated to determine whether the outserts are properly folded and for subsequent bonding and/or stacking processes. Articles that are not properly folded and oriented may be diverted into a waste container or other receptacle for the rejected outserts. The properly folded and oriented outserts may be automatically conveyed to a bonding unit 218. The bonding unit 218 may bond together the individual outserts into a plurality of stacks of outserts, such as the stack 10 shown in FIG. 1.

Transfer Unit 204

Figure 5B:
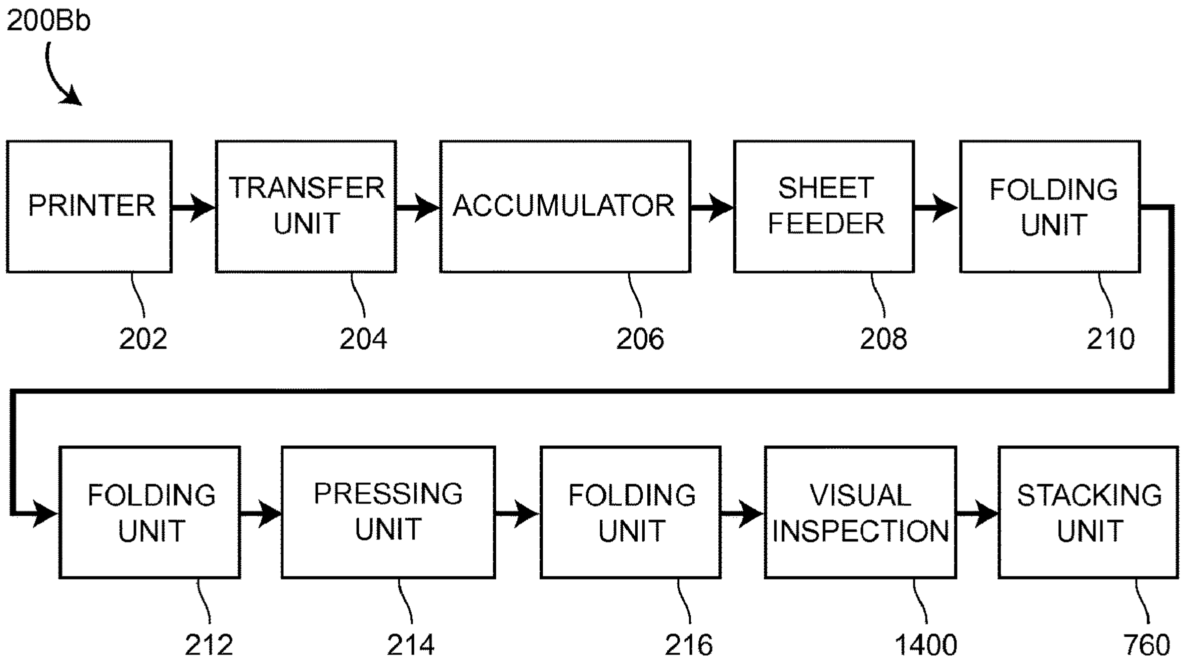
Figure 5C:
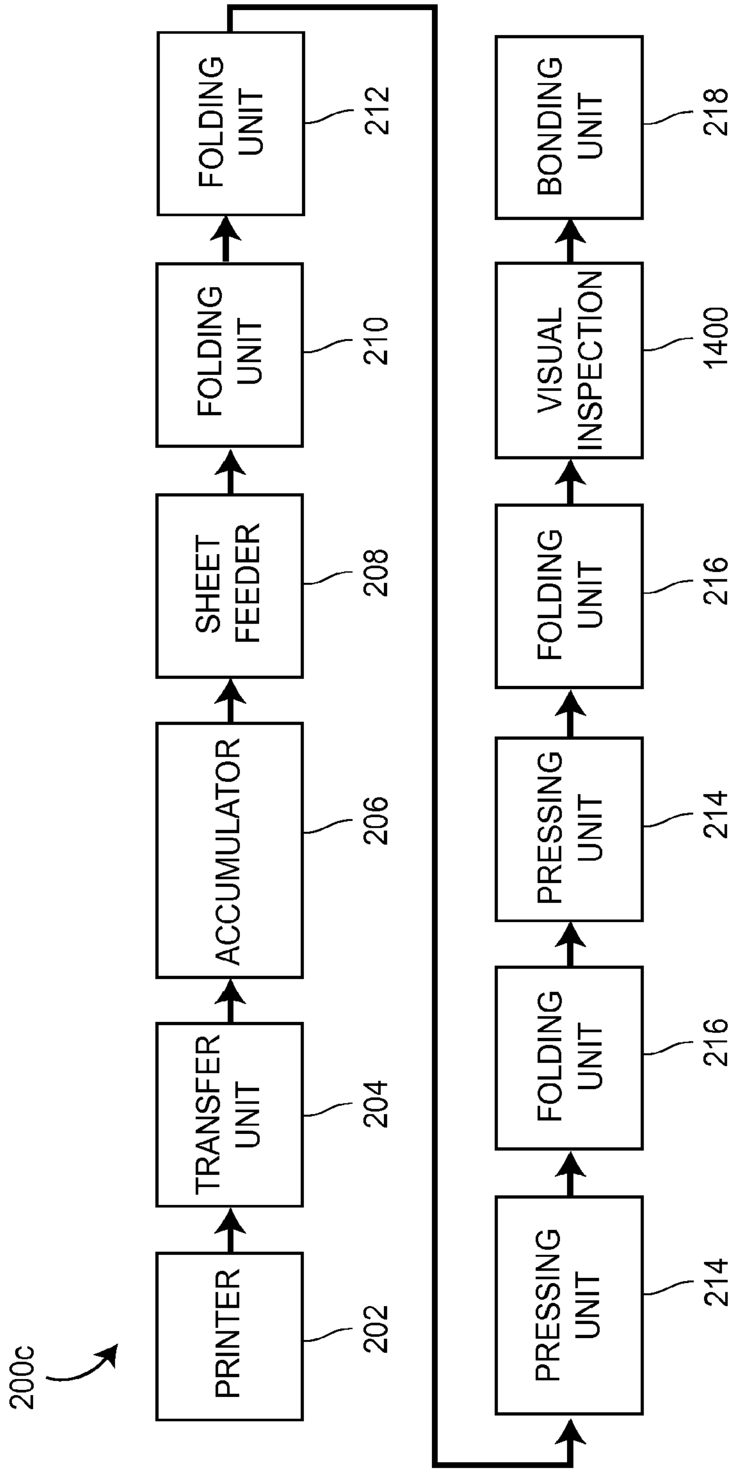
Figure 5D:
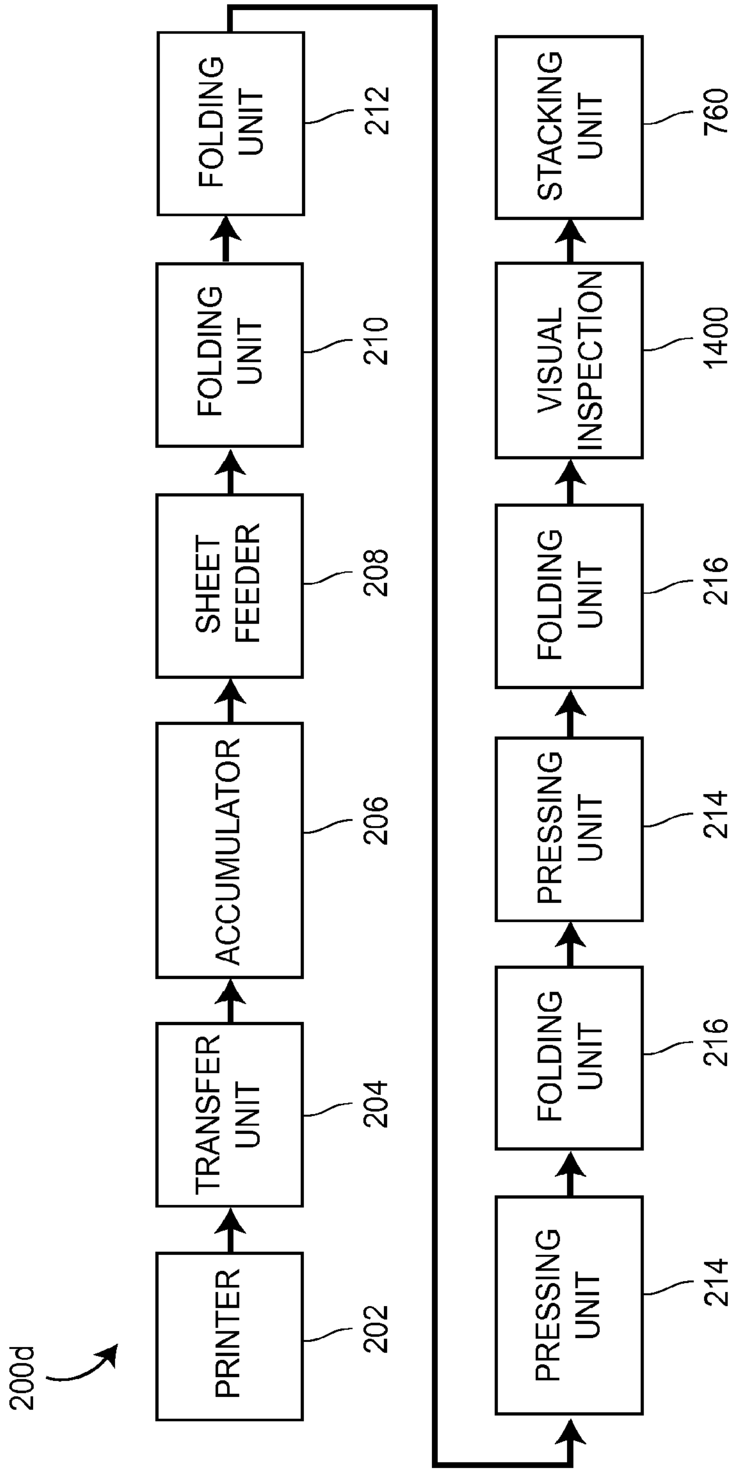
Figure 6A:
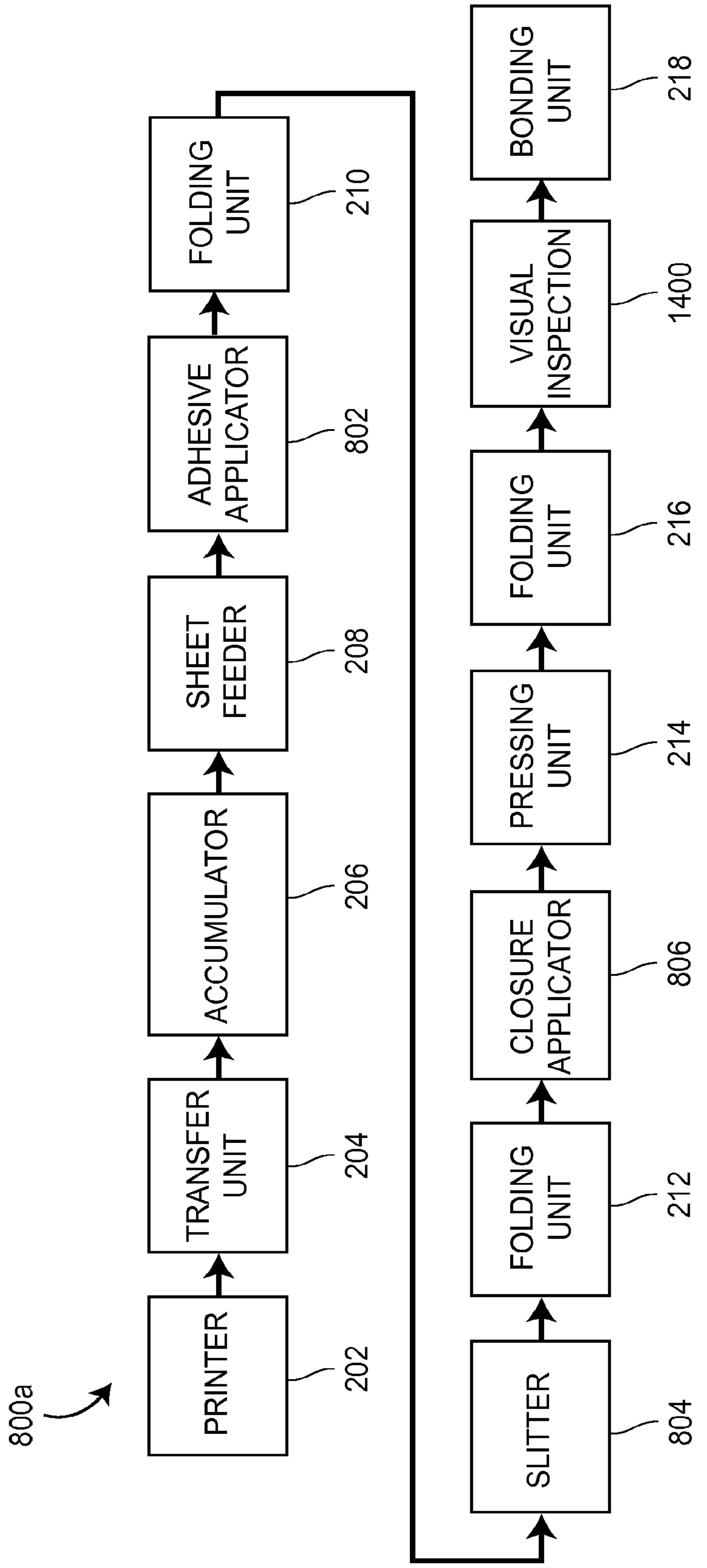
FIGS. 6A-6D are overall block diagrams of a number of different embodiments of booklet-forming machines.
Figure 6B:
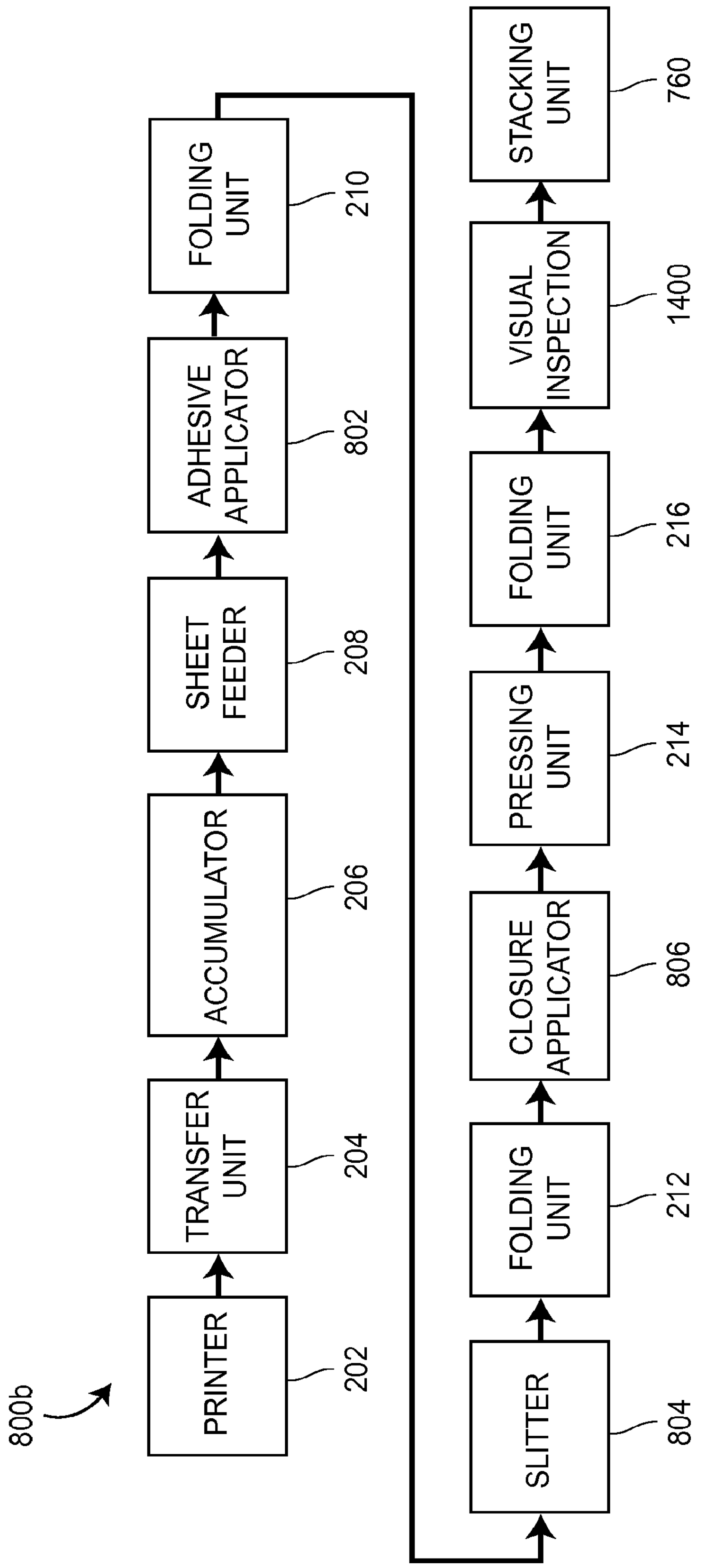
Figure 6C:
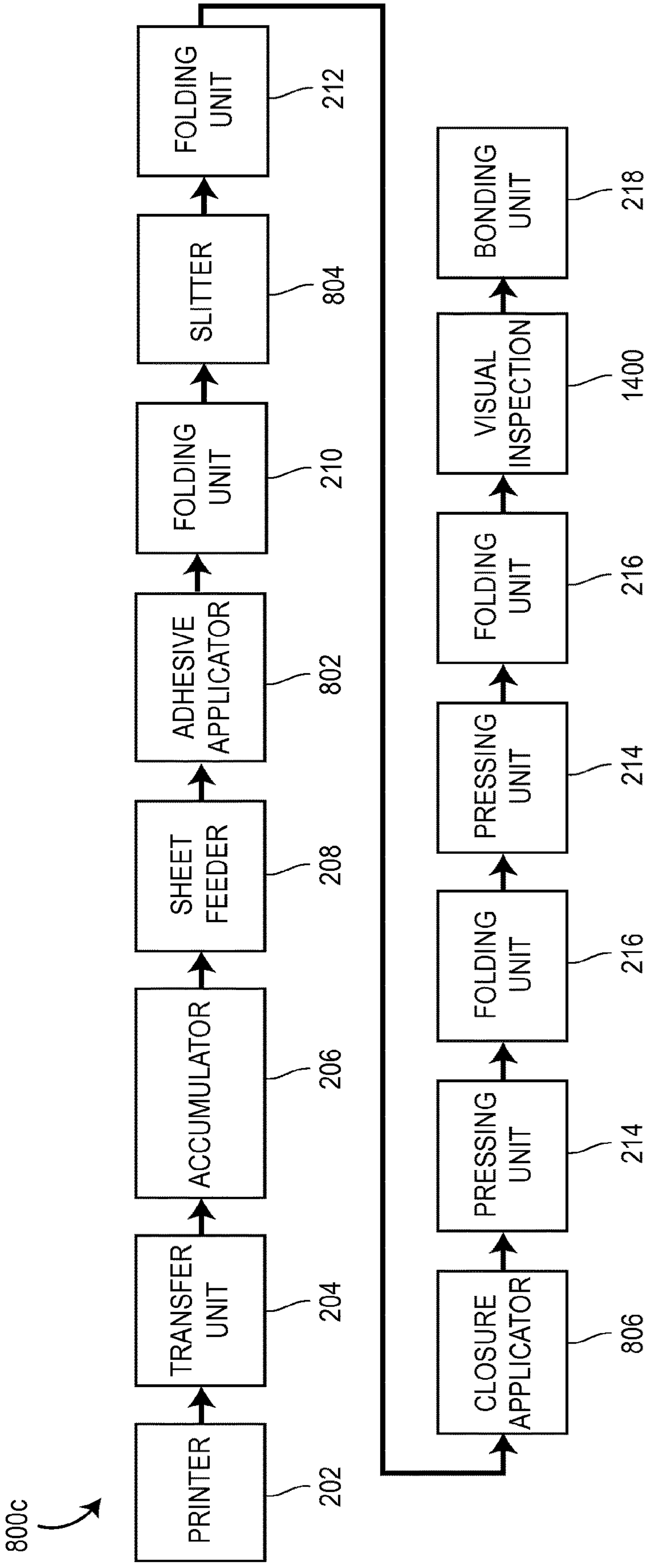
Figure 6D:
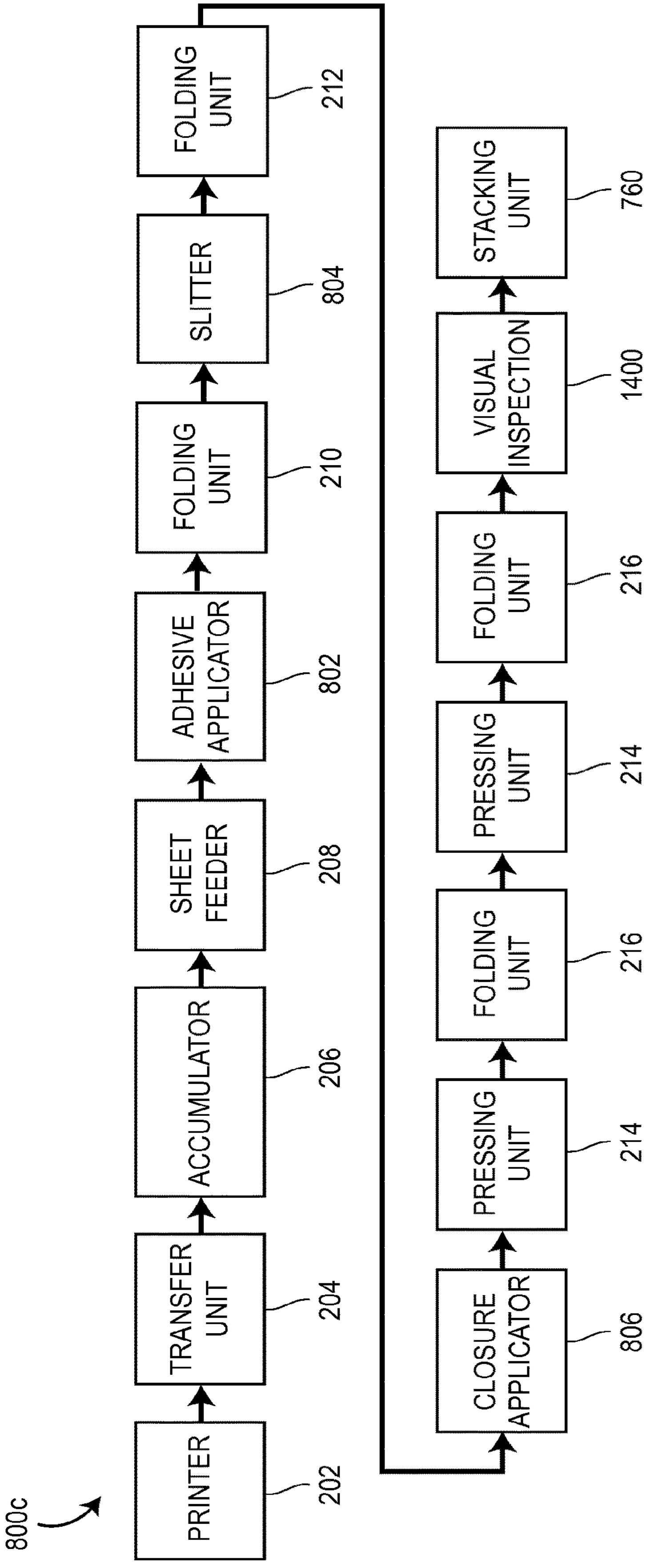
Figure 7:
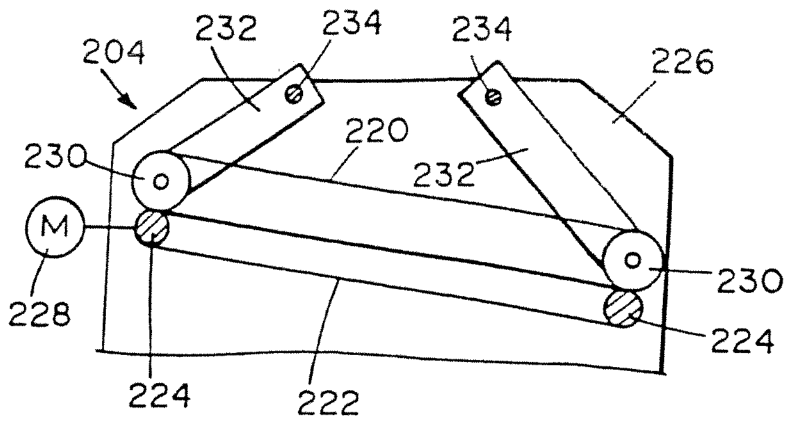
FIG. 7 is a side view of one embodiment of the transfer unit shown schematically in FIGS. 5A-5D and 6A-6D.

FIG. 7 is a side view of a portion of one possible embodiment of the sheet transfer unit 204 shown schematically in FIGS. 5A-5D and 6A-6D. Referring to FIG. 7, the transfer unit 204 may have a plurality of upper conveyor belt(s) 220 and lower conveyor belt(s) 222 between which the stream of sheets from the printer 202 passes. The lower belt(s) 222, which may be in the form of flat belt(s) composed of fabric having a non-slip coating, may be supported by a plurality of rotatable metal rods 224 supported by a pair of frame members 226 (only one of which is shown), at least one of the rods 224 being rotatably driven by a motor shown schematically at 228.

The upper belt(s) 220, which may be composed of rubber and which may have a circular cross section, may be supported by a plurality of rollers 230, each of which may be rotatably supported by a respective pivot arm 232 connected to one of a pair of pivot rods 234 supported between the frame members 226. The upper belt(s) 220 may be sized so that, when they are placed onto the rollers 230, the tension of the upper belt(s) 220 forces the pivot arms 232 downwards so that the upper belt(s) 220 and the lower belt(s) 222 make sufficiently firm contact with the stream of sheets to ensure that the sheets do not move relative to one another as they are transferred from the printer 202 to the accumulator station 206 by the transfer unit 204.

Accumulator Station 206

Figure 8A:
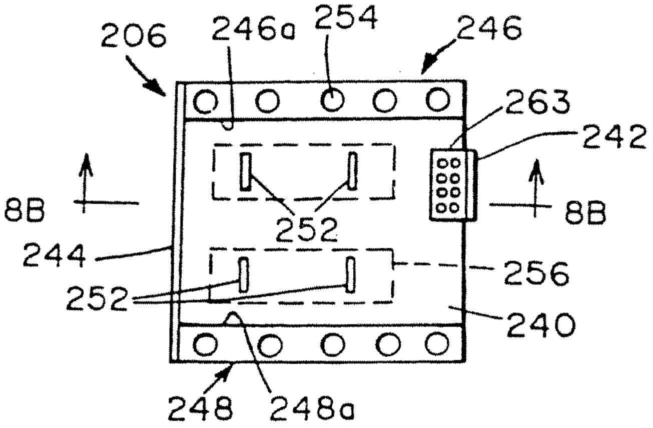
FIG. 8A is a top view of one embodiment of the accumulator station shown schematically in FIGS. 5A-5D and 6A-6D.
Figure 8B:
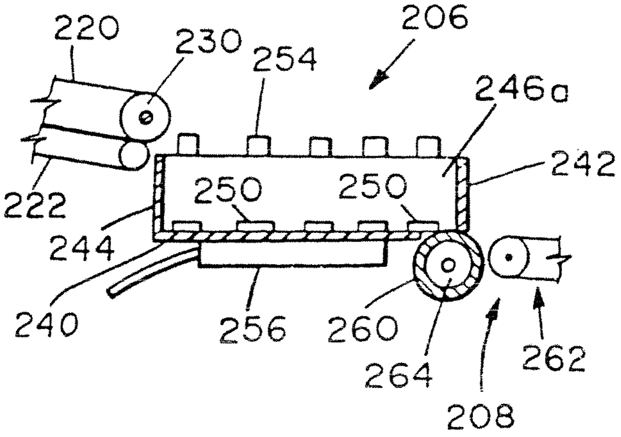
FIG. 8B is a cross-sectional side view of the accumulator station of FIG. 8A taken along lines 8B-8B of FIG. 8A.

FIGS. 8A and 8B illustrate the basic structure of one embodiment of the accumulator station 206 shown schematically in FIGS. 5A-5D and 6A-6D. Referring to FIGS. 8A and 8B, the accumulator station 206 may have a flat base plate 240, a front plate 242, a rear wall 244, and a pair of elongate hexahedral side members 246, 248 each having a respective inner side surface 246*a*, 248*a*. As shown in FIG. 8B, the upper and lower conveyor belt(s) 220, 222 of the transfer unit 204 may be positioned so as to deposit sheets into the hexahedral space defined by the base plate 240, the front plate 242, the rear wall 244, and the side surfaces 246*a*, 248*a*.

Pressurized air may be forced against the lower portion of the stack of sheets in the accumulator station 206 in a conventional manner to slightly levitate the lowermost sheets to reduce the coefficient of friction between the lowermost sheet in the stack and the base plate 240 and to provide slight physical separation between the lowermost sheets in the stack. The pressurized air may be provided by a number of apertures 250 formed in each of the inner side surfaces 246*a*, 248*a* and a number of apertures 252 formed in the base plate 240.

The side members 246, 248, which may act as pneumatic pressure manifolds, may have a hollow interior which is divided into a number of individual pressure compartments, each of which may be pneumatically coupled to a source of pressurized air (not shown) and to a respective one of the apertures 250 in the side surfaces 246*a*, 248*a*. The pressure of the air provided through each aperture 250 may be varied by a respective regulator knob 254 associated with each of the pressure compartments by an internal valve structure shown and described in U.S. Pat. No. 4,616,815 to Michael Vijuk, the disclosure of which is incorporated herein by reference.

Pressurized air may be provided to the apertures 252 formed in the base plate 240 via one or more pressure manifolds 256 disposed beneath the base plate 240. Pressurized air may also be provided through a number of apertures (not shown) formed in the rear wall 244. The particular design of the accumulator station 206 described above is not considered important to the invention, and other designs could be used. Sheet transfer units, accumulator stations, and automatic folding machines of the type described above are commercially available from Vijuk Equipment Co. of Elmhurst, Illinois Sheet Feeder 208

Figure 9A:
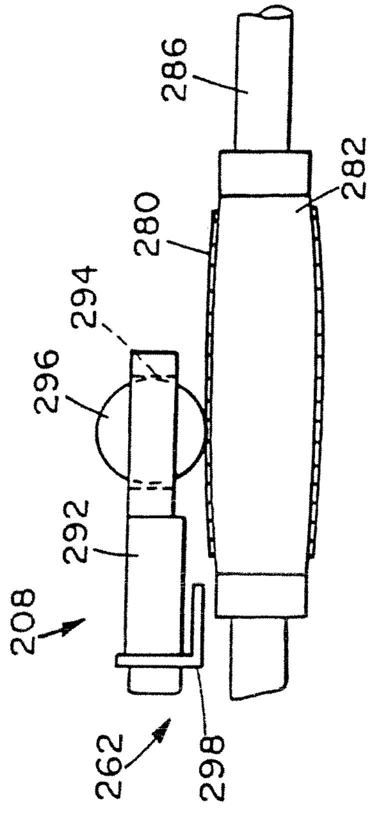
FIG. 9A is a side view of a portion of one embodiment of the sheet feeder shown schematically in FIGS. 5A-5D and 6A-6D.
Figure 9B:
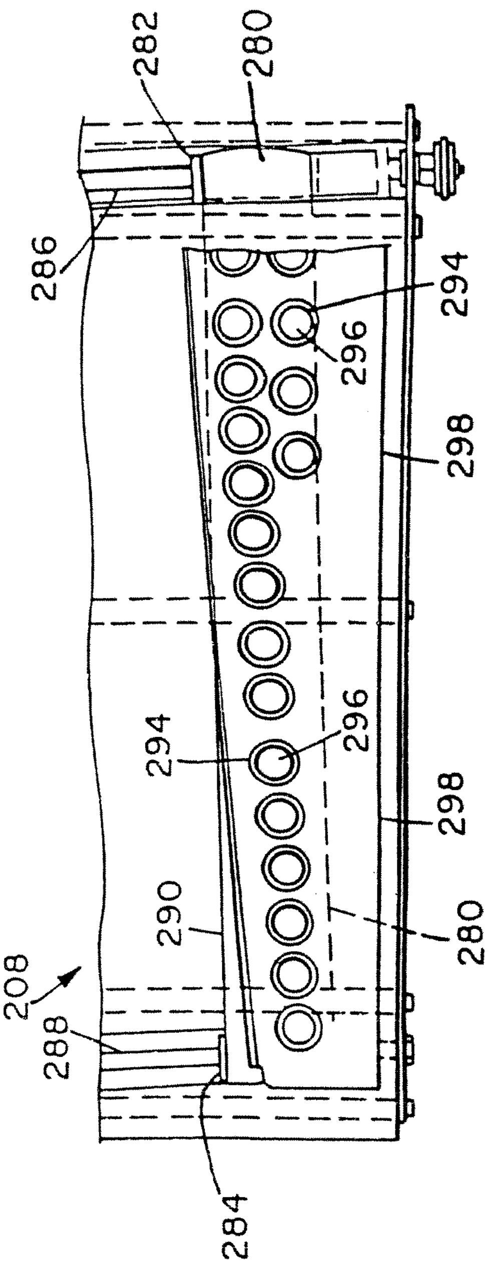
FIG. 9B is a top view of a portion of the sheet feeder of FIG. 9A.

FIGS. 8B, 9A and 9B illustrate one possible embodiment of the sheet feeder 208 shown schematically in FIGS. 5A-5D and 6A-6D. Referring to FIG. 8B, the sheet feeder 208 may have a first part in the form of a vacuum drum or roll 260 and a second part in the form of a conveyor 262. The vacuum roll 260, which may be controlled to periodically remove the lowermost sheet from the bottom of the stack of sheets, may be provided in the form of a hollow cylindrical drum having a plurality of holes formed in its cylindrical outer surface and may be positioned directly beneath a rectangular aperture 263 formed in the base plate 240. The vacuum roll 260 may have a hollow interior portion 264 in which a reduced or suction pressure may be selectively provided. To that end, the interior of the vacuum roll 260 may be pneumatically coupled to a vacuum pump (not shown) via a pneumatic line (not shown) and a pneumatic valve (not shown) adapted to selectively open and close the pneumatic line.

FIGS. 9A and 9B illustrate the structure of the conveyor 262 shown schematically in FIG. 8B. Referring to FIGS. 9A and 9B, the conveyor 262 may have a conveyor belt 280 driven by a pair of spaced rollers 282, 284 each of which may be rotatably driven by a respective drive rod 286, 288. The conveyor 262 may also include a sheet alignment mechanism 290 positioned directly over the conveyor belt 280. The alignment mechanism 290 may include a retainer arm 292 having a plurality of cylindrical bores 294 formed therein, a respective metal ball 296 disposed within each of the bores 294, and an L-shaped side guide 298 connected to the retainer arm 292.

Sheets from the accumulator station 206 may be periodically and individually fed by the vacuum roll 260 to the conveyor 262 so that they pass between the bottom of the metal balls 296 and the top of the conveyor belt 280. The weight of the metal balls 296 resting on top of the sheets may maintain the alignment of the sheets relative to the conveyor belt 280. As shown in FIG. 9B, the side guide 298 may be angled slightly relative to the conveyor belt 280. Consequently, as the sheets pass through the conveyor 262 (from right to left in FIG. 9B), the side edges of the sheets may gradually be moved against the edge of the side guide 298 to cause the side edges of the sheets to become justified or flush against the side guide 298 for proper alignment as the sheets enter the folding apparatus 210.

Further details regarding the design and operation of the accumulator 206 and sheet feeder 208 are disclosed in U.S. Pat. No. 6,095,512, which is incorporated herein by reference.

Folding Unit 210

Figure 10A:
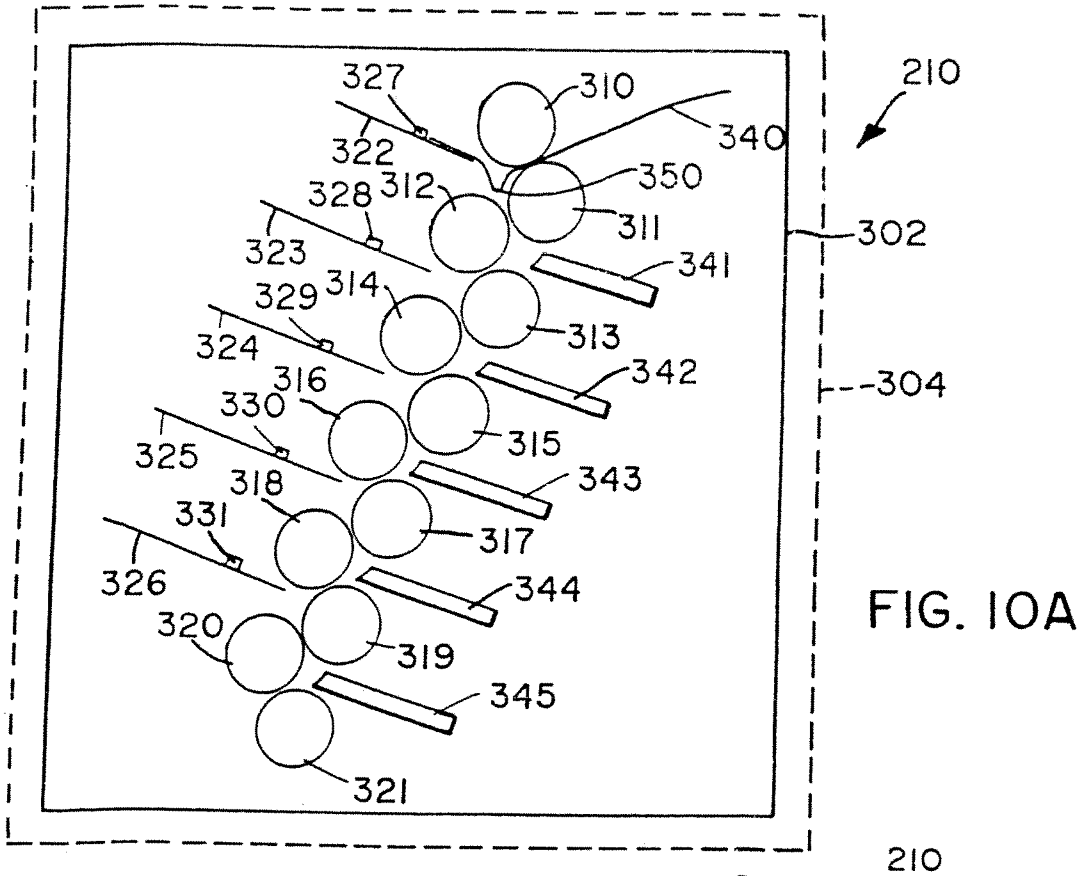
FIGS. 10A and 10B illustrate one embodiment of the folding unit 210 shown schematically in FIGS. 5A-5D and 6A-6D.
Figure 10B:
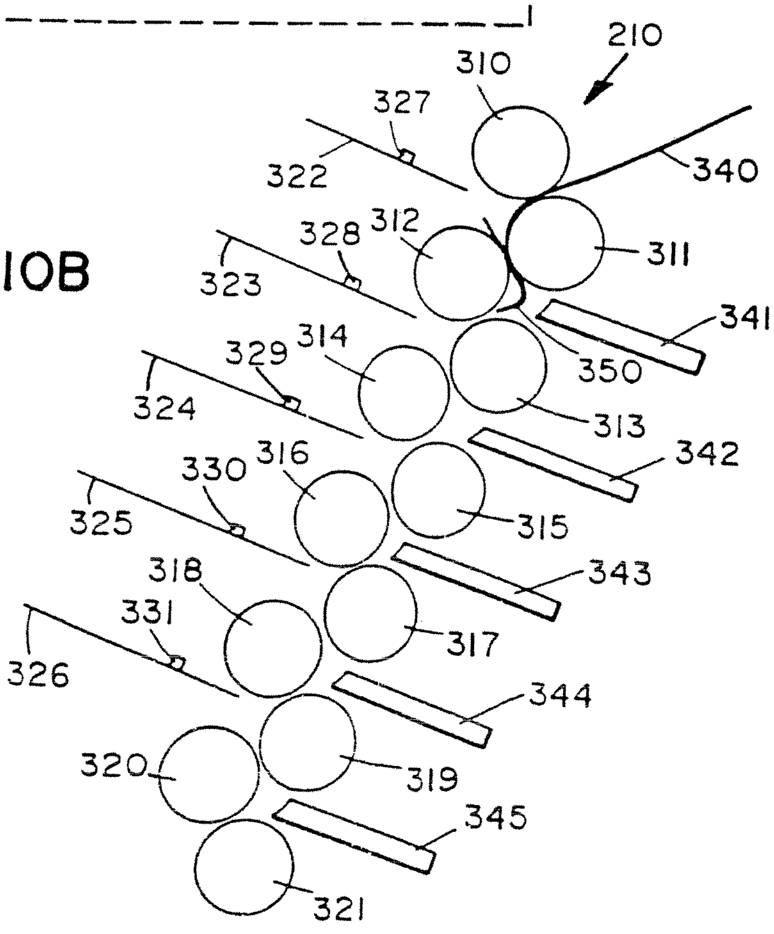

FIGS. 10A and 10B are schematic side views of one possible embodiment of the folding unit 210 shown as a block in FIGS. 5A-5D and 6A-6D. The folding unit 210 may be used to make one or more folds in an unfolded sheet of paper, all of the folds being parallel to each other. Referring to FIG. 10A, the folding unit 210 may be provided with a plurality of cylindrical folding rollers 310-321, a plurality of folding plates 322-326 each of which may be provided with one of a plurality of stops 327-331 positioned to stop the leading edge of an article 340 passing through the folding unit 210 at desired positions, and a plurality of deflectors 341-345, each of which may cause the leading edge of the article 340 passing through the folding unit 210 to be deflected towards the next pair of folding rollers. The folding rollers 310-321 may have non-smooth, knurled or abraded surfaces to facilitate gripping the article 340.

When it first enters the first folding unit 210, the article 340 shown in FIGS. 10A and 10B may correspond to an unfolded sheet of paper, such as the sheet of paper 30 shown in FIG. 2A or the sheet of paper 70 shown in FIG. 3A. When the leading edge of the article 340 hits the stop 327, an intermediate portion of the article at a point 350 may be forced downwardly towards the nip of the folding rollers 311, 312. When the point 350 passes between the folding rollers 311, 312, the article 340 may be folded at the point 350 by the folding rollers 311, 312 and then deflected by the end of the deflector 341 towards the nip of the folding rollers 312, 313, as shown in FIG. 10B.

The process may continue in a similar manner until all of the desired folds are made in the article 340. The folding unit 210 shown in FIGS. 10A and 10B would make five folds in the article 330. The number of folds and the positions at which they are made could be varied in a known manner by varying the number and/or position of the folding rollers 310-321, the folding plates 322-326 and the deflector plates 341-345.

Although a particular embodiment of the folding unit 210 is described above, numerous other embodiments and types of folding units could be utilized, and the particular type of folding unit used is not considered important to the invention.

Folding Unit 212

Figure 11A:
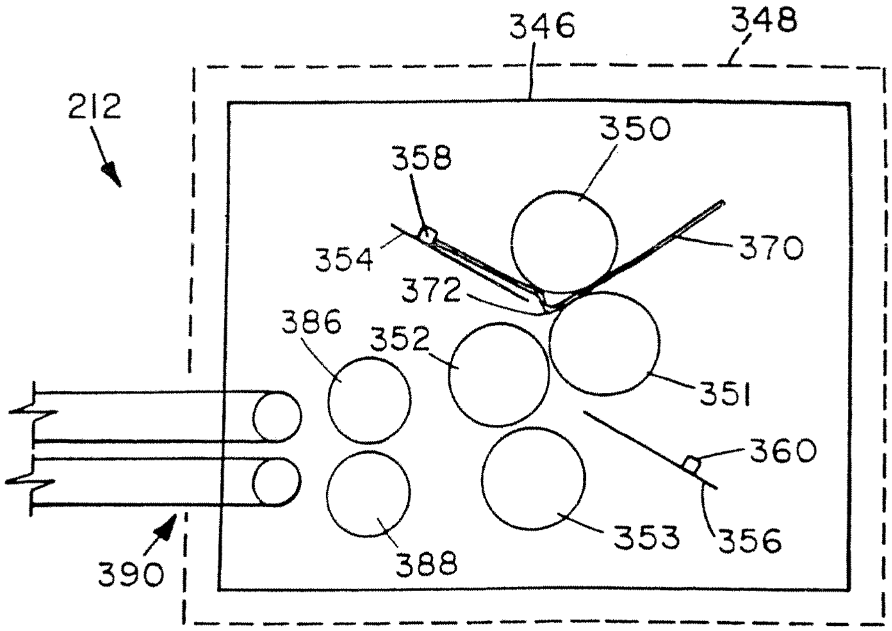
FIGS. 11A-11D illustrate one embodiment of the folding unit 212 shown schematically in FIGS. 5A-5D and 6A-6D.

FIG. 11A is a side view of a first portion of one possible embodiment of the folding unit 212 shown schematically in FIGS. 5A-5D and 6A-6D. The folding unit 212 may be used to make one or more folds in an article in a direction perpendicular to the direction in which one or more initial folds were made. Referring to FIG. 11A, the folding unit 212 may be provided with a plurality of cylindrical folding rollers 350-353, a pair of folding plates 354, 356, each of which may be provided with one of a pair of stops 358, 360 positioned to stop the leading edge of an article 370 passing through the folding unit 212 at desired positions.

Figure 11B:
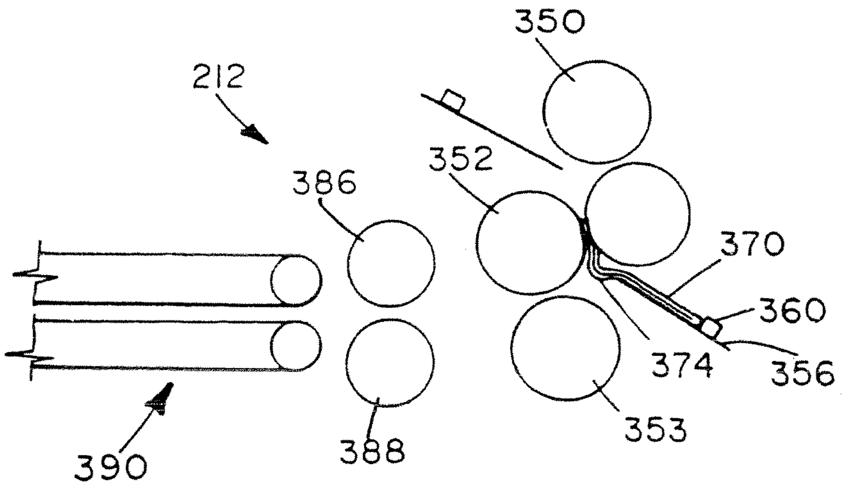
Figure 11C:
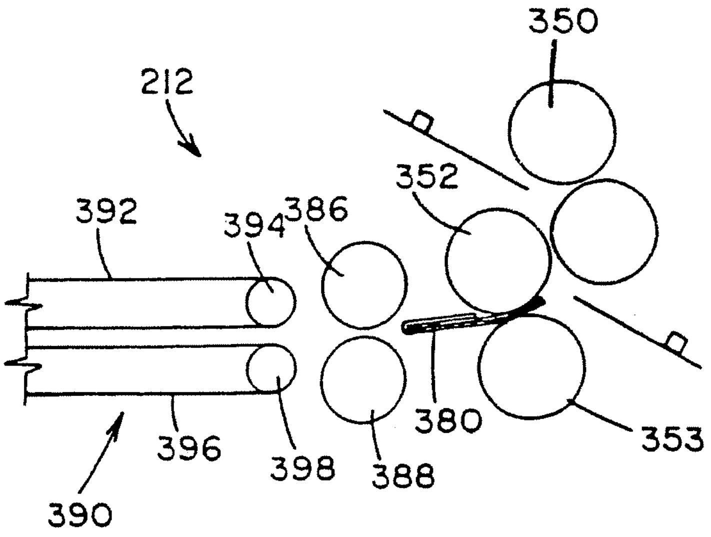

When it first enters the folding unit 212, the article 370 shown in FIG. 11A may correspond to a folded article having a plurality of parallel folds made in a first direction, such as the folded article 40 shown in FIG. 2B or the folded article 84 shown in FIG. 3F. When the leading edge of the article 370 hits the stop 358, an intermediate portion of the article at a point 372 is forced downwardly towards the nip of the folding rollers 351, 352. When the point 372 passes between the folding rollers 351, 352, the article 370 is folded at the point 372 by the folding rollers 351, 352, and then the leading folded edge 372 of the article 370 moves along the folding plate 356 until it makes contact with the stop 360, as shown in FIG. 11B. As the rear portion of the article 370 continues to advance, an intermediate portion of the article 370 buckles at a point 374 and moves downwardly towards the nip of the folding rollers 352, 353. When the point 374 passes between the folding rollers 352, 353, it is folded by the folding rollers 352, 353, as shown in FIG. 11C. At that point, the article 370 may have a leading portion 380 and a trailing portion 382, with the leading portion 380 being twice as thick as the trailing portion 382, which is shown most clearly in FIG. 11D.

Figure 11D:
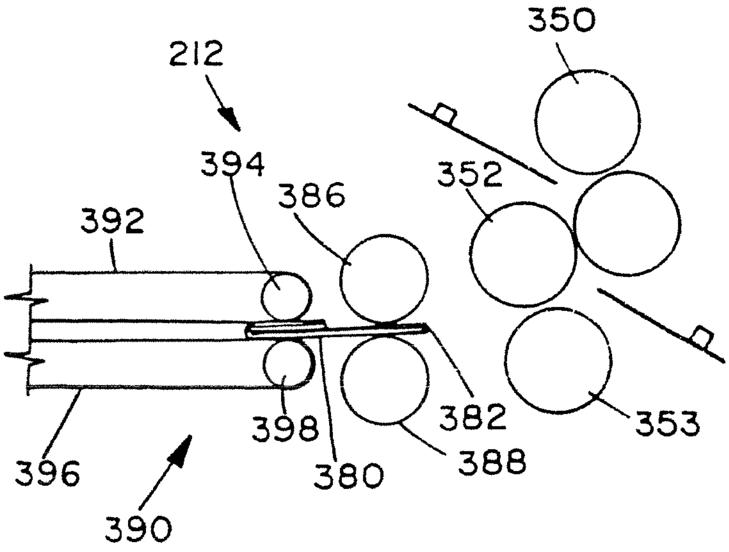

Referring to FIGS. 11C and 11D, the article 370 may be passed through a pair of cylindrical flattening rollers 386, 388 and then to a conveyor 390, which may be provided with one or more upper conveyor belt(s) 392 supported by a plurality of cylindrical rollers 394 and one or more lower conveyor belt(s) 396 supported by a plurality of cylindrical rollers 398.

Although a particular embodiment of the folding unit 212 is described above, numerous other embodiments and types of folding units could be utilized, and the particular type of folding unit used is not considered important to the invention.

Pressing Unit 214*a*

Figure 12:
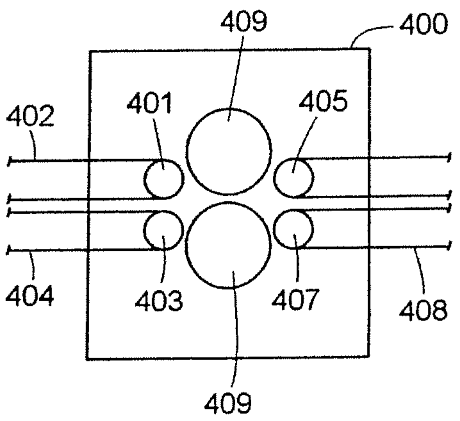
FIG. 12 illustrates an embodiment of a pressing unit shown schematically in FIGS. 5A-5D and 6A-6D.

FIG. 12 illustrates one embodiment 214*a* of the pressing unit 214 shown schematically in FIGS. 5A-5D and 6A-6D. The pressing unit 214*a* may include a support structure 400, which may include a pair of spaced-apart frame members. The pressing unit 214*a* may have an entry conveyor comprising one or more upper conveyor rollers 401, one or more conveyor belt(s) 402 supported by the upper conveyor roller(s) 401, one or more lower conveyor rollers 403, and one or more conveyor belt(s) 404 supported by the lower conveyor roller(s) 403. The pressing unit 214*a* may have an exit conveyor comprising one or more upper conveyor rollers 405, one or more conveyor belt(s) 406 supported by the upper conveyor roller(s) 405, one or more lower conveyor rollers 407, and one or more conveyor belt(s) 408 supported by the lower conveyor roller(s) 408.

The pressing unit 214*a* may have a pair of upper and lower pressure rollers 409 rotatably supported by the support structure 400. The lower pressure roller 409 may be coupled to the support structure 400 so as to rotate in a fixed position, and the upper pressure roller 409 may be rotatably supported by the support structure 400 so that the upper pressure roller 409 is slightly movable or adjustable in a vertical direction to accommodate folded articles having different thicknesses. One of the pressure rollers 409 may be coupled to a pressure-setting mechanism, such as a spring mechanism (not shown in FIG. 12), to exert pressure on folded articles as they pass through the nip between the pressure rollers 409.

For example, the pressure rollers 409 may cause folded articles passing through the pressing unit 214*a* to be subjected to a pressure that lies within any one of the following pressure ranges: a) 30-100 psi; b) 30-200 psi; c) 30-500 psi; d) 50-200 psi; or e) 50-500 psi. Passing folded articles through the pressing unit 214*a* may make it easier for subsequent folding actions to take place, or may result in better folds being formed.

Folding Unit 216*a*

Figure 13A:
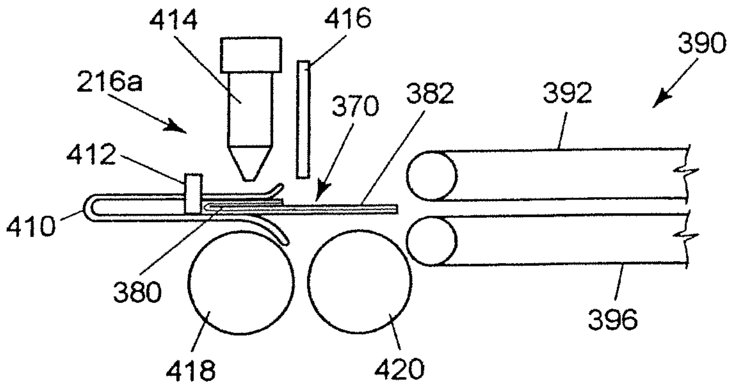
FIGS. 13A and 13B illustrate a portion of one embodiment of the folding unit 216 shown schematically in FIGS. 5A-5D and 6A-6D.
Figure 13B:
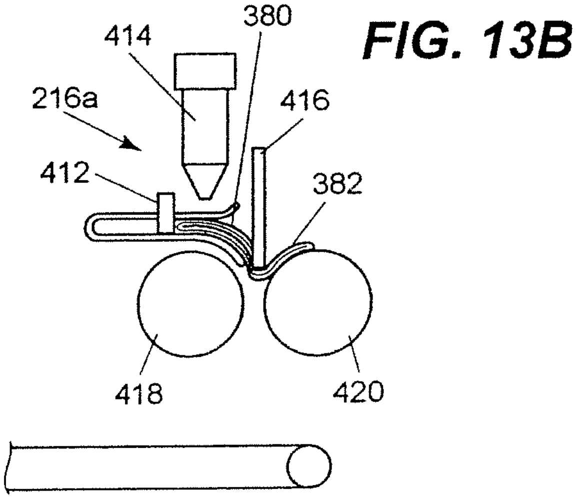

FIGS. 13A-13B are side views of one possible embodiment 216*a* of the folding unit 216 shown schematically in FIGS. 5A-5D and 6A-6D. The folding unit 216*a* may be provided with a guide member 410, a stop member 412 associated with the guide member 410, one or more glue applicators 414, a linearly translatable deflection or knife member 416, a pair of rotatable cylindrical folding rollers 418, 420, and a conveyor 430 (shown in FIG. 13B).

Referring to FIGS. 13A and 13B, after the folded article 370 exits the conveyor 390, the leading edge of the folded article 370 may abut against the stop member 412. With the folded article 370 in that position as shown in FIG. 13A, the bottom edge of the deflection member 416 may be positioned generally in the middle of the folded article 370 at the intersection between the relatively thick leading portion 380 and the relatively thin trailing portion 382.

With the folded article 370 so positioned, one or more spots of glue may be deposited onto the upper surface of the relatively thick leading portion 380, and then the deflection member 416 may be moved downwardly so that it makes contact with an intermediate portion of the folded article 370 and so that it pushes the intermediate portion towards the nip between the folding rollers 418, 420, as shown in FIG. 13B. As the folded article 370 passes through the folding rollers 418, 420, the article 370 may be folded so that the portion 382 is folded over the portion 380, with the glue spots disposed between the two portions 380, 382 so that the resulting outsert remains in a substantially closed orientation with the portions 380, 382 adhered together.

The outsert may then be automatically conveyed by the conveyor 430 (shown in FIG. 13B), which may be provided with one or more endless conveyor belt(s) 432 and a plurality of rotatable conveyor rollers 434, to the visual inspection unit 1400 shown schematically in FIG. 5A.

Further details regarding folding units that could be used for the folding units 210, 212, 216 are described in U.S. Ser. No. 09/326,821 filed in the U.S. Patent Office on Jun. 7, 1999 and U.S. Pat. Nos. 4,616,815, 4,812,195, 4,817,931, 5,044,873 and 5,046,710, all of which are incorporated herein by reference.

Although a particular embodiment of the folding unit 216 is described above, numerous other embodiments and types of folding units could be utilized, and the particular type of folding unit used is not considered important to the invention.

Visual Inspection Unit 1400

Figure 20:
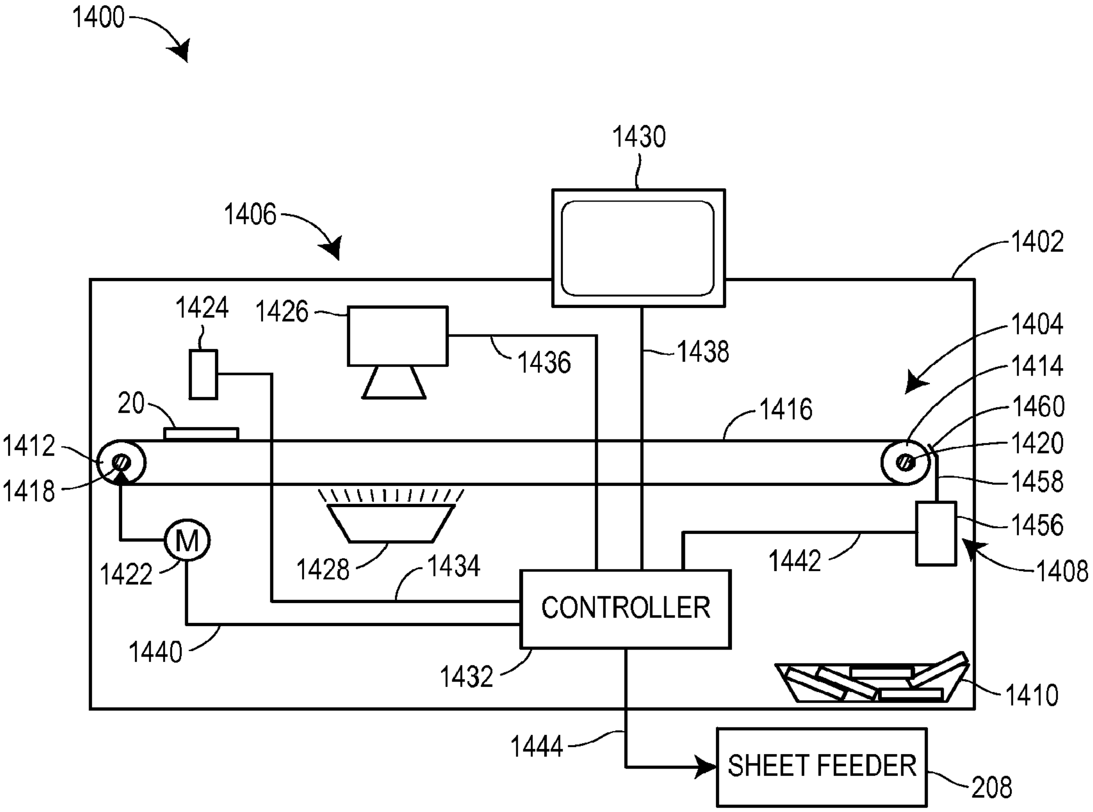
FIGS. 20 and 22A-22C illustrate one embodiment of the visual inspection unit shown schematically in FIGS. 5A-5D and 6A-6D.

FIG. 20 is a cross-sectional side view of one embodiment, with portions shown schematically, of the visual inspection unit 1400 shown in FIGS. 5A-5D and 6A-6D. Referring to FIG. 20, the visual inspection unit 1400 may be provided with a pair of spaced-apart support frames 1402, a conveyor unit 1404, an imaging unit 1406 and a diverter assembly 1408 that redirects rejected informational items 20 to a reject item receptacle or waste container 1410.

The upper conveyor unit 1404 may be provided with a plurality of support rollers or pulleys 1412, 1414 which support one or more endless conveyor belt(s) 1416. The support rollers 1412, 1414 may be supported by a plurality of support rods 1418, 1420 which may be supported by the spaced-apart support frames 1402. The roller 1412 may be fixed to the support rod 1418, the support rod 1418 may be rotatable, and a motor 1422 may be coupled to rotatably drive the support rod 1418 via a gearing system (not shown) comprising one or more drive gears.

Figure 21:
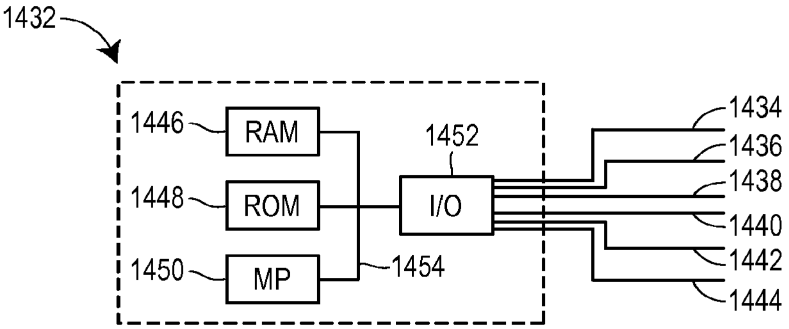
FIG. 21 is a block diagram of one embodiment of the controller shown schematically in FIG. 20.

The imaging unit 1406 may be provided with a sensor 1424 that is capable of detecting the passage of informational items 20, a camera 1426 that may capture a digital image of an informational item 20 passing therebeneath, a light source 1428, a human/machine interface (HMI) screen 1430, and a controller 1432 that is operatively coupled to the sensor 1424, the camera 1426, and the HMI screen 1430, as well as the motor 1422, the diverter assembly 1408, and the sheet feeder 208 via a plurality of signal lines 1434, 1436, 1438, 1440, 1442, 1444, respectively. Referring to FIG. 21, the controller 1432 may include a random-access memory (RAM) 1446, a program memory such as a read-only memory (ROM) 1448, a microprocessor 1450, and an input/output (I/O) circuit 1452, all of which are interconnected by an address/data bus 1454. In that case, a computer program may be stored in the ROM 1448 or the RAM 1446 and executed by the microprocessor 1450 to control the operation of the conveyor unit 1404, the imaging unit 1406, the diverter assembly 1408, and the sheet feeder 208. Alternatively, the controller 1432 could be implemented as a logic circuit, a programmable logic array, or another electrical control apparatus or circuit.

Referring again to FIG. 20, the diverter assembly 1408 may be disposed at the downstream end of the conveyor unit 1404, and may be provided with a pneumatic cylinder 1456 having an upwardly extending diverter arm 1458 with an inwardly extending portion 1460 proximate the upper end. In the normal position shown in FIG. 20, the diverter arm 1458 is retracted by the pneumatic cylinder 1456 to allow the informational items 20 to travel off the end of the conveyor unit 1404 to an adjacent conveyor of another unit of the apparatus, such as the bonding unit 218 or the stacking unit 760. The pneumatic cylinder 1456 may be operatively coupled to the controller 1432 by the signal line 1442 so that the controller 1432 may actuate the pneumatic cylinder 1456 to extend the diverter arm 1458 to redirect a rejected informational item 20 in a manner described more fully below.

In the operation of the visual inspection unit 1400, informational items 20 may be automatically provided, one at a time, to the upstream end of the conveyor unit 1404 at the left-hand portion of the visual inspection unit 1400. The informational items 20 may be automatically provided to the visual inspection unit 1400 directly from the conveyor 430 (FIG. 13B) of the folding unit 216*a*, or they may alternatively be automatically provided via an intermediate conveyor (not shown) between the folding unit 216*a* and the visual inspection unit 1400, or another conveyor can be added to the visual inspection unit 1400.

Figure 22A:
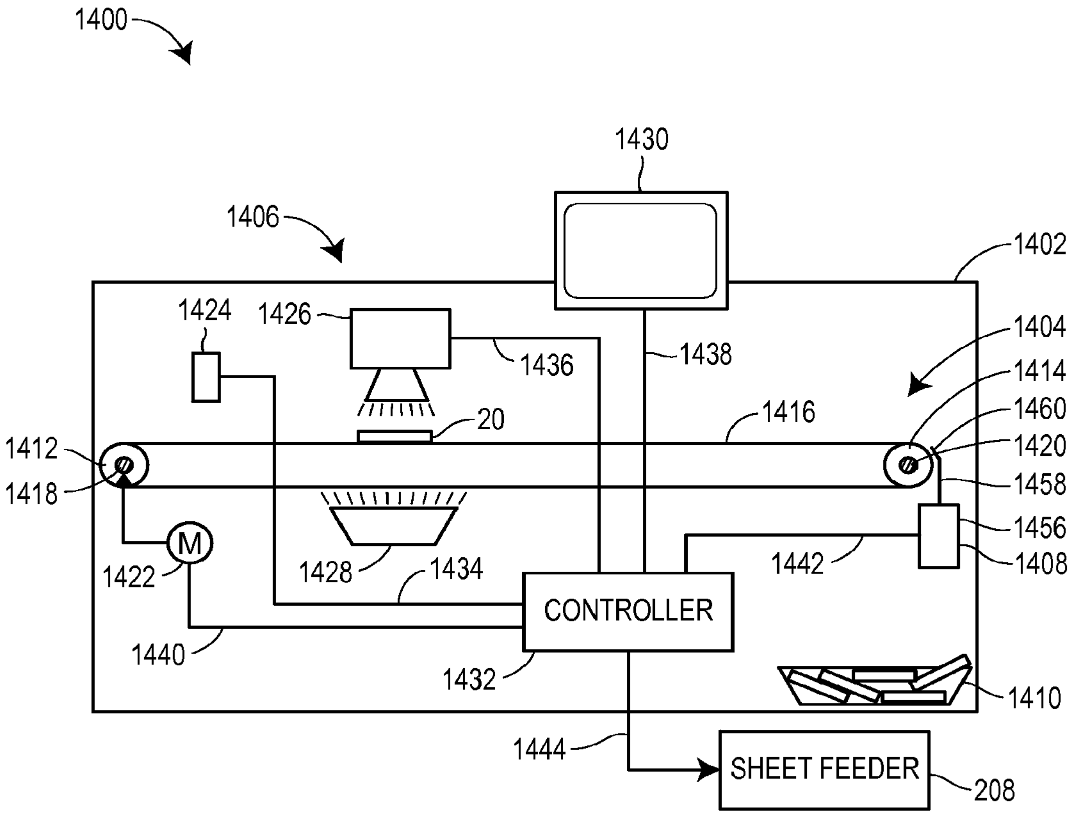

Each time an informational item 20 is introduced to the visual inspection unit 1400, it may be conveyed rightwardly by the conveyor unit 1404, as illustrated by the orientation of FIG. 20, toward the imaging unit 1406. As it moves rightwardly in FIG. 20, the informational item 20 may pass underneath the sensor 1424, which may detect its presence and transmit a detect signal to the controller 1432 via the signal line 1434. When the informational item 20 passes underneath the camera 1426 (as illustrated in FIG. 22A), which may be in the form of a complementary metal oxide semiconductor (CMOS) sensor, a charge coupled device (CCD) sensor, or other such sensor, for example, the camera 1426 may capture a digital image of the informational item 20 as it is oriented on the conveyor belt(s) 1416. The precise time at which the camera 1426 captures the image may be controlled based on the speed of the conveyor belt(s) 1416 as dictated by the control signals provided to the motor 1422 by the controller 1432 over the signal line 1440, and a known path distance between the sensor 1424 and the camera 1426. Alternatively, the speed of the conveyor unit 1404 may be controlled by an operator, and the visual inspection unit 1400 may include a sensing wheel engaging the conveyor belt(s) 1416 and a rotary encoder to sense the speed of the conveyor belt(s) 1416 and transmit signals to the controller 1432 indicative of the speed of the belt(s) 1416. Thus, after sensing of an informational item 20 by the sensor 1424, the controller 1432 may wait a length of time, which varies with the speed of the conveyor belt(s) 1416, before signaling the camera 1426 to capture a digital image of the informational item 20, during which waiting time the position of the informational item 20 will have changed from being beneath the sensor 1424 to being beneath the camera 1426 (FIG. 22A).

After passing underneath the camera 1426 and above the light source 1428, and having its image captured by the camera 1426, the informational item 20 continues moving to the right toward the diverter assembly 1408, as illustrated in the orientation of FIG. 20. During this time, the digital image of the informational item 20 is transmitted to the controller 1432 from the camera 1426 via the signal line 1436 for evaluation by the controller 1432 to determine whether the informational item 20 is acceptable for transfer to a subsequent processing unit, e.g., the bonding unit 218 or the stacking unit 760. The controller 1432 may analyze, evaluate, and/or process the digital image of the informational item 20 to determine whether the informational item 20 is properly folded, and whether the informational item 20 is properly oriented on the conveyor belt(s) 1416 for subsequent processing, e.g., for bonding by the bonding unit 218 or for stacking by the stacking unit 760.

Figure 22B:
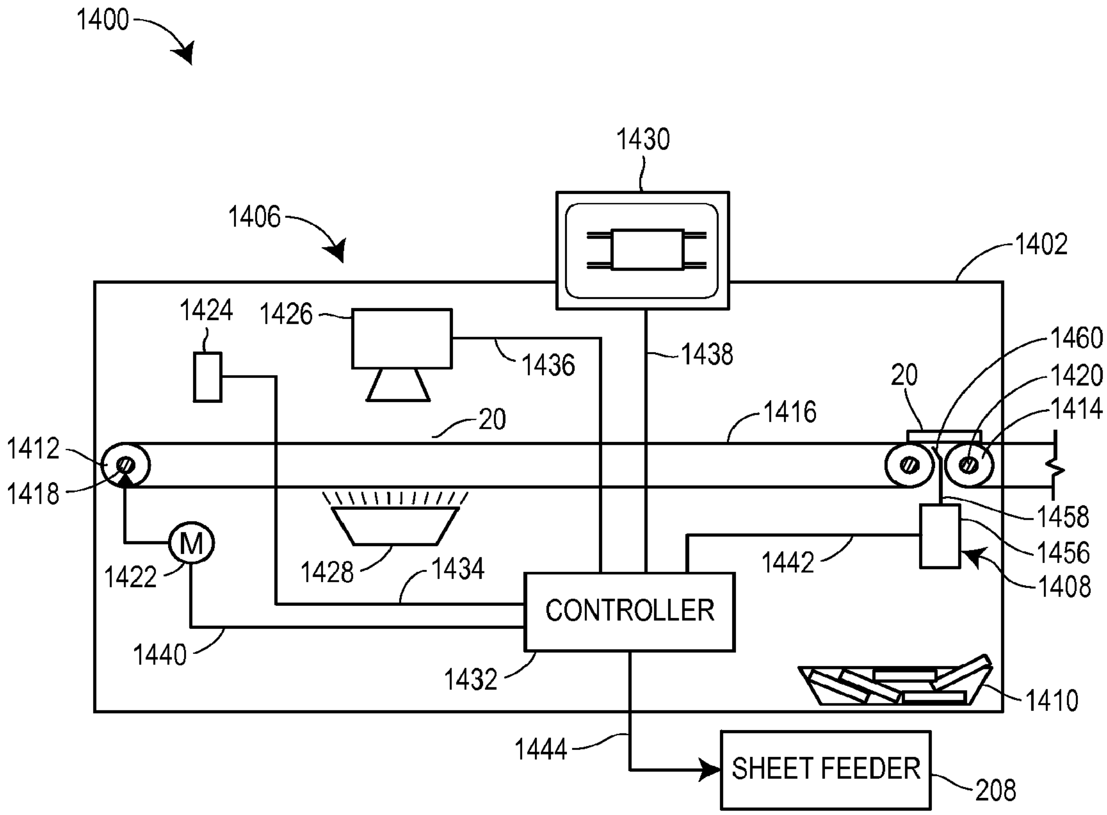
Figure 22C:
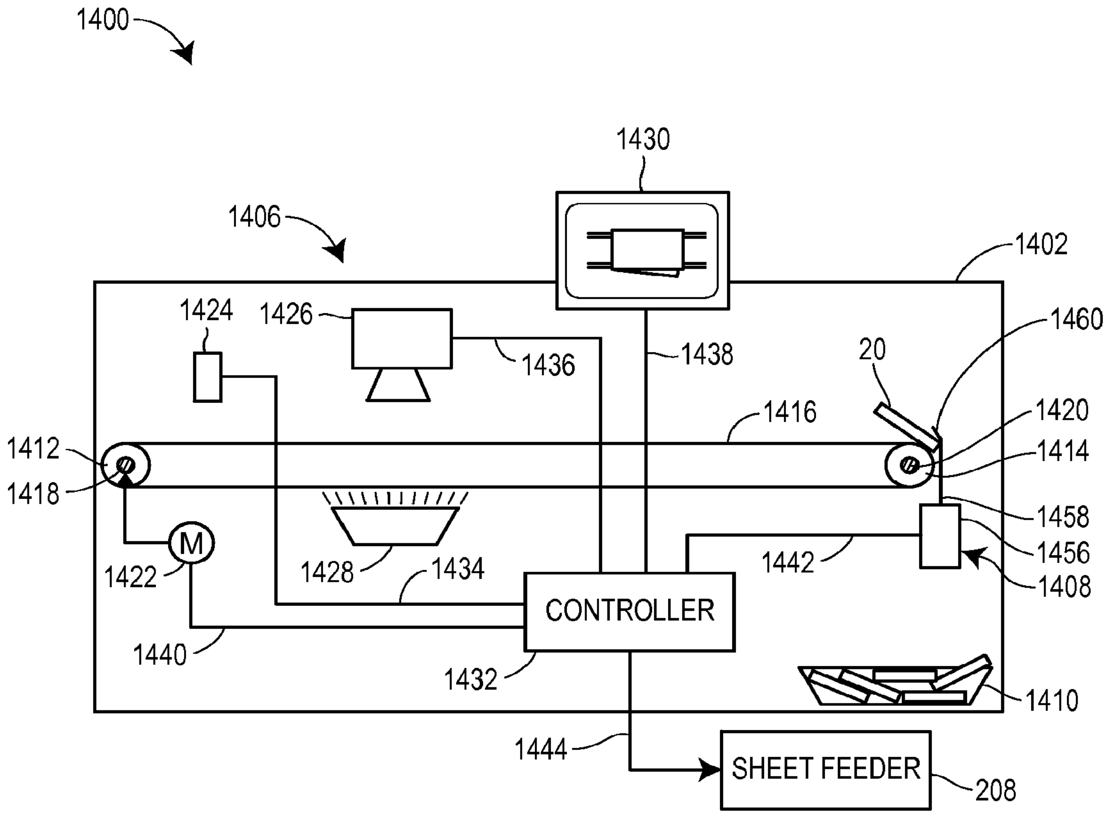

If the controller 1432 determines that the informational item 20 is properly folded and properly oriented on the conveyor belt(s) 1416, the controller 1432 will allow the informational item 20 to continue moving to the right along the conveyor unit 1404 and past the diverter assembly 1408 without extending the diverter arm 1458 (as illustrated in FIG. 22B). In one embodiment, if the controller 1432 determines that the informational item 20 is either improperly folded or improperly aligned on the conveyor belt(s) 1416, the controller 1432 will transmit a signal via the signal line 1442 to the diverter assembly 1408 to actuate the pneumatic cylinder 1456 and extend the diverter arm 1458 to divert the rejected informational item 20 (as illustrated in FIG. 22C) from the conveyor unit 1404 and into the receptacle 1410.

The precise time at which the diverter arm 1458 is extended may be controlled based on the speed of the conveyor belt(s) 1416 as determined in a similar manner as described above, and a known path distance between the camera 1426 and the diverter assembly 1408. Thus, after capturing the digital image of the informational item 20 at the camera 1426, the controller 1432 may wait a length of time, which varies with the speed of the conveyor belt(s) 1416, before signaling the diverter assembly 1408 to actuate the pneumatic cylinder 1456 and extend the diverter arm 1458, during which waiting time the position of the informational item 20 will have changed from being beneath the camera 1426 to being proximate the diverter assembly 1408 at the end of the conveyor unit 1404. The delay in extending the diverter arm 1458 will allow other properly folded and aligned informational items 20 downstream of the rejected informational item 20 on the conveyor belt(s) 1416 to pass on for subsequent processing, e.g., by the bonding unit 218 or by the stacking unit 760, without being diverted from the conveyor belt(s) 1416. After an additional waiting time, the controller 1432 transmits a signal via the signal line 1442 to the diverter assembly 1408 to de-pressurize the pneumatic cylinder 1456 and retract the diverter arm 1458 so that the properly folded and oriented informational items 20 upstream of the rejected informational item 20 are not diverted into the receptacle 1410.

It should be understood that the structural details shown in FIGS. 20 and 22A-22C are not shown to scale and that other imaging equipment may be implemented in the visual inspection unit 1400. At any one time, there may be multiple informational items 20 in transit within the visual inspection unit 1400 between the starting position and an output position at the diverter assembly 1408. Further, alternative configurations of the diverter assembly 1408 may be implemented that are configured and capable of removing a rejected informational item 20 from the conveyor unit 1404. For example, a pusher or piston may be disposed on the side of or beneath the conveyor belt(s) 1416 and actuated by the controller 1432 as a rejected informational item 20 passes on the conveyor belt(s) 1416 to impact the informational item 20 and eject the informational item 20 from the conveyor belt(s) 1416. As a further alternative, the diverter assembly 1408 may include a suction head that is brought into contact with a rejected informational item 20, actuated to create suction to attach the informational item 20 to the suction head, and moved to lift the informational item 20 off the conveyor belt(s) 1416 and to drop the informational item 20 into the receptacle 1410. Other mechanisms for diverting the rejected informational items from the conveyor unit 1404 will be apparent to those skilled in the art and are contemplated by the inventors as having use in the visual inspection unit 1400.

Figure 23:
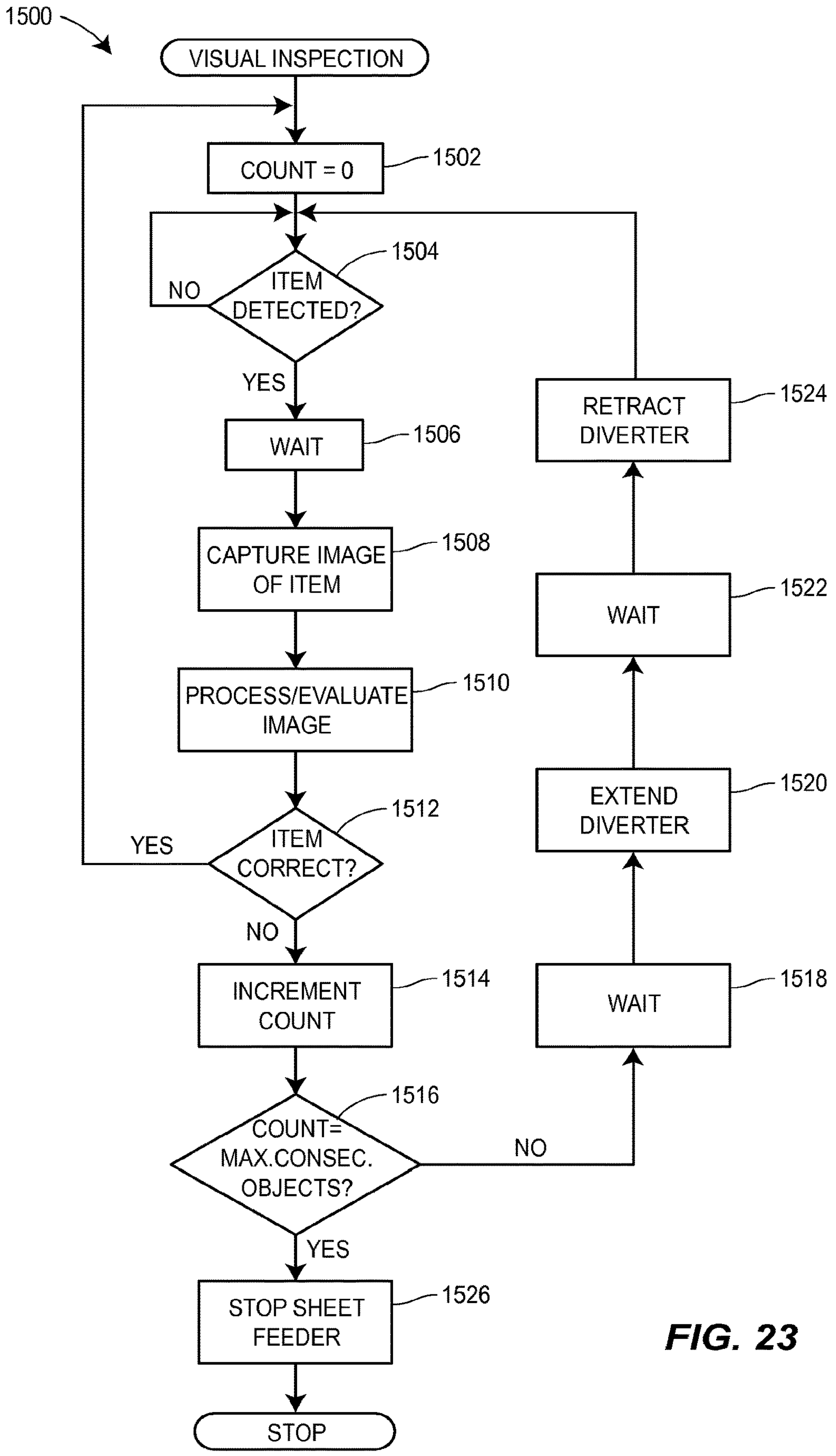
FIG. 23 illustrates a number of acts that may be performed during the process of visually inspecting informational items passing through the visual inspection unit.

Further details regarding the operation of the controller 1432 are shown in FIG. 23, which illustrates a number of acts or tasks that could be performed during a visual inspection process 1500. Referring to FIG. 23, at block 1502 a count variable may be initialized to zero. The count variable may be used to keep track of the number of consecutive informational items 20 that are rejected by the controller 1432 for being improperly folded or improperly oriented on the conveyor belt(s) 1416. The controller 1432 may be further configured to transmit a signal via the signal line 1444 to the sheet feeder 208 to shut down and cease feeding sheets to the folding unit 210, for example, when the count indicates that an operator-specified number of consecutive informational items 20 have been rejected by the visual inspection unit 1400.

At block 1504, the controller 1432 may wait until an informational item 20 is detected by the sensor 1424. When an informational item 20 is detected, at block 1506, the controller 1432 may wait for a period of time, which may depend on the path distance between the sensor 1424 and the camera 1426 and the speed of the conveyor belt(s) 1416, and then at block 1508 the controller 1432 may cause the camera 1426 to capture a digital image of the moving informational item 20, which was detected at block 1504.

Figure 24:
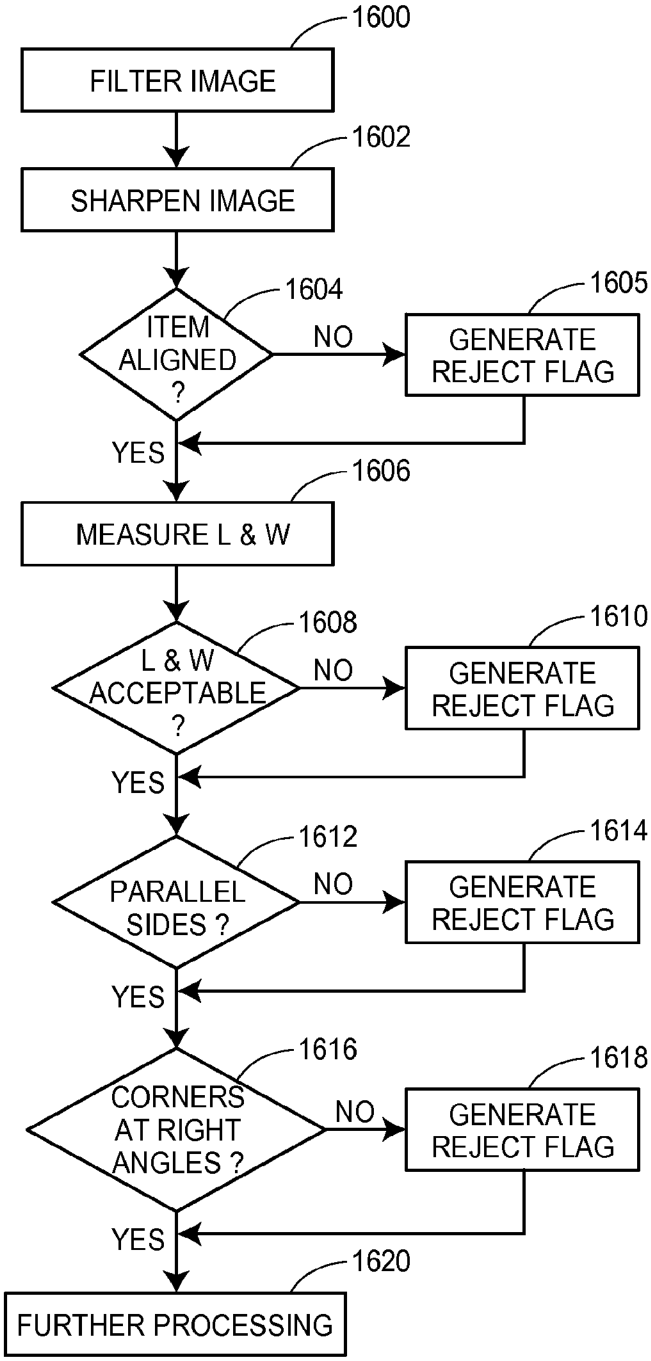
FIG. 24 is a flowchart representative of one example of a series of processing acts for forming and sorting informational items with a visual inspection unit in accordance with the principles of the present disclosure.

The controller 1432 then retrieves the image from the camera 1426 and processes/evaluates the image at block 1510. The image can generally include a matrix of pixels, wherein each pixel is assigned a value that is indicative of a value on a gray scale. As such, a white or generally light colored informational item 20 can easily be identified/detected on a darker background belt(s) 1461, for example. The processing undertaken by the controller 1432 at block 1510 can include a series of processing steps arranged according to an algorithm or other process to determine whether or not the subject informational item 20 satisfies some predetermined criteria. FIG. 24 is a flowchart representative of one example of a series of processing acts that my be undertaken by the controller 1432 at block 1510 of FIG. 23.

For example, after the image is captured at block 1508, the controller 1432 may initially filter the image at block 1600 of FIG. 24. Filtering the image may include processing the image according to one or more known image filtering algorithms to remove any unwanted blemishes in the image that may have resulted from electronic noise present in the camera 1426, or other components of the visual inspection unit 1400. Other means of filtering could also be performed.

Next, at block 1602 of FIG. 24, the controller 1432 may sharpen edge lines of the captured image of the informational item 20. Sharpending the edge lines may be achieved by further processing the image according to an algorithm that is configured to identify the specific pixels that represent the perimeter edges of the folded informational item 20. Then, the controller 1432 may increase the gray scale value of the perimeter edge pixels, as well as each and every pixel disposed inside of the perimeter edge pixels, such that the gray scale value of these pixels, which represent the informational item 20, equates to the color white. Additionally, optionally, the controller 1432 may decrease the gray scale values of all of the pixels disposed outside of the perimeter edge pixels such that the gray scale value of these pixels equates to the color black. As such, the sharpening process is directed to optimizing the contrast between a white informational item and a black background.

Figure 25:
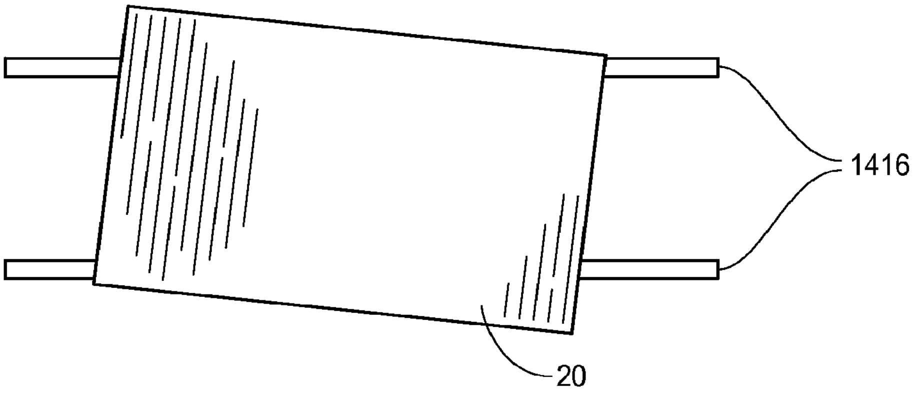
FIG. 25 illustrates one example of an informational item that is disposed out of alignment on conveyor belt(s)
Figure 26:
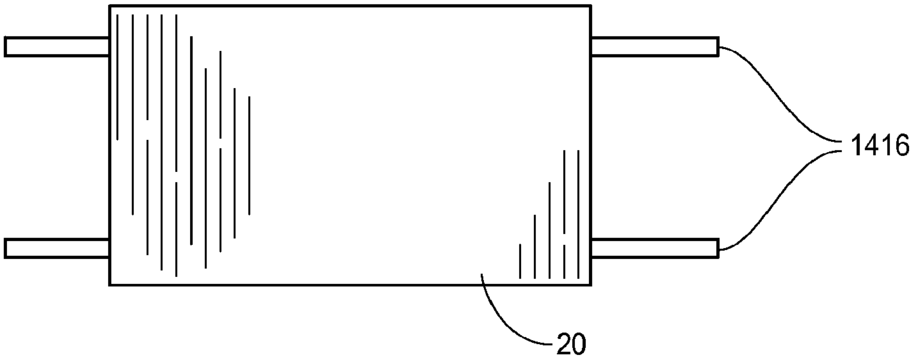
FIG. 26 illustrates another example of an informational item that is disposed in alignment on conveyor belt(s).

With the image processed as described, one embodiment of the processing/evaluation undergone at block 1510 of FIG. 23 may further include determining the alignment of the informational item 20 on the conveyor belt(s), at block 1604. To achieve this, the controller 1432 may process/evaluate the image to detect the relationship between the side edges of the informational item 20 and a reference body such as an edge of the conveyor belt(s) 1416, or one or more stripes of paint extending the length and/or width of the conveyor belt(s) 1416. For example, FIG. 25 illustrates one example wherein the informational item 20 is disposed out of alignment on the conveyor belt(s) 1416, and FIG. 26 illustrates another example where the informational item is disposed in alignment on the conveyor belt(s) 1416. As such, if the side edges of the informational item 20 are disposed parallel to the edges of the belt(s) 1416, in one embodiment, the controller 1432 may determine that the informational item 20 is properly aligned/positioned and the controller proceeds to block 1606. If the controller 1432 determines, however, that the informational item 20 is not properly positioned, the controller 1432 generates a reject flag at block 1605 prior to proceeding to block 1606.

At block 1606, the controller 1432 may measure the length and the width of the informational item 20 captured in the image. This can be accomplished by counting the number of white pixels across the length and width of the informational items, and then comparing the counted number of pixels with predetermined numbers of target pixels, for example, stored in the RAM 1446 or the ROM 1448 of the controller 1432. In one embodiment, the number of width and length measurements taken across any given image depends on the size of the informational items 20 being processed. For example, in an effort to increase accuracy, in one embodiment, the controller 1432 may count pixels across the image at 30 to 40 different points along the length and width of the informational items 20. Generally, the number of points at which pixels may be counted can be dependent on the size of the informational items 20 being process. Of course, in other embodiments, the controller 1432 may count pixels at any given number of points across the width and length dimensions of the informational items 20. Once the counted pixels are compared to the target pixels, the controller 1432 can make a determination at block 1408 as to whether the measured lengths and widths are within predetermined acceptable tolerances. If the length and width measurements are acceptable, the process moves onto block 1412. If the length and width measurements are outside of the acceptable tolerance range, the controller 1432 generastes a rejection flag at block 1410 to be noted during further processing, as will be described below, and then proceeds to block 1412. At block 1412, the controller 1432 may compare the opposing side edges of the informational item 20 captured by the image to determine whether they are parallel within acceptable tolerances. If the left and right side edges are parallel, and the top and bottom edges are parallel, then the controller proceeds to block 1416. If either the left and right side edges, or the top and bottom edges are out of parallel, then the controller generates a reject flag at block 1414 prior to proceeding to block 1416.

At block 1416, the controller 1432 may compare adjacent edges of the captured image of the informational item 20 to determine whether the corners of the folded informational item 20 constitute right angles (i.e., 90°), within acceptable tolerances. If all of the corners of the informational item 20 are determined to be disposed at right angles, then the controller 1432 proceeds to block 1420. If any one or more of the angles is not at a right angle, then the controller 1432 generates a reject flag at block 1418, prior to proceeding to block 1420.

At block 1420, the controller 1432 may perform further processing on the image or, in the disclosed embodiment, the controller 1432 may proceed to block 1512 of FIG. 23.

Referring again to FIG. 23, after the controller 1432 processes/evaluates the image data at block 1510, the controller 1432 determines if the item is acceotable for further processing at block 1512. This determination is based on the number of reject flags generated by the controller 1432 at block 1520, and as described above. For example, if during the processing in block 1510, the controller 1432 generated zero reject flags, then the controller 1432 proceeds to block 1502 in FIG. 23 and the foregoing process repeats itself. If, however, the controller 1432 generates one or more reject flags during the processing undergone at block 1510, the controller 1432 could determine that the informational item 20 is not acceptable for subsequent processing and proceed to block 1514 in FIG. 23.

At block 1514, the controller 1432 increases the counter by one. Then, at block 1516, the controller 1432 compares the number on the counter to a maximum allowed number that may be stored in the memory, e.g., RAM 1446 or ROM 1448, of the controller 1432. If the controller 1432 determines that the maximum number of rejected informational items 20 has been met, it stops the feeder at block 1526 and shuts down the machine. In contrast, if the controller 1432 determines that the maximum number has not yet been met, the controller 1432 prepares to divert the informational item 20 that was identified as being folded and/or aligned incorrectly (i.e., the informational item 20 is unacceptable for subsequent processing). Initially, the controller 1432 waits, as indicated at block 1518, for the conveyor belt(s) 1416 to convey the subject informational item 20 toward the diverter assembly 1408. This waiting time is dependent on the speed of the conveyor belt(s) 1416, as described above. At the appropriate time, and at block 1520, the controller 1432 sends a signal to the diverter assembly 1408 and the diverter arm 1458 is extended upward into the position depicted in FIG. 22C. At block 1522, the controller 1432 waits, thereby giving the machine sufficient time for the diverter arm 1458 to divert the rejected informational item 20 off of the conveyor belt 1416. Then, at block 1524, the diverter arm 1458 is retracted and the process returns to block 1502 to repeat the foregoing process.

In view of the foregoing, it should be appreciated that the disclosed system and method advantageously operate to divert incorrectly folded and/or aligned informational items 20 from the final production batches such as to improve the quality and consistency of the outserts ultimately delivered to customers. Moreover, in some embodiments, the processing and evaluations of each folded informational item 20 conducted by controller 1432 can be stored by the controller 1432 and reports, for example, can be generated indicating what types of problems are being detected. As such, if a particular type of problem is reoccurring, operating personnel may be able to identify what aspect or component of the machine is responsible for that problem. The responsible component and/or aspect may then be adjusted or replaced to improve efficiency and reduce the number of diverted informational items. So configured, the machine and method of the present application are not only capable of reducing the number of problem items 20 delivered to the customer, but also reducing the number of problem items 20 prepared.

Bonding Unit 218

Figure 14:
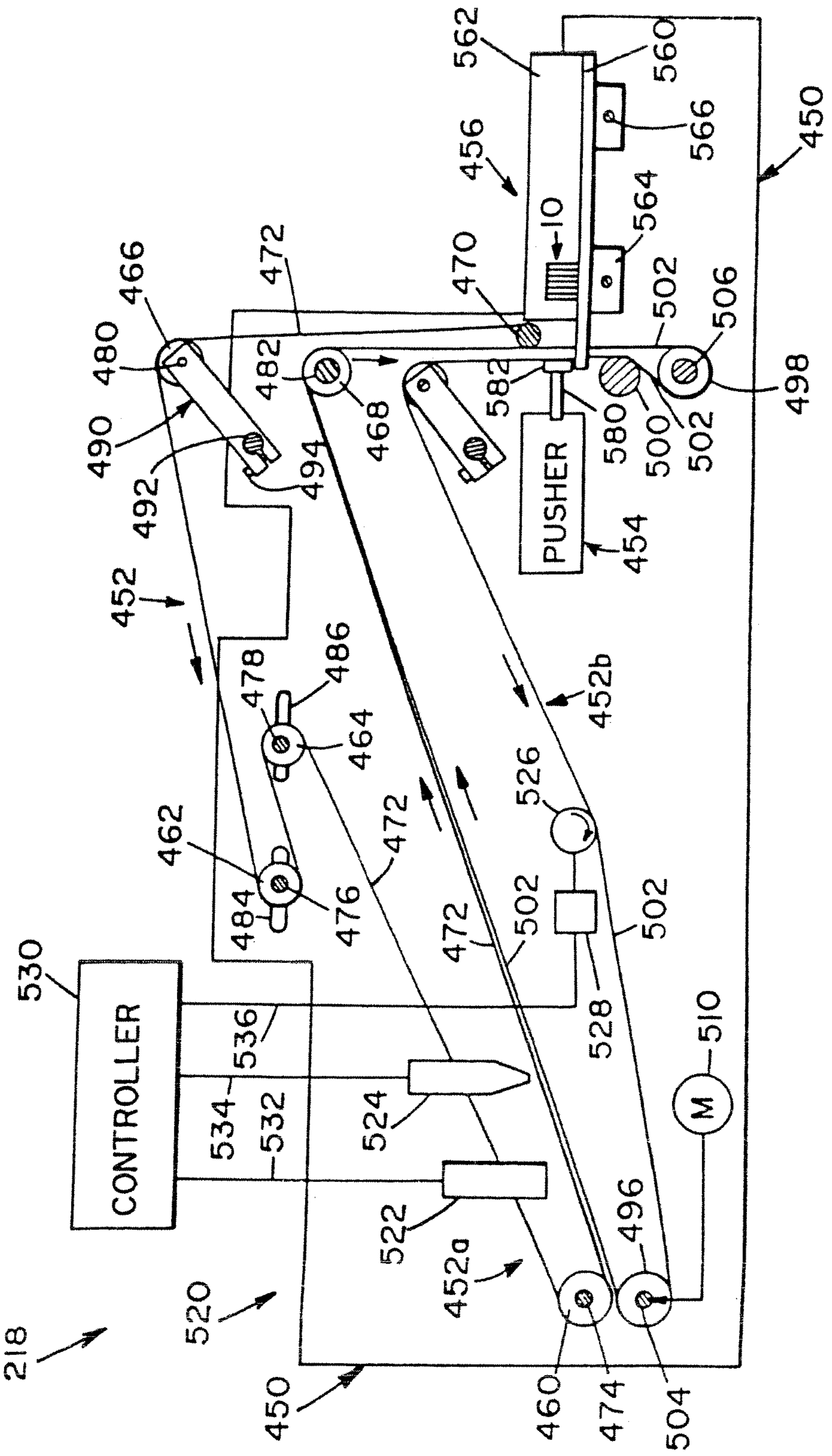
FIGS. 14, 14A and 14B illustrate one embodiment of the bonding unit shown schematically in FIGS. 5A-5D and 6A-6D.

FIG. 14 is a cross-sectional side view of one embodiment, with portions shown schematically, of the bonding unit 218 shown in FIGS. 5A-5D and 6A-6D. Referring to FIG. 14, the bonding unit 218 may be provided with a pair of spaced-apart support frames 450, a conveyor unit 452 having an upper conveyor assembly 452*a* and a lower conveyer assembly 452*b*, a pusher unit 454, and a guide tray 456 that supports one or more stacks 10 of informational items 20.

Figure 14A:
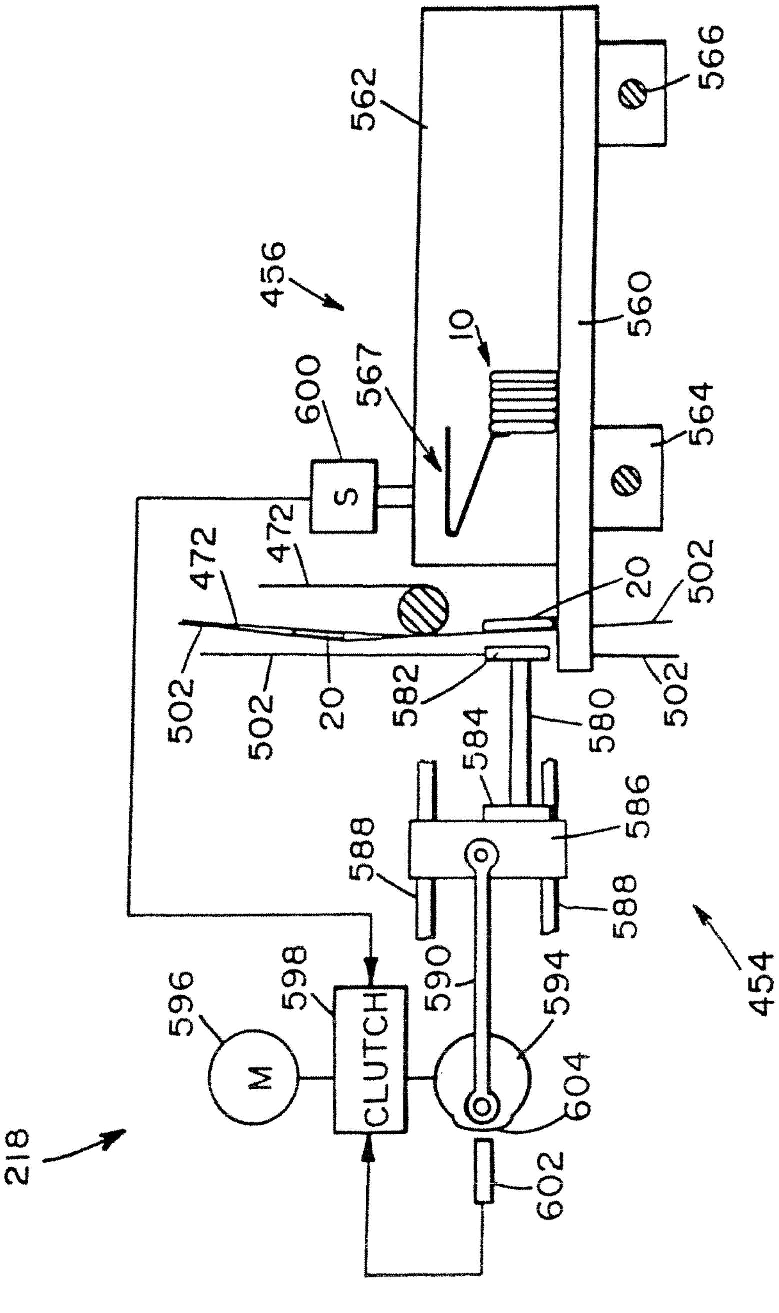
Figure 14B:
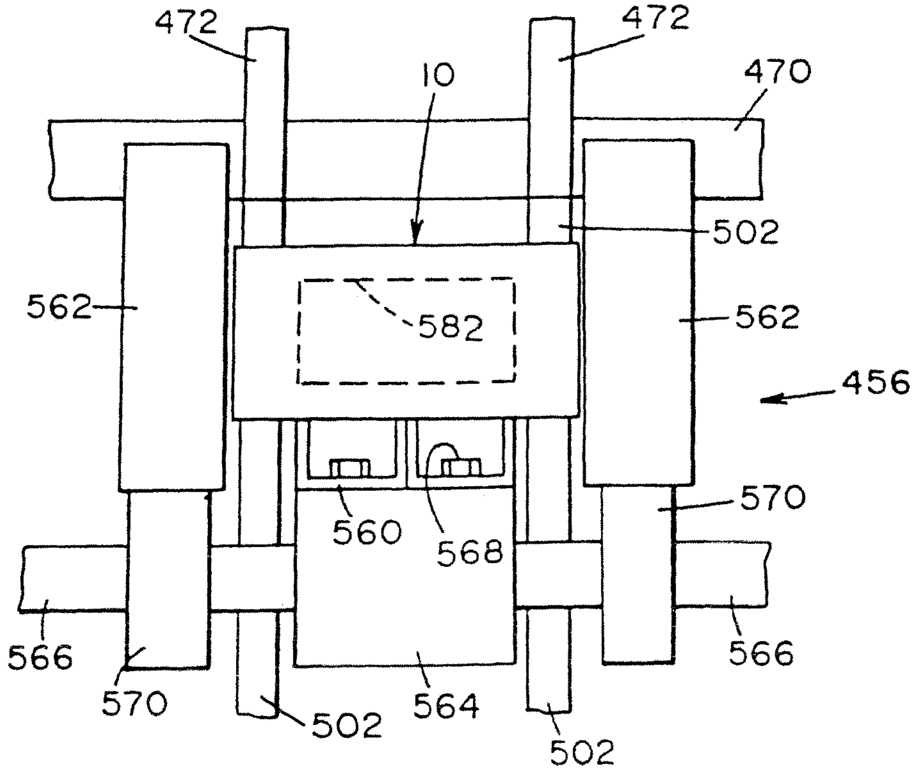

The upper conveyor unit 452*a* may be provided with a plurality of support rollers 460, 462, 464, 466, 468 and a rotatable rod 470 which support a plurality of endless conveyor belt(s) 472. Referring also to FIG. 14B, at least two spaced-apart conveyor belt(s) 472 and two sets of rollers 460, 462, 464, 466, 468 may be utilized. The support rollers 460, 462, 464, 466, 468 may be supported by a plurality of support rods 474, 476, 478, 480, 482 which may be supported by the spaced-apart support frames 450.

The support rods 476, 478 may be disposed through a pair of slots 484, 486 formed in each of the support frames 450 so that the distance between the rollers 462, 464 can be adjusted in order to adjust the tension on the conveyor belt(s) 472. The support rods 476, 478 may be fixed at a particular desired position within the slots 484, 486 by tightening end caps (not shown) threaded onto the ends of the rods 476, 478 or by utilizing other fastening structures.

The rods 480 that support the rollers 466 may be connected to support arms 490 that are fixed to a rod 492 connected between the frame supports 450. The angular position of the support arms 490 may be adjusted and then fixed via tightening bolts 494.

The lower conveyor unit 452*b* may be provided with a plurality of support rollers 496, 498 and a rotatable rod 500 which support a plurality of endless conveyor belt(s) 502. The rollers 468 may support both of the conveyor belt(s) 472, 502. The support rollers 496, 498 may be supported by a plurality of support rods 504, 506, which may be supported by the spaced-apart support frames 450.

The rollers 496 may be fixed to the support rod 504, the support rod 504 may be rotatable, and a motor 510 may be coupled to rotatably drive the support rod 504 via a gearing system (not shown) comprising one or more drive gears. The gearing system may include a pair of intermeshed gears that simultaneously cause the rods 474, 504 to rotate at the same rate in opposite directions so that the conveyor belt(s) 472, 502 are driven in the direction indicated by the arrows in FIG. 14.

The bonding unit 218 may be provided with a glue application system 520. The glue application system 520 may be provided with a sensor 522 that is capable of detecting the passage of informational items 20, one or more glue applicators 524 that apply one or more drops of glue to informational items 20, a sensing wheel 526, a rotary encoder 528, and a controller 530 that is operatively coupled to the sensor 522, the glue applicator(s) 524, and the rotary encoder 528 via a plurality of signal lines 532, 534, 536, respectively.

Figure 15:
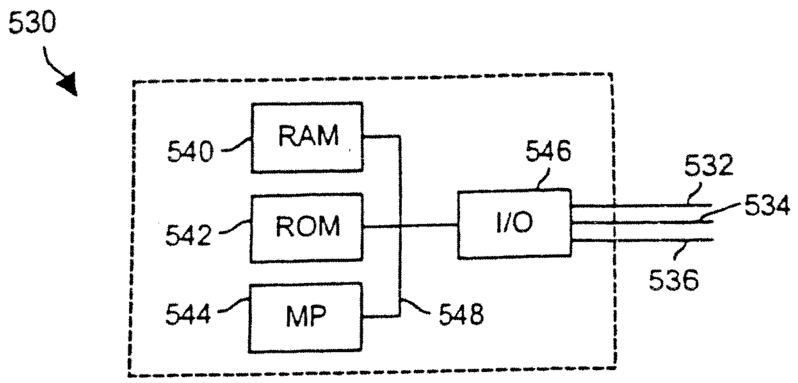
FIG. 15 is a block diagram of one embodiment of the controller shown schematically in FIG. 14.

Referring to FIG. 15, the controller 530 may be provided with a random-access memory (RAM) 540, a program memory such as a read-only memory (ROM) 542, a microprocessor 544, and an input/output (I/O) circuit 546, all of which are interconnected by an address/data bus 548. In that case, a computer program may be stored in the ROM 542 and executed by the microprocessor 544 to control the operation of the glue application system 520. Alternatively, the controller 530 could be implemented as a logic circuit, a programmable logic array, or another electrical control apparatus or circuit.

Referring to FIG. 14, the guide tray 456 may be provided with one or more base members 560 and a plurality of spaced-apart side walls 562. The base members 560 may be supported on a plurality of mounting blocks 564, each of the mounting blocks 564 having a cylindrical hole formed therein through which a cylindrical rod 566 passes. The ends of each of the cylindrical rods 566 may be supported by the spaced-apart support frames 450. As shown in FIG. 14A, the interior face of each of the side walls 562 may be provided with a retention clip 567, which may act to retain the upright position of the rearmost item 20 in the stack 10 or which may act to apply a pressure to the rearmost item 20 in the stack 10 to facilitate bonding of the rearmost item 20 to the stack 10.

Referring to FIG. 14B, which is an end view of the guide tray 456 looking from right to left in FIG. 14A, the base members 560 may have a U-shaped cross section, and the base members 560 may be connected to the mounting blocks 564 via a plurality of bolts 568. The lateral position of the base members 560 may be adjusted by sliding the mounting blocks 564 along the rods 566, and the lateral position may be fixed with a set screw (not shown) or another position-fixing device.

Each of the side walls 562 may be fixed to one or more mounting blocks 570 through which the cylindrical rods 566 pass. The side walls 562 may be spaced apart by a distance substantially corresponding to, or slightly larger than, the width of the stack 10 of informational items 20, as shown in FIG. 14B. The lateral positions of the side walls 562 may also be adjusted by sliding the mounting blocks 570 along the rods 566, and the side walls 562 may be fixed in a particular lateral position via a set screw (not shown) or other means.

Referring to FIG. 14A, the pusher unit 454 may be provided with a laterally extending pusher arm 580 having a pusher plate 582 attached thereto. The pusher arm 580 may be connected to a mounting plate 584 which may in turn be connected to a slide block 586 which is slidably supported by a plurality of slide rods 588. The slide block 586 may be connected to a drive arm 590 having a first end connected to the slide block 586 and a second end connected to a rotatable drive wheel 594. The drive wheel 594 may be rotatably driven by a motor 596 through a clutch mechanism 598.

The clutch 598 may be operatively coupled to a first sensor 600 that detects the presence of one of the informational items 20 as it moves downwardly between the upper and lower conveyor belt(s) 472, 502 and to a second sensor 602 that senses the angular position of the drive wheel 594. For example, the sensor 602 may be a magnetic proximity sensor that detects when an enlarged portion 604 of the drive wheel 594 is adjacent the sensor 602.

Referring to FIG. 14, in the operation of the bonding unit 218, informational items 20 may be automatically provided, one at a time, to the nip or intersection of the upper and lower conveyor belt(s) 472, 502 at the left-hand portion of the bonding unit 218 which is disposed immediately adjacent the support rollers 460, 496. The informational items 20 may be automatically provided to the bonding unit 218 directly from the conveyor unit 1404 (FIG. 20) of the visual inspection unit 1400, or they may alternatively be automatically provided via an intermediate conveyor (not shown) between the visual inspection unit 1400 and the bonding unit 218, or another conveyor can be added to the bonding unit 218. The details regarding the design and number of the conveyor units used to transfer the informational items 20 from the visual inspection unit 1400 to the bonding unit 218 are not considered important to the invention.

Each time an informational item 20 is introduced between the upper and lower conveyor belt(s) 472, 502, it may be conveyed upwardly due to the frictional contact between the conveyor belt(s) 472, 502 and the informational item 20 and the fact that the conveyor belt(s) 472, 502 are driven via the motor 510. As it moves upwardly and to the right in FIG. 14, the informational item 20 may pass underneath the sensor 522, which may detect its presence and transmit a detect signal to the controller 530 via the line 532.

When the informational item 20 passes underneath the adhesive applicator 524, which may be in the form of a nozzle, for example, the adhesive applicator 524 may apply adhesive to the upwardly disposed face of the informational item 20. Whether or not adhesive is applied to the informational item 20 depends upon whether the informational item 20 is to be bonded to a preexisting stack 10 of informational items being bonded together.

For example, if the bonding unit 218 is to form stacks 10 of informational items 20, with each stack 10 being composed of eight informational items 20 bonded together, the controller 530 may be programmed to cause the adhesive applicator 524 to not apply adhesive to the first informational item 20, then to apply adhesive to the next seven informational items 20 which successively pass underneath the adhesive applicator 524 (causing the first eight informational items 20 to be bonded together). After passage of the first eight informational items 20, the controller 530 could be programmed to then cause the adhesive applicator 524 to skip a single informational item 20 by not applying adhesive thereto, and then to apply adhesive to the next seven consecutive informational items 20. Further details regarding the controller 530 are described below.

The precise time at which adhesive is applied by the applicator 524 may be controlled based on the speed of the conveyor belt(s) 472, 502, as sensed by the sensing wheel 526 and transmitted to the controller 530 via the rotary encoder 528, and the known path distance between the sensor 522 and the adhesive applicator 524. Thus, after sensing of an informational item 20 by the sensor 522, the controller 530 may wait a length of time, which varies with the speed of the conveyor belt(s) 472, 502, before signaling the adhesive applicator 524 to deposit adhesive, during which waiting time the position of the informational item 20 will have changed from being beneath the sensor 522 to being beneath the adhesive applicator 524.

After passing underneath the adhesive applicator 524, the informational item 20 continues moving upwardly and to the right between the conveyor belt(s) 472, 502 until it reaches the support wheels 468, after which the informational item 20 may be conveyed downwardly between the belt(s) 472, 502 in a generally vertical direction.

Referring to FIG. 14A, when the informational item 20 reaches a sensing position disposed horizontally adjacent the sensor 600, the sensor 600 may activate the clutch 598 to cause the motor 596 to begin to rotate the drive wheel 594. As the drive wheel 594 rotates, the slide block 586 and the pusher arm 580 and pusher plate 582 which are connected thereto may move from left to right in FIG. 14A.

By the time the pusher plate 582 moves rightwardly past the conveyor belt 502, the informational item 20 will have moved from its sensing position adjacent the sensor 600 to a loading position on top of the ends of the base members 560, which extend between the laterally spaced apart lower conveyor belt(s) 502, as shown in FIGS. 14A and 14B. In the loading position, both faces of the informational item 20 are disposed vertically, and one of the faces rests against the conveyor belt(s) 502.

With the informational item 20 in that loading position, the continued rightward movement of the pusher plate 582 may force the informational item 20 from its loading position to a contact position, in which the informational item 20 may be forced against the rearward face of the last (or most leftward) informational item 20 in the stack 10 being formed. If adhesive was deposited on the forward (or rightward) face of the informational item 20, the force applied by the pusher plate 582 may cause the informational item 20 to be bonded to previous informational item 20 in the stack 10.

In order to enhance bonding efficiency, various ways of increasing the force with which the most recent informational item 20 is pushed against the stack 10 may be utilized. For example, the rightward movement of the stack 10 may be retarded by placing a weight, such as a brick or metal plate (not shown) on top of the base members 560 and to the right of the rightmost stack 10 to retard the rightward movement of the stack(s) 10. Alternatively, the base members 560 may be disposed at an inclined angle (their elevation may increase from left to right) to achieve a similar effect.

As the drive wheel 594 continues to rotate, the pusher plate 582 may be retracted back towards its starting position. When the drive wheel 594 reaches its starting position, as sensed by the sensor 602, the clutch 598 may disengage the motor 596 from the drive wheel 594 so that the pusher plate 582 may return to its position shown in FIG. 14A.

It should be understood that the structural details shown in FIG. 14A are not shown to scale and that the stroke length of the pusher plate 582 could be changed by varying the diameter of the drive wheel 594 or by changing the point at which the arm 590 connects to the drive wheel 594. At any one time, there may be multiple informational items 20 in transit within the bonding unit 218 between the starting position and a loading position on top of the base members 560.

Figure 16:
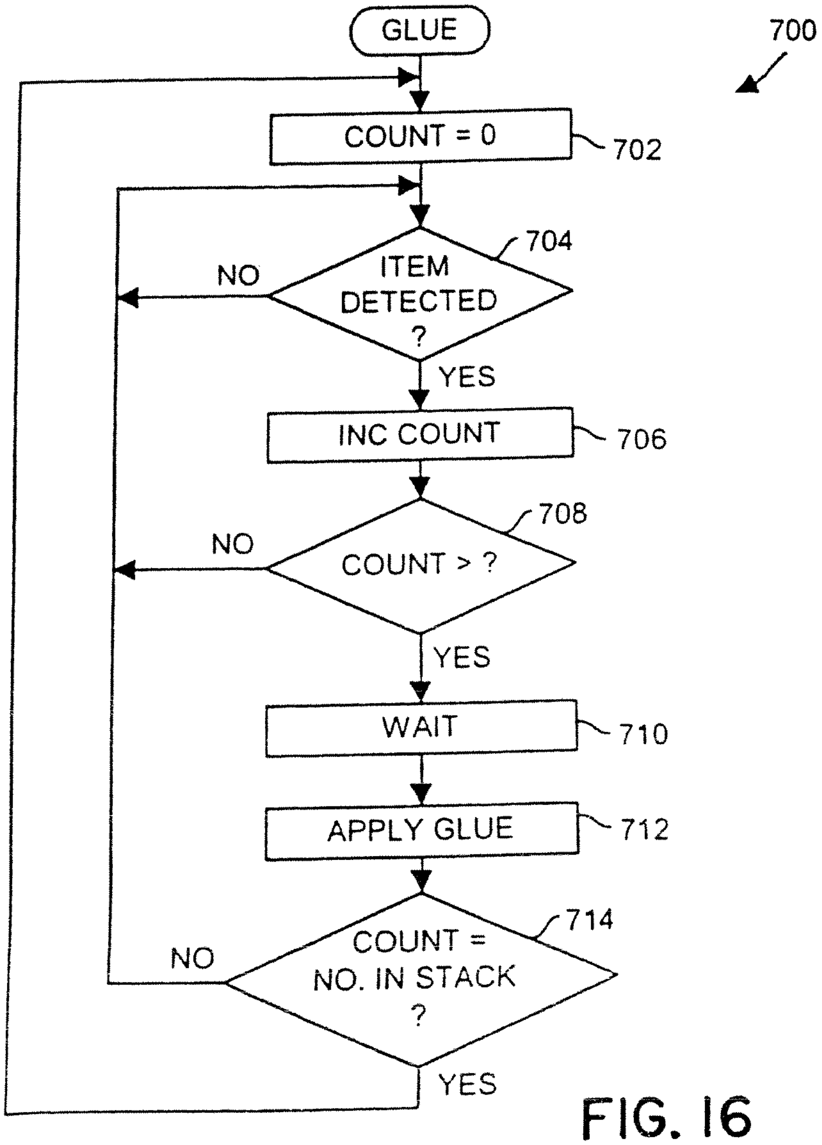
FIG. 16 illustrates a number of acts that may be performed during the process of bonding a plurality of informational items together in a stack.

Further details regarding the operation of the controller 530 are shown in FIG. 16, which illustrates a number of acts that could be performed during a gluing process 700. Referring to FIG. 16, at block 702 a count variable may be initialized to zero. The count variable may be used to keep track of the number of informational items 20 that pass through the bonding unit 218 as detected by the sensor 522 (FIG. 14). For example, the first informational item 20 in each stack 10 could correspond to a count of one, the third informational item 20 in each stack 10 could correspond to a count of three, etc.

At block 704, the controller 530 may wait until an informational item 20 is detected by the sensor 522. When an informational item 20 is detected, at block 706 the value of count may be incremented by one.

Where adhesive is applied to the leading face of each informational item 20, or the face that is disposed forwardly (to the right in FIGS. 14 and 14A) when the informational item 20 is oriented in a vertical position, adhesive is not applied to the first informational item 20 of each stack 10 to be formed, but is applied to every informational item 20 in the stack 10 to be formed that follows the first informational item 20. Thus, at block 708, only if the value of the count variable is greater than one, meaning the current informational item 20 is not the first one in the stack 10, the process passes to blocks 710 and 712 which cause adhesive to be applied to the current informational item 20.

At block 710, the controller 530 may wait for a period of time, which may depend on the path distance between the sensor 522 and the glue applicator 524 and the speed of the upper and lower conveyor belt(s) 472, 502, and then at block 712 the controller 530 may cause the adhesive applicator 524 to apply glue to the moving information item 20, which was detected at block 704 and which is now positioned underneath the adhesive applicator 524 due to the waiting period of block 710.

At block 714, if the current value of the count variable equals a pre-selected number of informational items 20 to be included in each stack 10, meaning that the current informational item 20 to which glue may have just been applied is the last informational item 20 in the current stack 10, the process may branch back to block 702 where the count variable is reset to zero since the next stack 10 is to be formed. Otherwise, the process may branch back to block 704 to wait for the next informational item 20. Obviously, if adhesive is applied to the opposite face of each of the informational items 20, adhesive would be applied to each informational item 20 in the stack 10 to be formed except for the last informational item 20 in the stack 10.

Overall Operation of Outsert Forming and Bonding Machine

In the overall operation of the outsert forming and bonding machine 200*a* shown in FIG. 5A, the printer 202 may continuously generate sheets of material having printed information disposed thereon, such as the sheet 30 shown in FIG. 2A or the sheet 70 shown in FIG. 3A. The printed sheets may then be transferred by the transfer unit 204 from the printer 202 to the accumulator 206, and then fed by the sheet feeder 208.

Prior to being folded by the folding unit 210, the sheets could be subjected to a water scoring process to make subsequent folding of the sheets easier. In the water scoring process, a plurality of spray nozzles or other apparatus could be used to spray or otherwise apply a plurality of parallel lines of water or other liquid to the sheet at linear positions at which subsequent folds are to be made. The application of the water or other liquid may allow the subsequent folding to be made better or easier.

The folding unit 210 may make one or more folds in each of the sheets, with each fold being made parallel to a first direction. The folds may correspond to the folds described above in connection with FIG. 2B; the folds may correspond to those shown in FIGS. 3B-3F; or they may correspond to some other series of folds.

After being folded by the folding unit 210 and prior to being fed into the folding unit 212, the folded articles may be subjected to a physical scoring process to make subsequent folding easier (for example, if the water scoring process described above was not used). For example, each of the folded articles may be passed through a physical scoring apparatus so that a plurality of parallel, non-cutting scores or slight bends are made in each folded article, with each score line being positioned to coincide with the position at which a subsequent fold is to be made. The scoring apparatus may include, for example, an upper and lower scoring assembly, with each such assembly comprising a plurality of non-cutting, scoring disks mounted on the rod at spaced-apart locations.

The folded articles may be supplied to the folding unit 212, which may make one or more folds in a direction perpendicular to the direction in which the folds were made by the folding unit 210. The folding unit 212 may make one or more folds like the ones described above in connection with FIG. 2C or 2D; the folding unit 212 may make one or more folds like the ones described above in connection with FIGS. 3G, 3H and/or 3I; or the folding unit 212 may make some other fold or combination of folds.

The folded articles may then by conveyed to the pressing unit 214 where they are subjected to pressure so that subsequent folds are easier to make. The folded articles may then be conveyed to the folding unit 216, where a final fold may be made to transform the folded articles into the informational items 20. The informational items 20 may then be automatically conveyed to the bonding unit 218 where they are bonded together into stacks 10 as described above in detail in connection with FIGS. 14, 14A, 14B, 15 and 16.

Additional Outsert Forming Embodiments

FIG. 5B is a block diagram of an additional embodiment of an outsert-forming machine 200*b*. Referring to FIG. 5B, the outsert-forming machine 200*b* may be identical to the outsert-forming machine 200*a* shown in FIG. 5A and described above in detail, except that the machine 200*b* of FIG. 5B may utilize a stacking unit 760 instead of the bonding unit 218 shown in FIG. 5A.

The stacking unit 760 may have any structure that is capable of manipulating the outserts so that they form, for example, a horizontal stack or a vertical stack. The bonding unit 218 described above could be used as the stacker 760. When used as the stacking unit 760, the bonding unit 218 may be programmed not to apply any adhesive to the outerts via the adhesive applicator 524 (FIG. 14). Alternatively, the stacking unit 760 may be substantially the same as the bonding unit 218, except for the omission of the adhesive applicator 524 and the controller 530 used to control the application of adhesive.

The stacking unit 760 could include a kicker arm or other mechanism to periodically laterally offset a selected informational item. For example, the kicker arm could laterally offset, such as by one-fourth of an inch, every 20th informational item that is stacked to allow, for example, an operator to readily determine how many informational items have accumulated. Such a kicker arm could be disposed to laterally offset an information item disposed between the belt(s) 472, 502 (FIG. 14) after the informational item passes underneath the sensor 522. The controller 530 could keep track of a continuing count of passing informational items and could periodically activate the kicker arm to laterally offset every 50th informational item, for example.

FIG. 5C is a block diagram of an additional embodiment of an outsert-forming machine 200*c*. Referring to FIG. 5C, the outsert-forming machine 200*c* may be identical to the outsert-forming machine 200*a* shown in FIG. 5A and described above in detail, except that the machine 200*b* of FIG. 5C may utilize an extra pressing unit 214 and an extra folding unit 216 prior to the bonding unit 218.

As one possible example, the machine 200*c* may be used to form outserts in accordance with the method shown in FIGS. 3A-3J and described above. In that case, the folding unit 210 could be used to make the folds described above in connection with FIGS. 3B through 3F; the folding unit 212 could be used to make the two folds 88, 92 shown in FIGS. 3G and 3H; the first folding unit 216 shown in FIG. 5C could be used to make the fold 96 shown in FIG. 3I; and the second folding unit 216 shown in FIG. 5C could be used to make the fold 102 shown in FIG. 3J.

FIG. 5D is a block diagram of another embodiment of an outsert-forming machine 200*d*. Referring to FIG. 5D, the outsert-forming machine 200*d* may be identical to the outsert-forming machine 200*c* shown in FIG. 5C and described above, except that the machine 200*d* of FIG. 5D may utilize the stacking unit 760 instead of the bonding unit 218.

Although each of the embodiments described above and below in connection with FIGS. 5A-5D and 6A-6D includes the printer 202, the transfer unit 204, the accumulator 206, and the sheet feeder 208, it should be understood that further embodiments that do not use those components may be utilized. For example, various embodiments which do not include the components 202, 204, 206, 208 may be used to process sheets that are preprinted or printed at another location or by another company.

Booklet Forming and Bonding Machine Embodiments

FIG. 6A is a block diagram of one possible embodiment of a booklet forming and bonding apparatus 800*a* that could be used to perform the booklet-forming methods described above. Referring to FIG. 6A, the apparatus 800*a* may be provided with a number of the same or similar components described above in connection with the outsert-forming machines 200*a*-200*d*, including the printer 202, the transfer unit 204, the accumulator 206, the sheet feeder 208, the folding units 210, 212, 216, the press 214, and the bonding unit 218, the operation of which may be the same or generally the same as described above.

The booklet forming and bonding apparatus 800*a* may be provided with three additional components, including an adhesive applicator 802, a cutter or slitter 804 and a closure applicator 806. The adhesive applicator 802 may be used to apply a line of adhesive or plurality of adhesive portions along a line to a sheet of material before it is fed to the folding unit 210, as described above in connection with FIGS. 4A-4E. The slitter 804 may be used to slit or cut off the folded side edges 124, 126 of the article 122, as described above in connection with FIG. 4D. The closure applicator 806 may be used to apply the closure member 140 to form a closed booklet, as described above in connection with FIG. 4F. Further details regarding the components 802, 804, 806 are disclosed in U.S. Ser. No. 09/326,821 filed in the U.S. Patent Office on Jun. 7, 1999, which is incorporated by reference herein. The particular structure of those components is not considered important to the invention, and other designs could be used.

FIG. 6B is a block diagram of another possible embodiment of a booklet forming and bonding apparatus 800*b* that could be used to perform the booklet-forming methods described. The apparatus 800*b* of FIG. 6B may be identical to the apparatus 800*a* of FIG. 6A, except that the apparatus 800*b* may incorporate the stacking unit 760 instead of the bonding unit 218.

FIG. 6C is a block diagram of another possible embodiment of a booklet forming and bonding apparatus 800*c* that could be used to perform booklet-forming methods. The apparatus 800*c* of FIG. 6C may be identical to the apparatus 800*a* of FIG. 6A, except that the apparatus 800*c* may incorporate an extra pressing unit 214 and an extra folding unit 216.

FIG. 6D is a block diagram of another possible embodiment of a booklet forming and bonding apparatus 800*d* that could be used to perform booklet-forming methods. The apparatus 800*d* of FIG. 6D may be identical to the apparatus 800*c* of FIG. 6C, except that the apparatus 800*d* may incorporate the stacking unit 760 instead of the bonding unit 218.

Pressing Unit 214*b*

FIGS. 17 and 17A-17C illustrate an embodiment of a pressing unit 214*b* that could be used as the pressing unit 214 schematically shown in FIGS. 5A-5D and 6A-6D. The pressing unit 214*b* of FIGS. 17 and 17A-17C could be used to apply a pressure in various ranges between about 30 psi and about 500 psi to folded articles that pass through the pressing unit 214*b*.

Figure 17:
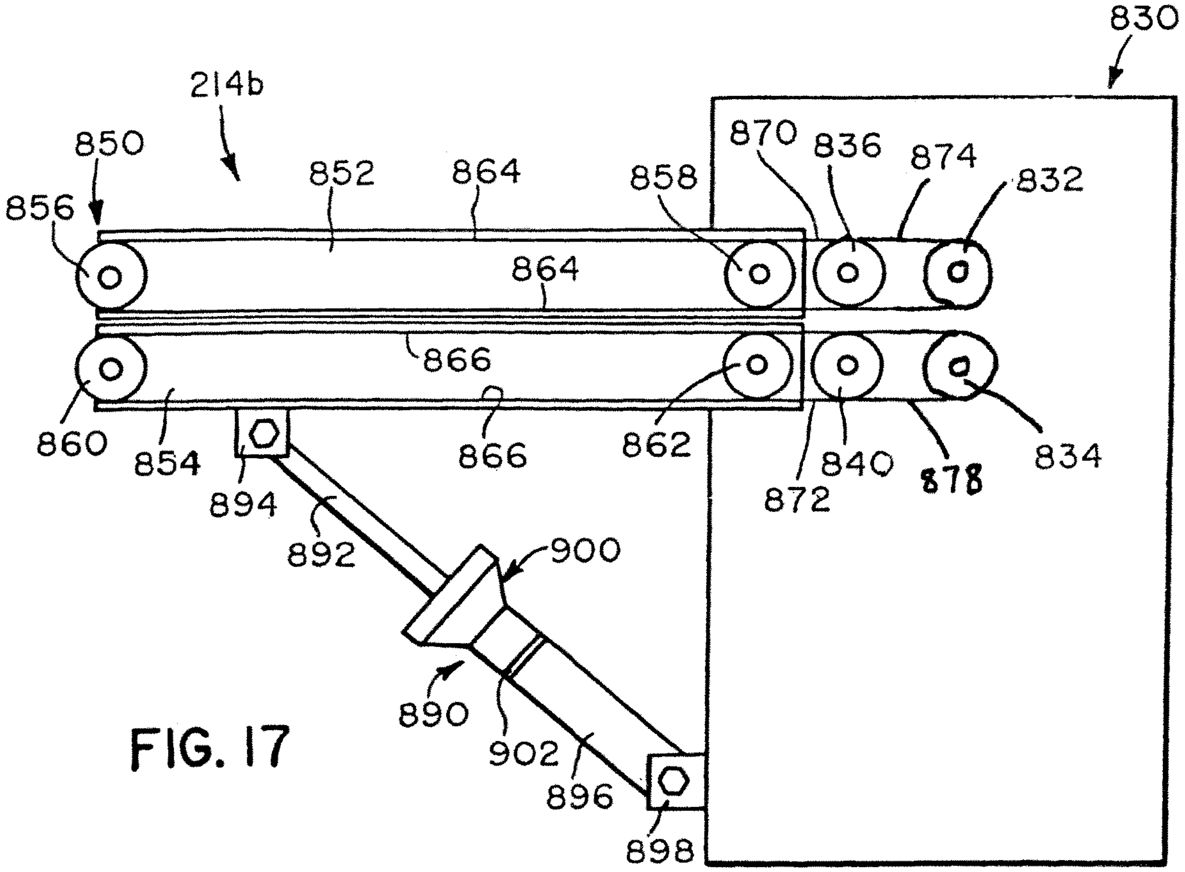
FIGS. 17 and 17A-17C illustrate a second possible embodiment of the pressing unit shown schematically in FIGS. 5A-5D and 6A-6D.
Figure 17A:
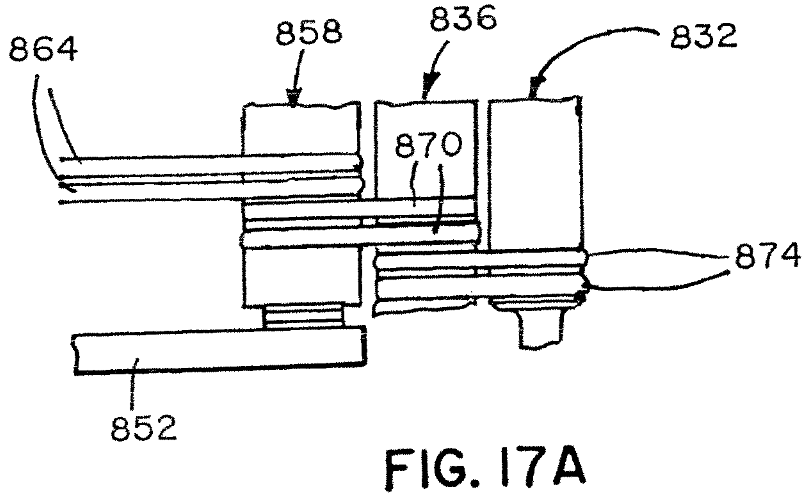
Figure 17B:
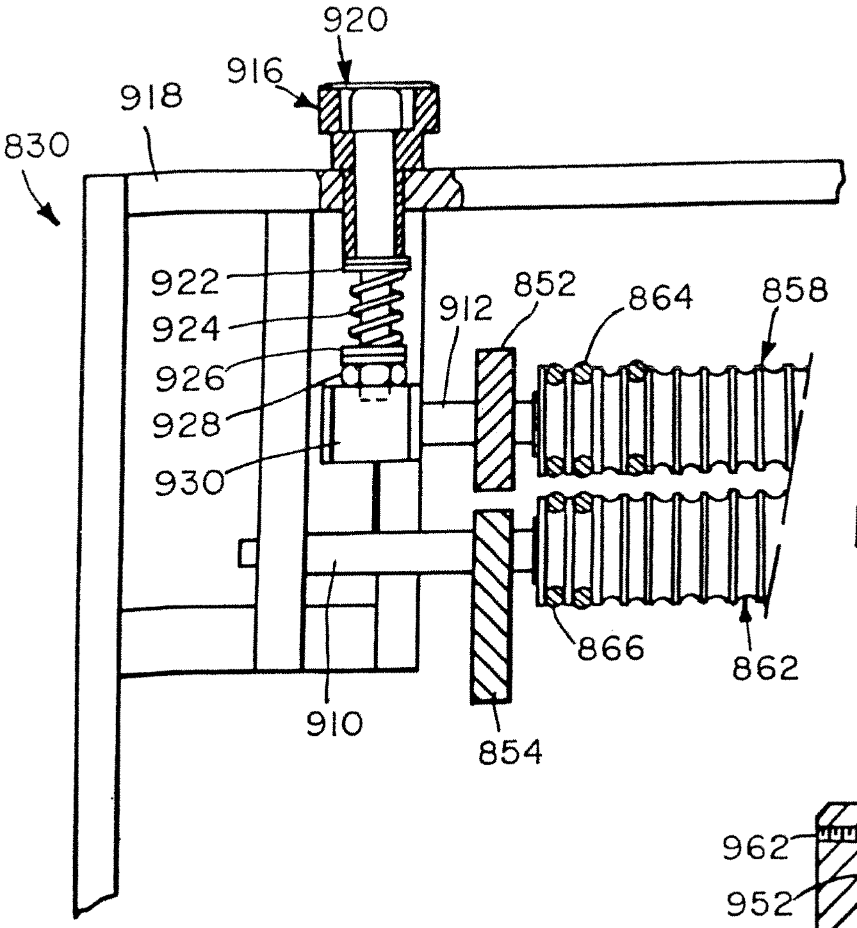
Figure 17C:
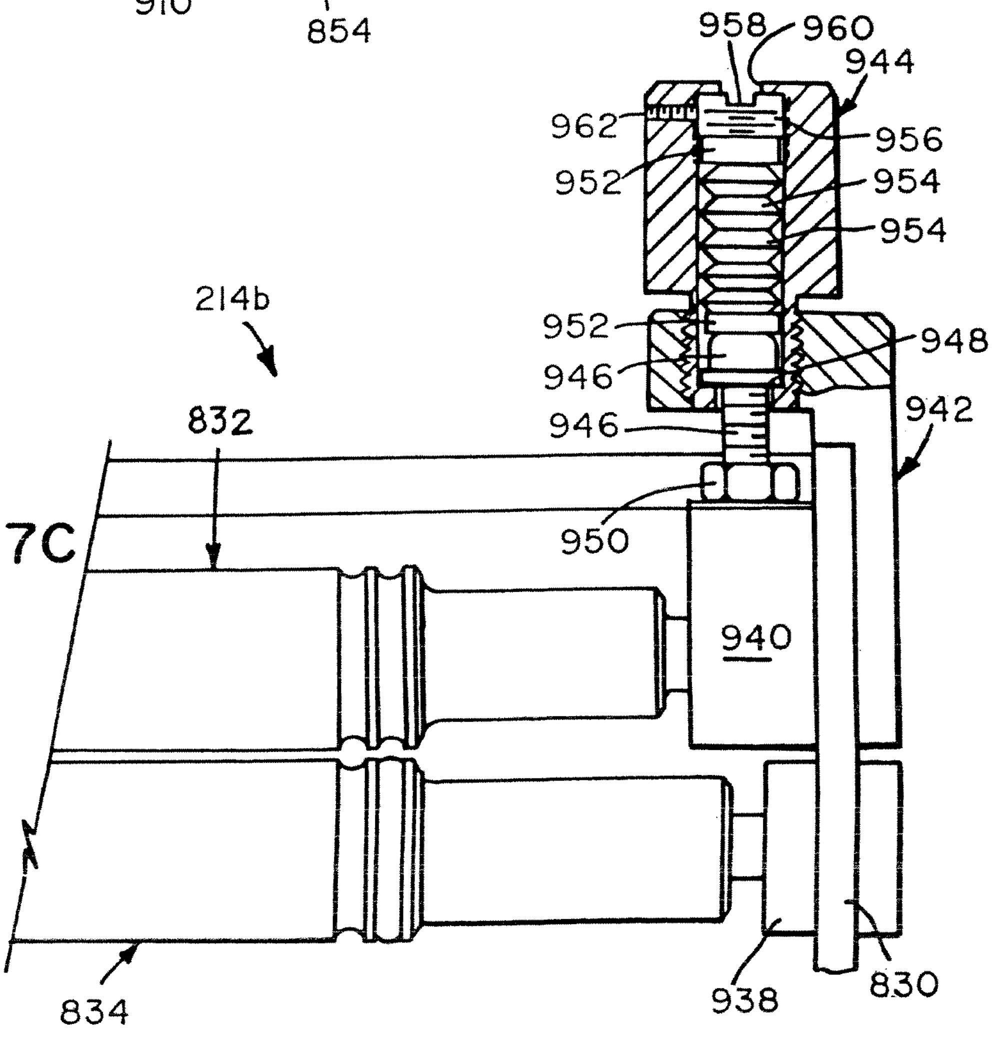

FIG. 17 is a side view illustrating a number of components of the pressing unit 214*b* and omits a number of components for the sake of clarity, a number of which are shown in FIGS. 17A-17C. Referring to FIG. 17, the pressing unit 214*b* includes a support frame or structure 830 that rotatably supports an upper pressure roller 832 and a lower pressure roller 834. The support structure 830 could include two parallel, spaced-apart support frames between which the pressure rollers 832, 834 could be disposed, in which case only the rear support frame is shown in FIG. 17 to allow the pressure rollers 832, 834 and other components to be shown. In FIG. 17, folded articles may be passed between the pressure rollers 832, 834 from left to right.

The pressing unit 214*b* may be provided with an upper inlet transfer roller 836 that may be disposed adjacent a side of the upper pressure roller 832. Similarly, the pressing unit 214*b* may be provided with a lower inlet transfer roller 840 that may be disposed adjacent a side of the lower pressure roller 834. In FIG. 17, the vertical spacing between the upper and lower pressure rollers 832, 834 and the upper and lower transfer rollers 836 and 840 has been exaggerated for purposes of clarity.

The pressure rollers 832, 834 may be rotatably driven in any manner, such as by an electric motor (not shown) that is drivably coupled to the pressure rollers 832, 834 by any type of coupling mechanism (not shown). For example, the coupling mechanism could be provided in the form of a plurality of rotatable shafts coupled between a pair of spaced-apart plates of the support structure 830, with each of the rotatable shafts having one or more sprockets or pulleys. The coupling mechanism could also include one or more sprockets or pulleys disposed or integrally formed with shafts that support the pressure rollers 832, 834. The coupling mechanism could further include one or more drive belt(s) or chains that pass around the sprockets or pulleys so that rotation of one set of sprockets or pulleys, caused by the drive shaft of the electric motor, causes rotation of the remaining sprockets or pulleys. The particular manner of rotatably driving the pressure rollers 832, 834 is not considered important to the invention, and various ways of driving them could be utilized.

The pressing unit 214*b* may be provided with an inlet conveyor 850. The inlet conveyor 850 may include an upper support structure, which may comprise a pair of spaced-apart upper conveyor frame members 852 (only one of which is shown in FIG. 17), each having a first end proximal to the support structure 830 (to the right in FIG. 17) and a second end distal from the support structure 830. The inlet conveyor 850 may include a lower support structure, which may comprise a pair of spaced-apart lower conveyor frame members 854 each having a first end proximal to the support structure 830 and a second end distal from the support structure 830.

The upper conveyor frame members 852 may have a first conveyor roller 856 rotatably mounted between them at their distal ends and a second conveyor roller 858 rotatably mounted at their proximal ends. The lower conveyor frame members 854 may have a first conveyor roller 860 rotatably mounted between them at their distal ends and a second conveyor roller 862 rotatably mounted at their proximal ends. One or more conveyor belt(s) 864 may be supported by the upper conveyor rollers 856, 858, and one or more conveyor belt(s) 866 may be supported by the lower conveyor rollers 860, 862.

Referring to FIGS. 17 and 17A, one or more drive belt(s) 870 may be supported in a pair of grooves or slots formed in the upper conveyor roller 858 and the upper inlet transfer roller 836 to cause the upper conveyor roller 858 to rotate with the upper inlet transfer roller 836, and one or more drive belt(s) 872 may be supported in a pair of grooves or slots formed in the lower conveyor roller 862 and the lower inlet transfer roller 840 to cause the lower conveyor roller 862 to rotate with the lower inlet transfer roller 840.

One or more drive belt(s) 874 may be supported in a pair of grooves or slots formed in the upper inlet transfer roller 836 and the upper pressure roller 832 to cause those two rollers 832, 836 to rotate together. Although two drive belt(s) 874 are shown in FIG. 17A, only one or more than two drive belt(s) 874 may be utilized in different implementations. One or more drive belt(s) 878 may be supported in a pair of grooves or slots formed in the lower inlet transfer roller 840 and the lower pressure roller 834 to cause those two rollers 834, 840 to rotate together. Although two drive belt(s) 878 are shown in FIG. 17A, only one or more than two drive belt(s) 874 may be utilized in different implementations. Optionally, one or more of the rollers 858, 862, 832, 834, 836 and 840 may have additional grooves or slots formed in each end to facilitate mounting of additional drive belt(s).

The pressing unit inlet conveyor 850 may be adjustable in a variety of ways. For example, the distal ends of the conveyor frame members 852, 854 may be raised and lowered to allow the pressing unit 214*b* to be positioned adjacent a variety of article folding or processing units, and to facilitate the automatic transfer of folded articles from such units to the pressing unit 214*b*.

Referring to FIG. 17, the proximal ends of each of the conveyor frame members 852, 854 may be pivotally connected to the main support structure 830, and one or both of the conveyor frame members 852, 854 may be supported by an adjustable support mechanism 890, which may be coupled between the lower conveyor frame members 854 and a lower portion of the support structure 830.

The adjustable support mechanism 890 may include a threaded rod 892 directly or indirectly coupled to the lower support frames 854 via a bracket 894, a hollow cylindrically shaped member 896 coupled to the main support structure 830 via a bracket 898, a hand-rotatable crank or handwheel 900 having an interior threaded bore passing therethrough, and a washer, such as a nylon washer 902.

The vertical position or elevation of the distal end of the lower conveyor frame members 854 may be adjusted by manually turning the handwheel 900, which due to the threaded connection between the threaded rod 892 and the internally threaded bore formed in the handwheel 900, causes the rod 892 either to move inwardly into the hollow interior of the cylinder 896 and thus lower the proximal end of the lower conveyor frame members 854, or to move outwardly out of the interior of the cylinder 896 and thus raise the proximal end of the lower conveyor frame members 854.

Movement of the proximal end of the lower conveyor frame members 854 may cause similar movement of the upper conveyor frame members 852. For example, the upper conveyor frame members 852 may rest on the lower conveyor frame members 854. Alternatively, the distal ends of the upper conveyor frame members 852 may be supported by a support mechanism (not shown in FIG. 17) that rests on or is otherwise coupled to the lower conveyor frame members 854, that causes the upper conveyor frame members 852 to be supported a given distance (which may be adjustable) above the lower conveyor frame members 854.

For example, such a support mechanism could include a threaded rod (not shown in FIG. 17) that extends through a threaded bore in one of the upper conveyor frame members 852 and makes contact with an upper surface of one of the lower conveyor frame members 854. Rotation of the threaded rod, such as by rotation of a knurled knob or crank attached to the threaded rod, may vary or adjust the distance between the distal ends of the conveyor frame members 852, 854.

FIG. 17B is an end view (looking from the left in FIG. 17 at a point midway along the length of the inlet conveyor 850), shown partly in cross-section, of portions of the pressing unit 214*b* with other portions not being shown in FIG. 17B for sake of clarity. Referring to FIG. 17B, the proximal end of each of the lower conveyor frame members 854 may be pivotally connected to a portion of the main support structure 830. That pivot connection could be accomplished by a fixed-position, non-rotatable lower pivot rod 910 which passes through a hole in each of the lower conveyor frame members 854 so that the lower conveyor frame members 854 may pivot about the lower pivot rod 910. Each proximal end of the conveyor frame members 852, 854 may be U-shaped, and a threaded locking screw may be threaded through the end of each U-shaped portion so that the conveyor frame members 852, 854 may be held at a desired position and then locked into that position by tightening the locking screws. The proximal ends of each of the upper conveyor frame members 852 may be pivotally connected to the main support structure 830 in a similar manner via an upper pivot rod 912.

Referring to FIG. 17B, the spacing between the conveyor rollers 858, 862 may be changed by changing the elevation of the upper conveyor roller 858 via an adjustment mechanism, which may be provided in the form of an adjustment screw 916. The adjustment screw 916 may be threaded into a threaded bore formed in an upper plate 918 of the main support structure 830 so that rotation of the adjustment screw 916 changes the elevation of the top of the screw 916 relative to the upper plate 918.

The adjustment screw 918 may have a hollow interior portion in which a support bolt 920 is disposed. The support bolt 920 may have an upper head portion having a relatively large diameter that is supported on an annular shelf or shoulder portion formed in the interior of the adjustment screw 916. The support bolt 920 may pass through an upper washer 922, a helical spring 924, a lower washer 926, and a nut 928. The lower end of the support bolt 920 may be threaded into a support block 930 that supports the upper pivot rod 912, which in turn supports the upper conveyor frame member 852 and the upper conveyor roller 858.

The elevation of the upper conveyor roller 858 may be changed by rotating the adjustment screw 916. Rotation in one direction will cause the position of the adjustment screw 916, and thus the support bolt 920 and the upper conveyor roller 858, to be raised relative to the main support structure 830, and thus to the lower conveyor roller 862, increasing the vertical spacing between the conveyor rollers 858, 862.

The upper portion of the support bolt 920 (at least the portion disposed above the spring 924) may be provided with a smooth shaft and a smaller diameter than that of the bore formed in the adjustment screw 916. In that case, the upper conveyor roller 858 may freely move upwardly, in which case the support bolt 920 will move upwardly relative to the adjustment screw 916, compressing the spring 916 in the process. The spring 924 may provide a relatively small amount of spring force or pressure, such as about 20 psi or lower. Allowing such upward movement of the upper conveyor roller 858 may be desirable to prevent damage to the conveyor rollers 858, 862 in case an unexpectedly thick item unintentionally or accidentally passes through the conveyor rollers 858, 862.

FIG. 17C is a side view of a portion of the pressing unit 214*b* that illustrates one manner in which the pressure rollers 832, 834 may be supported within the pressing unit 214*b*. Referring to FIG. 17C, each end of the lower pressure roller 834 may be rotatably supported in a fixed position in a respective bearing member 938 supported by the main support structure 830. Each end of the upper pressure roller 832 may be rotatably supported via a respective bearing member 940. The bearing members 940 may be slidably supported by the main support structure 830, for example, by at least a portion of the bearing member 940 being disposed within a vertically disposed slot formed in a portion of the main support structure, so that each bearing member 940 is vertically slidable.

A bracket 942 may be mounted to the main support structure 830, and the bracket 942 may have an upper portion with a threaded hole formed therein. An elevation-adjustment member 944 may be provided to allow adjustment of the elevation of the upper pressure roller 832. The elevation-adjustment member 944 may be provided with a lower threaded portion that passes through and mates with the threads of the threaded bore formed in the bracket 942. In that case, rotation of the elevation-adjustment member 944 will raise or lower the elevation-adjustment member 944 relative to the bracket 942, the main support structure 830, and the lower pressure roller 834 fixed to the main support structure 830.

The elevation-adjustment member 944 may be provided with a hollow interior portion and a lower end having an annular collar or shoulder that may support a support bolt 946 that may pass through a washer 948. The support bolt 946 may have a threaded end that passes through a lock nut 950 and is threaded into the bearing member 940 to support the bearing member 940 at an elevation. Rotation of the elevation-adjustment member 944 will change its elevation relative to the bracket 942 fixed to the main support structure 830, which will thus raise the elevation of the upper pressure roller 832 relative to the main support structure 830, thus changing the spacing between the pressure rollers 832, 834 since the lower pressure roller 834 is fixed relative to the main support structure 830.

The interior hollow portion of the elevation-adjustment member 944 may be provided with one or more spacers 952, a plurality of pressure members 954, and a pressure-adjustment member 956. Each of the pressure members 954 may be provided in the form of a generally cone-shaped washer, which is commonly known in the art as a Belleville washer. The pressure-adjustment member 956 may be a cylindrically shaped member having an exterior threaded portion that threadably mates with a corresponding threaded portion formed in the upper interior portion of the elevation-adjustment member 944. The upper surface of the pressure-adjustment member 956 may have a shaped recess 958, such as a hexagonally shaped recess, to allow the pressure-adjustment member 956 to be rotated by using a tool, such as a hex wrench, that is passed through an opening 960 formed in the upper portion of the elevation-adjustment member 944. The position of the pressure-adjustment member 956 may be fixed or locked by a locking screw 962 that is threaded through a threaded bore formed in the side of the elevation-adjustment member 944. The end of the locking screw 962 may make physical contact with the outer surface of the pressure-adjustment member 956 to lock the latter in place.

Rotating the pressure-adjustment member 956 within the hollow interior of the elevation-adjustment member 944 may vary the pressure which is exerted on the folded articles as they pass through the pressing unit 214*b*. The pressure exerted on the folded articles by the pressing unit 214*b* also depends on the size and shape of the pressure members 954 that are used. For example, where Belleville washers are used, the pressure exerted by the Belleville washers depends on the diameter of the washers, the material from which the washers are made (e.g. steel or a particular type of steel) and the degree to which the side surfaces of the washers are angled. The pressure members 954 may be selected so that folded articles passing through the pressing unit 214*b* are subjected to a pressure that lies within any one of the following pressure ranges: a) 30-100 psi; b) 30-200 psi; c) 30-500 psi; d) 50-200 psi; or e) 50-500 psi.

Folding Unit 216*b*

Figure 18A:
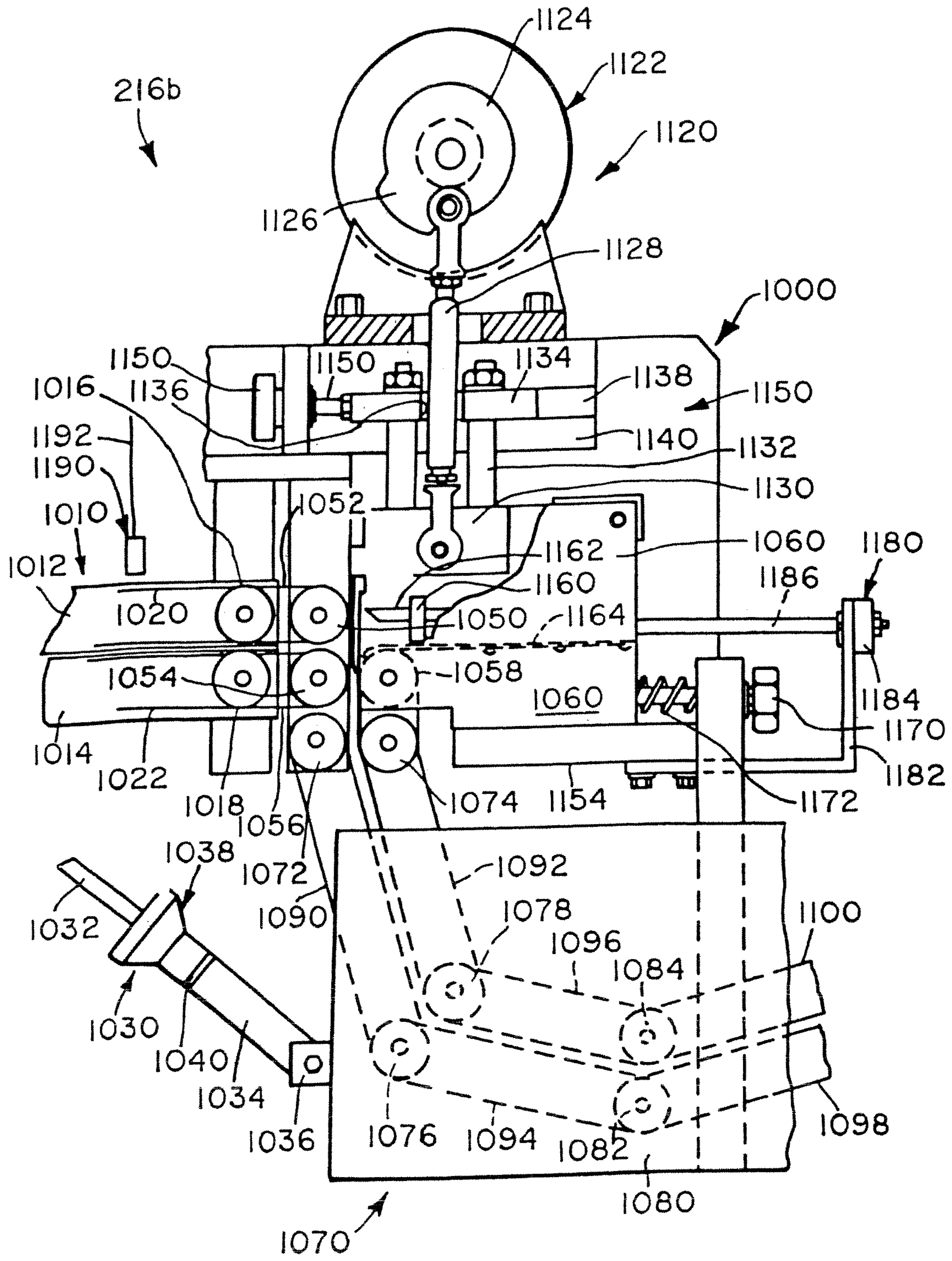
FIGS. 18A-18E illustrate a second possible embodiment of the folding unit 216 shown schematically in FIGS. 5A-5D and 6A-6D.

FIGS. 18A-18E illustrate a folding unit 216*b* that could be utilized as the folding unit 216 shown schematically in FIGS. 5A-5D and 6A-6D. Referring to FIG. 18A, the folding unit 216*b* may be provided with a main support structure 1000 and an inlet conveyor 1010. The inlet conveyor 1010 may include an upper support structure, which may comprise a pair of spaced-apart members or frames 1012 and a lower support structure, which may comprise a pair of spaced-apart members or frames 1014.

The upper conveyor frame members 1012 may have a plurality of upper conveyor rollers 1016 rotatably mounted between them, and the lower conveyor frame members 1014 may have a plurality of lower conveyor rollers 1018 rotatably mounted between them. One or more conveyor belt(s) 1020 may be supported by the upper conveyor rollers 1016, and one or more conveyor belt(s) 1022 may be supported by the lower conveyor rollers 1018. The conveyor rollers 1016, 1018 may have the same structure as the conveyor rollers 858, 862 shown in FIGS. 17 and 17B and described above.

The proximal ends of each of the upper conveyor frame members 1012 may be pivotally connected to the main support structure 1000, and one or both of the lower conveyor frame members 1014 may be supported by an adjustable support mechanism 1030, which may be coupled between the lower conveyor frame members 1014 and a lower portion of the support structure 1000.

The adjustable support mechanism 1030 may include a threaded rod 1032 directly or indirectly coupled to the lower conveyor frame members 1014 via a bracket (not shown), a hollow cylindrically shaped member 1034 coupled to the main support structure 1000 via a bracket 1036, a hand-rotatable crank or handwheel 1038 having an interior threaded bore passing therethrough, and a washer, such as a nylon washer 1040. The position and elevation of the conveyor frame members 1012, 1014 and the spacing between the conveyor frame members 1012, 1014 may be adjusted in the same manner as the elevation of and spacing between the conveyor frame members 852, 854 of the pressing unit 214*b* described above in connection with FIGS. 17 and 17B.

The upper conveyor roller 1016 shown in FIG. 18A may be disposed adjacent a transfer roller 1050, and one or more conveyor belt(s) 1052 may be disposed around the upper conveyor roller 1016 and the transfer roller 1050. The lower conveyor roller 1018 shown in FIG. 18A may be disposed adjacent a folding roller 1054 and may be operatively coupled to rotate with the folding roller 1054 via one or more drive belt(s) 1056. A second folding roller 1058 may be disposed adjacent the folding roller 1054, and the second folding roller 1058 may be mounted between a pair of vertically disposed side plates 1060. Each of the folding rollers 1054, 1058 may be provided with a non-smooth, knurled or abraded surface to allow the folding rollers 1054, 1058 to readily grip folded articles passing between them.

An exit conveyor 1070 may be provided to transfer folded articles from between the folding rollers 1054, 1058 to a further processing unit, which may be another pressing unit 214, a bonding unit 218, or a stacking unit 760, for example. The exit conveyor 1070 may include a first pair of conveyor rollers 1072, 1074 disposed below the folding rollers 1054, 1058, a second pair of conveyor rollers 1076, 1078 that may be rotatably supported between a pair of frame members 1080, a third pair of conveyor rollers 1082, 1084 that may be rotatably supported between the frame members 1080, and one or more sets of conveyor belt(s) 1090, 1092, 1094, 1096, 1098, 1100 supported by the conveyor rollers 1072, 1074, 1076, 1078, 1082, 1084. The conveyor rollers 1072, 1074, 1076, 1078, 1082, 1084 may have the same structure as the conveyor rollers 858, 862 shown in FIGS. 17 and 17B and described above. The conveyor roller 1072 may be operatively coupled to the folding roller 1054 via one or more drive belt(s), and the conveyor roller 1074 may be operatively coupled to the folding roller 1058 via one or more drive belt(s).

Figure 18B:
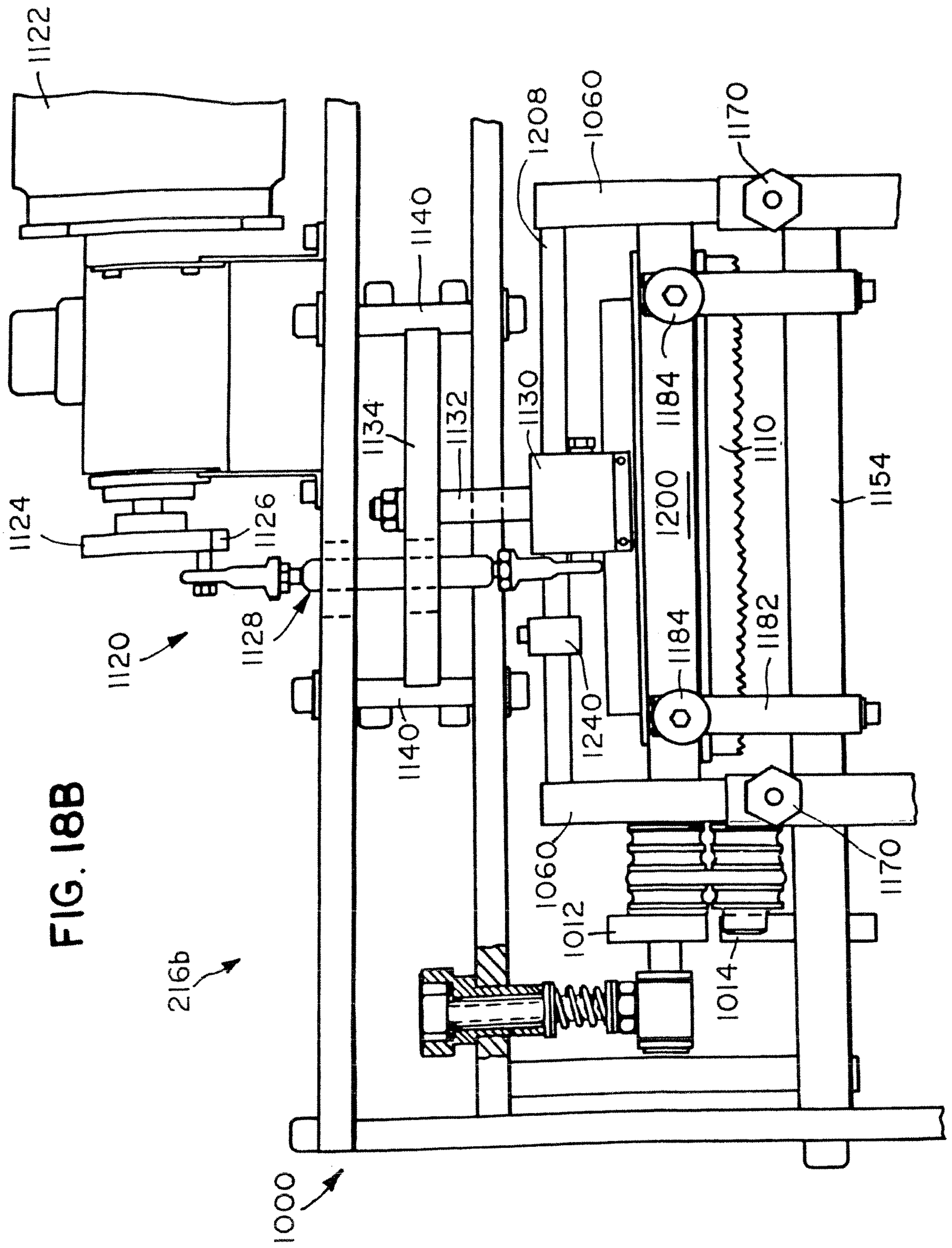

Referring to FIGS. 18A and 18B, a knife or blade member 1110 may be supported for reciprocating vertical movement by a blade-drive assembly 1120. The blade-driving assembly 1120 may include an electric motor 1122, a rotatable drive wheel 1124 having an eccentric portion 1126, a drive arm 1128 having an upper end pivotally attached to the rotatable drive wheel 1124 and a lower end pivotally attached to a vertically reciprocable slide block 1130 to which the blade 1110 is mounted.

The slide block 1130 may have a plurality of vertically disposed bores therethrough, and a pair of guide rods 1132 may pass at least partially through the bores. The guide rods 1132 may be supported by a support plate 1134 having a hole or slot 1136 formed therein to accommodate passage of the drive arm 1128. The support plate 1134 may be slidably disposed in a pair of slots 1138 formed in a pair of vertically disposed plates 1140, and the horizontal position of the support plate 1134, and thus of the slide block 1130 and the blade member 1110, may be adjusted by an adjustment screw 1150, which may be threadably coupled to a side of the support plate 1134.

In operation, upon rotation of the drive wheel 1124 caused by the motor 1122, the drive arm 1128 will move up and down (and pivot somewhat), forcing the slide block 1130 and the blade member 1110 attached to the slide block 1130 to vertically reciprocate. Downward movement of the blade member 1110 may be synchronized so that such downward movement occurs when a folded article overlays the nip between the folding rollers 1054, 1058 so that downward movement of the blade member 110 will force a central portion of the folded article downwards into contact with the folding rollers 1054, 1058, causing the folding rollers 1054, 1058 to make another fold in the folded article as the article passes therebetween.

The synchronization of the downward movement of the blade member 1110 and the passage of folded articles may be accomplished by a first sensor (not shown) that senses folded articles as they pass through the conveyor 1010, a second sensor, such as a proximity sensor, that senses the position of the eccentric portion 1126 of the drive wheel 1124, and/or a third sensor that senses the speed of the conveyor 1010.

For example, upon sensing a folded article at a particular point in the conveyor 1010, a clutch mechanism (not shown) coupled between the motor 1122 and the drive wheel 1124 may cause the motor 1122 (perhaps after a predetermined delay to allow the folded article to become positioned over the folding rollers 1054, 1058) to drive the drive wheel 1124 one complete revolution, so that the blade member 1110 moves from its uppermost position to its lowermost position (i.e. the position shown in FIG. 18A) and then back to its uppermost position.

The folding roller 1058 may be part of a folding assembly 1150, which may include the vertically disposed side plates 1060 and a base plate 1154. The folding roller 1058 may be rotatably supported between the side plates 1060, and the bottom of each of the side plates 1060 may be provided with a key portion 1156 (FIG. 18D) that may be slidably disposed within a respective slot 1158 formed in the base plate 1154.

The folding assembly 1150 may also include a horizontally disposed stop bar 1160 and one or more retention arms 1162 that may extend outwardly from, or pass through, a forward face of the stop bar 1160. The folding assembly 1150 may include a relatively thin base sheet 1164 having a forward portion disposed above the folding roller 1058 that is curved to generally conform to the shape of the folding roller 1058.

The horizontal position of the folding assembly 1150 may be moved relative to the base plate 1154 via an adjustment screw 1170 that may be threaded through a spring 1172 and into a portion of the folding assembly 1150. Turning the adjustment screw 1170 may cause the folding assembly 1150 to slide on the base plate 1154. Such horizontal movement of the folding assembly 1150 will cause horizontal movement of the folding roller 1058, and thus will cause the horizontal spacing between the two folding rollers 1054, 1058 to change. Such a change in spacing may be desired due to differences in thicknesses of various types of folded articles that may be passed through the folding unit 216*b*.

The horizontal position of the stop bar 1160 may be changed by an adjustment mechanism or adjustment screw 1180 that may have an end that is supported by a bracket 1182 (which may be L-shaped) that may be bolted to the base plate 1154 of the folding assembly 1150. The adjustment mechanism 1180 may be provided with a knurled adjustment knob 1184 and a threaded screw 1186 operatively coupled to the stop plate 1160 so that turning the knob 1184 causes the horizontal position of the stop plate 1160 to be changed. That may be desirable in the event the position in the folded article at which the folding unit 216*b* is to make a fold is to be changed.

For example, if it is desired to make a fold relatively close to the leading edge of the folded article, the stop bar 1160 would be positioned relatively close to the blade member 1110. In that case, forward movement of the folded article through the rollers 1050, 1054 would stop when the leading edge of the folded article made contact with the stop bar 1160. Since the stop bar 1160 would be relatively close to the horizontal position of both the blade member 1110 and the nip between the folding rollers 1054, 1058, a fold would be made relatively close to the leading edge of the folded article.

Referring to FIG. 18A, the folding unit 216*b* may include an adhesive applicator 1190 that may be used to apply one or more drops or spots of adhesive to each folded article passing through the entry conveyor 1010 so that after a final fold is made, the folded article will remain in a closed position as shown, for example, in FIGS. 2, 3 and 4H. The adhesive applicator 1190 may be operatively coupled to a folded article sensor (not shown) and/or a sensor to sense the speed of the entry conveyor 1010 to properly time the application of the glue. Where the folding unit 216*b* is not used to make the final fold, but is instead used to make an intermediate fold (such as in the apparatus 200*c* of FIG. 5C) the adhesive applicator 1190 may be omitted, or it may be controlled not to apply adhesive via a control line 1192 coupled to a controller (not shown).

Figure 18C:
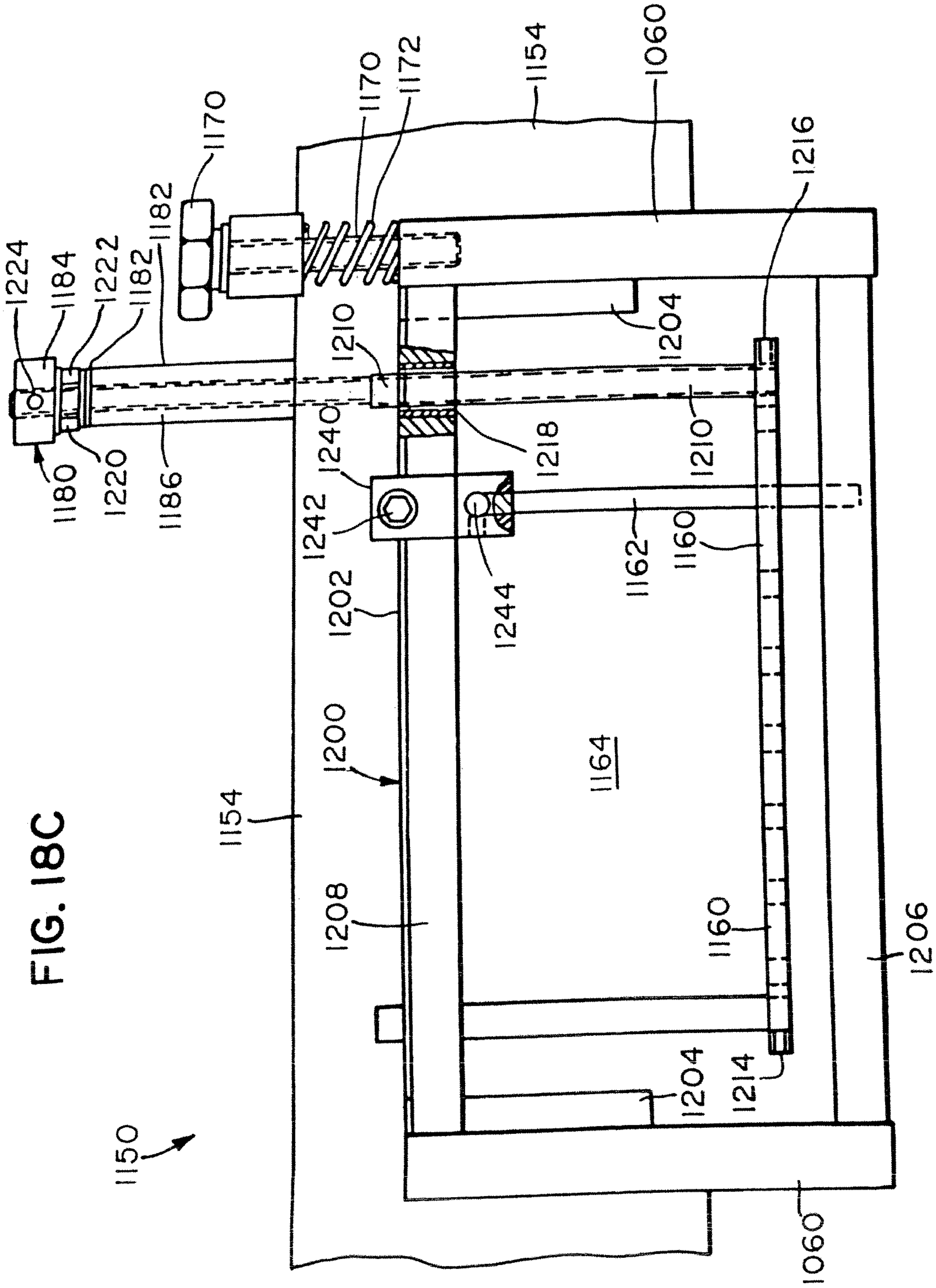

FIG. 18C is a top view of the folding assembly 1150. Referring to FIG. 18C, the folding assembly 1150 may include a C-shaped mounting bracket 1200 having a main portion 1202 and a pair of side portions 1204. The mounting bracket 1200 may be disposed on top of the plate 1164, and the side portions 1204 of the mounting bracket 1200 may be bolted or otherwise connected to the side plates 1060. The upper portions of the side plates 1060 may be connected together by a cylindrically shaped front bracing rod 1206 and a cylindrically shaped rear bracing rod 1208.

The stop bar 1160 may have a pair of cylindrically shaped guide members 1210, 1212 connected thereto. The forward end of each of the guide members 1210, 1212 may extend into a respective bore formed in the stop bar 1160, and the forward ends of the guide member 1210, 1212 may be anchored in place by a locking screw threaded into a respective side face 1214, 1216 of the stop bar 1160, with each locking screw making contact with the forward end of each of the guide members 1210, 1212. Each of the guide members 1210, 1212 may be slidably disposed within a cylindrical bushing or bearing 1218 mounted within the mounting bracket 1200.

The guide member 1210 may be hollow and internally threaded, and the threaded screw 1186 of the adjustment mechanism 1180 may have an end that is threadably connected inside the guide member 1210. The adjustment knob 1184 may have a relatively small-diameter portion that is disposed between a pair of upwardly extending arms 1220 of the L-shaped bracket 1182 and a relatively thin, larger-diameter portion 1222 that is disposed on the opposite side of the L-shaped bracket 1182 as the knurled outer portion of the knob 1184. The adjusting knob 1184 may be fixably secured to the adjusting screw 1186 via one or more set screws 1224 threaded through the knurled outer portion of the adjusting knob 1184 and which make locking contact with the adjusting screw 1186.

The lateral or horizontal position of the stop bar 1160 may be adjusted by rotating the adjusting knob 1184, which, due to the threaded interconnection of the adjustment screw 1186 and the guide member 1210, will cause the guide member 1210 and the stop bar 1160 connected thereto to be drawn towards or away from the adjusting knob 1184, depending on the direction in which the adjusting knob 1184 is rotated.

Figure 18D:
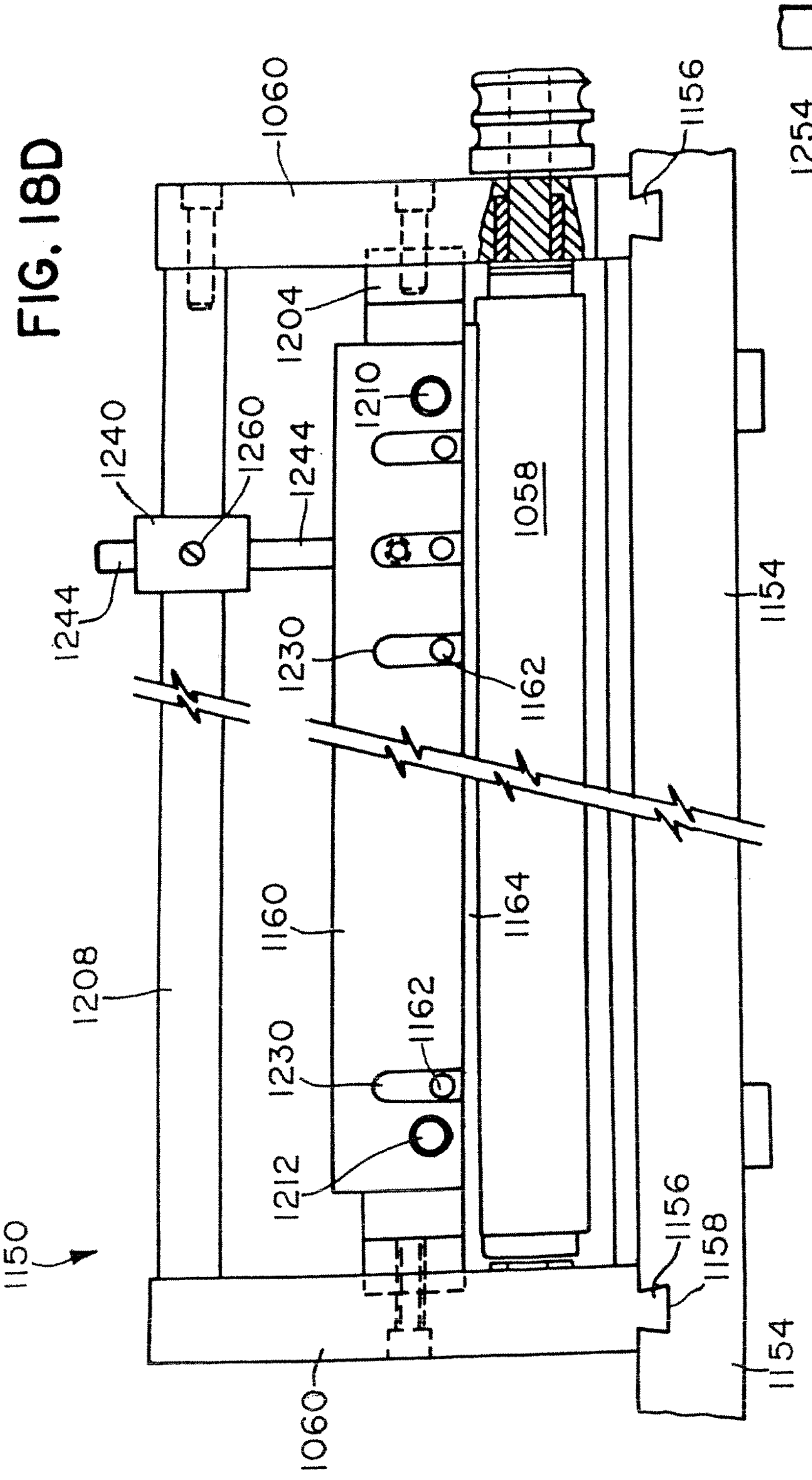

Referring to FIG. 18D, the stop bar 1160 may have a plurality of evenly spaced slots 1230 formed therein (some of which are not shown), and each of the retention arms 1162 may extend through a respective one of the slots 1230. The slots 1230 may be shaped so as to allow the height of the retention arms 1162 to be adjusted. Referring to FIGS. 18C and 18D, a plurality of mounting blocks 1240 may be mounted to the rear bracing rod 1208 (the front bracing rod 1206 is not shown in FIG. 18D for sake of clarity). One mounting block 1240 may be provided for each of the retention arms 1162. Each mounting block 1240 may be secured to the rear bracing rod 1208 via a locking screw 1242. Each mounting block 1240 may have a bore formed therein with a vertical height-adjustment rod 1244 passing through the bore.

Figure 18E:
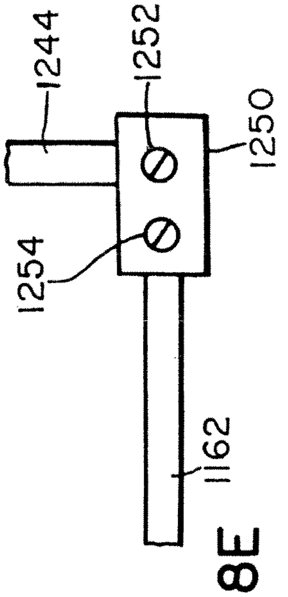

Referring also to FIG. 18E, the lower end of each height-adjustment rod 1244 may extend into a bore formed in a respective connecting block 1250 and be secured thereto by one or more locking screws 1252. Each of the connecting blocks 1250 may receive the rear end of a respective one of the retention arms 1162, with each retention arm 1162 being secured in the connecting block 1250 via one or more locking screws 1254.

Each of the height-adjusting rods 1244 may pass completely through the bore formed in its associated mounting block 1240 so that the elevation of each of the height-adjusting rods 1244 may be moved relative to its associated mounting block 1240 and then secured at a desired elevation by a locking screw 1260. Thus, the elevation of each of the retention arms 1162 may be independently adjusted. Alternatively, a retention arm adjustment mechanism that simultaneously adjusted the height of all retention arms 1162 could be utilized.

Modular Processing Apparatus

Figure 19:
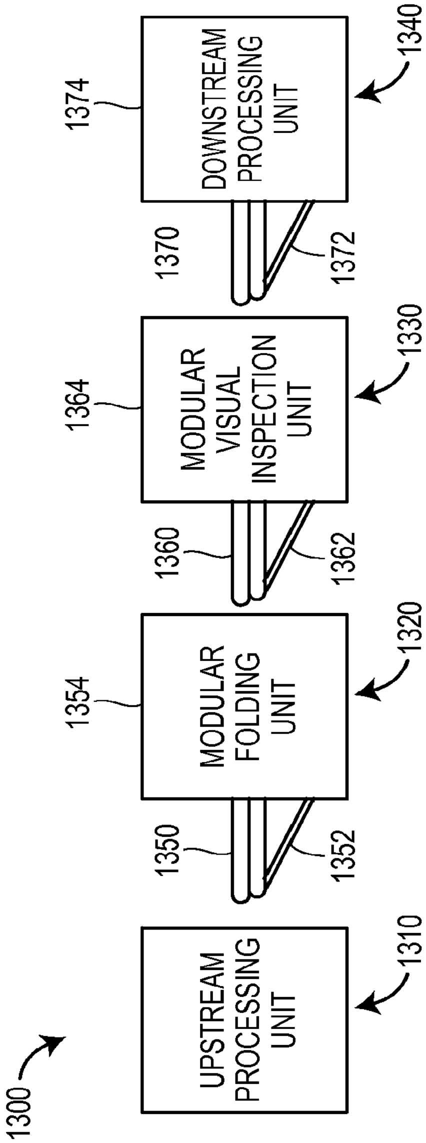
FIG. 19 is a schematic illustration of a modular informational item processing apparatus.

FIG. 19 is a schematic illustration of a modular informational item processing apparatus 1300 for forming informational items such as outserts and folded booklets. Referring to FIG. 19, the modular apparatus 1300 may include an upstream processing unit 1310, a modular folding unit 1320, a modular visual inspection unit 1330, a modular downstream processing apparatus 1340.

The upstream processing unit 1310 may be, for example, the folding unit 212 shown in FIGS. 5A and 5B or the first (leftmost) folding unit 216 shown in FIGS. 5C and 5D The modular folding unit 1320 may be any one or more of the folding units 210, 212, 216*a* described above with reference to FIGS. 10A, 10B, 11A, 11B, 13A, and 13B. The modular folding unit 1320 may be provided with an entry conveyor 1350, a conveyor support mechanism 1352, and a support structure 1354. The conveyor support mechanism 1352 may be an adjustable support mechanism or the conveyor support mechanism 1352 may be a fixed, non-adjustable support mechanism. In either case, the conveyor support mechanism 1352 may support the end of the conveyor 1350 at substantially the same elevation at which informational items exit the upstream processing unit 1310 so that information items can be automatically transferred from the upstream processing unit 1310 to the folding unit 1320.

The modular visual inspection unit 1330 may be the visual inspection unit 1400 described with reference to FIGS. 20-24. The modular visual inspection unit 1330 may be provided with an entry conveyor 1360, a conveyor support mechanism 1362, and a support structure 1364. The conveyor support mechanism 1362 may be an adjustable support mechanism or the conveyor support mechanism 1362 may be a fixed, non-adjustable support mechanism. In any case, the conveyor support mechanism 1362 may support the end of the conveyor 1360 at substantially the same elevation at which informational items exit the modular pressing unit 1320 so that information items can be automatically transferred from the pressing unit 1320 to the visual inspection unit 1330.

The downstream processing unit 1340 may be a modular unit such as the bonding unit 218 or the stacking unit 760. The downstream processing unit 1340 may be provided with an entry conveyor 1370, a conveyor support mechanism 1372, and a support structure 1374. The conveyor support mechanism 1372 may be an adjustable support mechanism as described above in connection with the folding unit **216*b* or the conveyor support mechanism 1372 may be a fixed, non-adjustable support mechanism. In any case, the conveyor support mechanism 1372 may support the end of the conveyor 1370 at substantially the same elevation at which informational items exit the folding unit 1330 so that information items can be automatically transferred from the folding unit 1330 to the processing unit 1340**.

The fact that the modular processing units 1320, 1330, 1340 have separate support structures 1354, 1364, 1374 contributes to their ability to be connected to and disconnected from upstream processing units.

Since each of the structures and acts described above is only exemplary and may be used in various embodiments of the invention, numerous structures and acts described above are intended to be optional. Structures and acts described above can be omitted, and other structures and acts may be substituted therefor.

Numerous additional modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A method of forming and sorting informational items having product information printed thereon, the method comprising:

folding a sheet of paper having product information printed thereon by making a plurality of folds in said sheet of paper to form a folded article;

conveying the folded article on a conveyor belt past a camera;

capturing an image of the folded article with the camera as it passes on the conveyor belt;

processing data retrieved from the image; and comparing the data retrieved from the image to target data stored in a memory device to determine if the folded article has at least one of: dimensions within predetermined tolerances or edges in proper alignment relative to the conveyor belt based on the processed data.

2. The method of claim 1, further comprising detecting the presence of the folded article on the conveyor belt with a photosensor before capturing the image.

3. The method of claim 1, further comprising diverting the folded article off of the conveyor belt in response to determining that the folded article has one or more dimensions outside of the predetermined tolerances or has edges without proper alignment relative to the conveyor belt.

4. The method of claim 3, wherein diverting the folded article comprises actuating a diverter assembly located down stream of the camera such that a diverter arm engages the folded article and causes the folded article to move off of the conveyor belt.

5. The method of claim 1, wherein processing the data retrieved from the image comprises identifying the edges of the folded article.

6. The method of claim 5, wherein processing the data retrieved from the image further comprises calculating an angle between two or more intersecting edges of the folded article.

7. The method of claim 1, wherein capturing the image comprises capturing a digital image with a pixelated digital imaging sensor.

8. The method of claim 1, wherein determining if the folded article has at least one of: dimensions within predetermined tolerances or edges in proper alignment relative to the conveyor belt based on the processed data comprises determining if the folded article has at least one of: width and length dimensions within predetermined tolerances or edges in proper alignment relative to the conveyor belt.

9. A method of forming and sorting informational items having product information printed thereon, the method comprising:

folding a sheet of paper having product information printed thereon by making a plurality of folds in said sheet of paper to form a folded article;

conveying the folded article on a conveyor belt;

capturing an image of the folded article with a camera as it moves on the conveyer belt;

processing data by comparing the data to target data stored in a memory device retrieved from the image to determine if the folded article satisfies predetermined criteria comprising at least one of: having dimensions within predetermined tolerances or having edges in proper alignment relative to the conveyor belt; and diverting the folded article off of the conveyor belt in response to determining that the folded article does not satisfy the at least one predetermined criteria.

10. The method of claim 9, wherein diverting the folded article off of the conveyor belt comprises actuating a diverter assembly located adjacent to the conveyor belt to move a diverter arm into engagement with the folded article.

11. The method of claim 9, wherein processing the data comprises identifying edges of the folded article.

12. The method of claim 9, wherein processing the data comprises calculating an angle between two or more edges of the folded article.

13. The method of claim 9, further comprising detecting the presence of the folded article on the conveyor belt with a photosensor prior to capturing the image.

14. The method of claim 9, wherein determining if the folded article satisfies the predetermined criteria comprises determining if the folded article satisfies predetermined criteria comprising at least one of: having width and length dimensions within predetermined tolerances or having proper orientation on the conveyor belt.

* * * * *